(12) United States Patent
Grimwood et al.

(10) Patent No.: US 6,243,369 B1
(45) Date of Patent: Jun. 5, 2001

(54) APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM

(75) Inventors: Michael Grimwood, Palo Alto; Jim Knittel, Campbell; Paul Richardson, San Jose; Selim Shlomo Rakib, Cupertino; Paul Alan Lind, Santa Cruz; Doug Artman, San Jose, all of CA (US)

(73) Assignee: Terayon Communication Systems, Inc.

( * ) Notice: Subject to any disclaimer, the term of this patent is extended or adjusted under 35 U.S.C. 154(b) by 0 days.

(21) Appl. No.: 09/074,036

(22) Filed: May 6, 1998

(51) Int. Cl.[7] ................................................... H04B 7/216
(52) U.S. Cl. ........................ 370/335; 370/503; 370/342; 375/219
(58) Field of Search ..................................... 375/141, 146, 375/147, 135, 133, 136, 137, 211, 219, 220, 222, 356, 358; 455/39, 75, 78, 85, 86, 88, 557; 370/278, 282, 320, 335, 321, 342, 347, 350, 442, 441, 337, 498, 503, 509

(56) References Cited

U.S. PATENT DOCUMENTS

| | | | |
|---|---|---|---|
| 5,157,686 | 10/1992 | Omura et al. ............................. | 375/1 |
| 5,164,958 | 11/1992 | Omura .................................... | 375/1 |
| 5,166,952 | 11/1992 | Omura et al. ............................. | 375/1 |
| 5,228,056 | 7/1993 | Schilling ................................. | 375/1 |
| 5,235,615 | 8/1993 | Omura .................................... | 375/1 |
| 5,253,268 | 10/1993 | Omura et al. ............................. | 375/1 |
| 5,260,967 | 11/1993 | Schilling ................................. | 375/1 |
| 5,610,911 | 3/1997 | Ishikawa et al. ..................... | 370/503 |
| 5,715,275 | * 2/1998 | Emi ..................................... | 375/202 |
| 5,737,329 | 4/1998 | Horiguchi ............................. | 370/342 |
| 5,745,837 | * 4/1998 | Fuhrmann ............................... | 455/5.1 |
| 5,809,395 | * 9/1998 | Hamilton-Piercy et al. .......... | 455/4.1 |
| 5,822,359 | 10/1998 | Bruckert et al. ..................... | 375/200 |
| 5,838,667 | * 11/1998 | Bingham et al. ..................... | 370/294 |
| 5,890,051 | * 3/1999 | Schlang et al. ......................... | 455/76 |
| 5,898,744 | * 4/1999 | Kimbrow et al. ..................... | 375/376 |
| 5,930,235 | 7/1999 | Arai ..................................... | 370/252 |
| 5,930,704 | * 7/1999 | Kay ....................................... | 455/419 |
| 5,995,483 | * 11/1999 | Marchok et al. ..................... | 370/207 |
| 6,055,268 | * 4/2000 | Timm et al. ........................... | 375/229 |

FOREIGN PATENT DOCUMENTS

| | | | |
|---|---|---|---|
| 0 767 54 A2 | 4/1997 | (EP) .............................. | H04B/1/707 |
| WO 96 05669 | 2/1996 | (WO) ............................. | H04J/13/00 |
| WO 97 08861 | 3/1997 | (WO) ............................. | H04J/13/00 |
| WO 97/34421 | 9/1997 | (WO) ............................. | H04N/7/173 |

* cited by examiner

*Primary Examiner*—Chi Pham
*Assistant Examiner*—Bayard Emmanuel
(74) *Attorney, Agent, or Firm*—Ronald C. Fish; Falk & Fish

(57) ABSTRACT

A bidirectional digital data communication system which generate phase coherent upstream clock and carrier signals from recovered downstream clock generated from a master clock in a central unit. The preferred species uses any downstream clock rate and generates a phase coherent upstream clock so long as the two clock rates can be related by the ratio M/N where M and N are integers. One embodiment uses an MCNS downstream and an SCDMA upstream and uses MNCN timestamp messages in the downstream to achieve an estimate of RU frame offset prior to establishing frame alignment using a ranging process. The use of timestamp messages to estimate the offset is aided by a low jitter method for inserting timestamp messages by avoiding straddling of MPEG packet headers with the sync message. Clock slip is detected by counting upstream clock cycles over a predetermined downstream clock interval and the RU transmitter is shut down if slip is detected to prevent ISI interference from misaligned codes. An SCDMA transmitter for the minislot environment of 802.14 and MCNS is disclosed along with a receiver for the minislot environment using TDMA or SCDMA demultiplexing.

25 Claims, 15 Drawing Sheets

SCDMA DS, SCDMA US

TABLE 1 64 QAM SYNC START POSITION ADJUSTMENTS

| SYNC START POSITION IN BYTES | SYNC ADJUSTMENT IN FEC FRAMES |
|---|---|
| 0-5 | 2 |
| 155-167 | 4 |
| 167-183 | 2 |

TABLE 2 256 QAM SYNC START POSITION ADJUSTMENTS

| SYNC START POSITION IN BYTES | SYNC ADJUSTMENT IN FEC FRAMES |
|---|---|
| 0-2 | 6 |
| 3-5 | 7 |
| 155-160 | 1 |
| 161-166 | 2 |
| 167-172 | 3 |
| 173-178 | 4 |
| 179-184 | 5 |
| 185-187 | 6 |

FIRST MINISLOT

QPSK, NO TRELLIS, 54 BYTE APDU

ONE HS-CDMA FRAME

ONE SUBFRAME

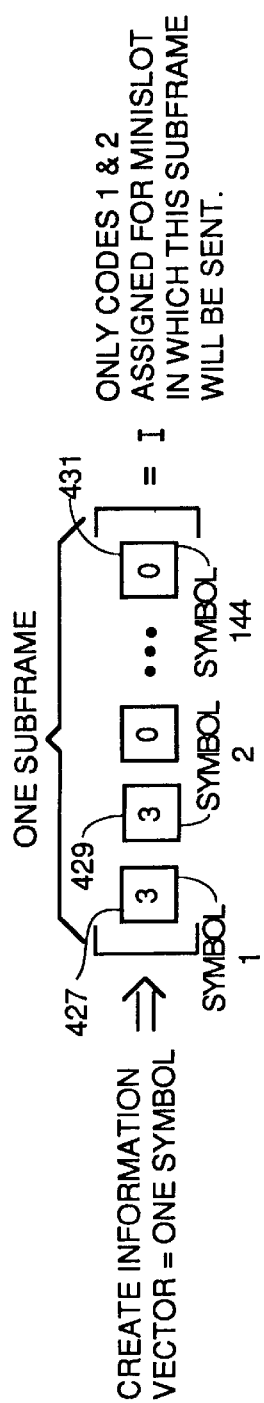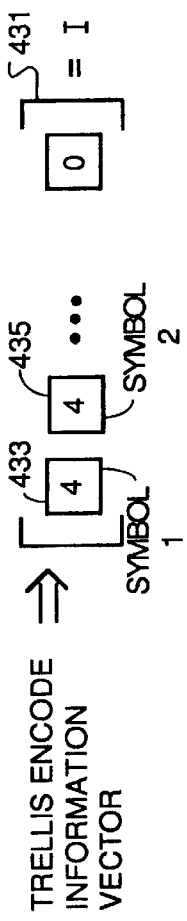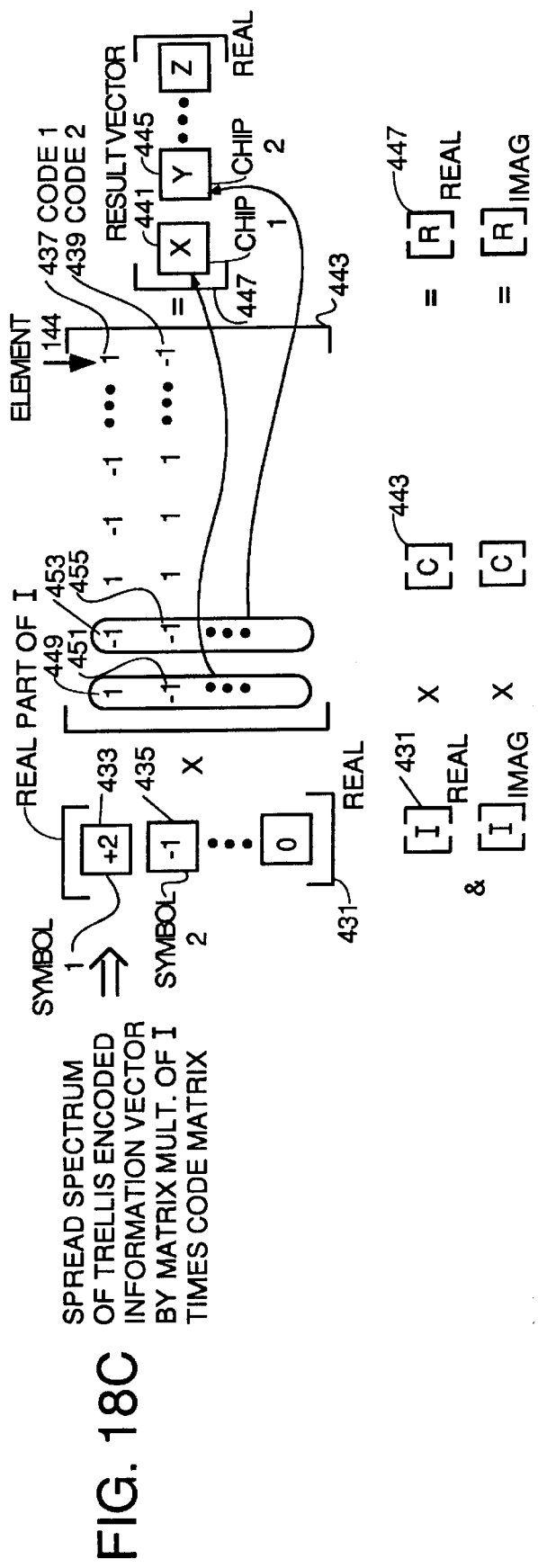
FIG. 18A CREATE INFORMATION VECTOR = ONE SYMBOL
FIG. 18B TRELLIS ENCODE INFORMATION VECTOR
FIG. 18C SPREAD SPECTRUM OF TRELLIS ENCODED INFORMATION VECTOR BY MATRIX MULT. OF I TIMES CODE MATRIX

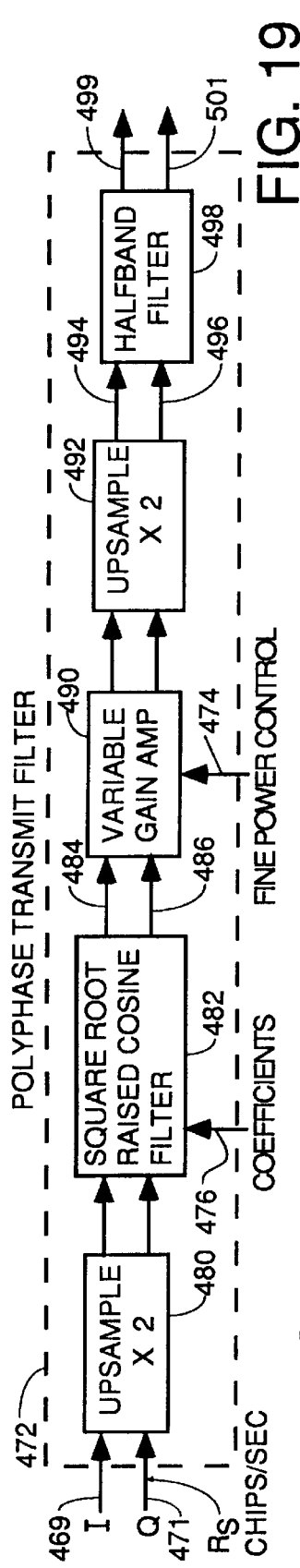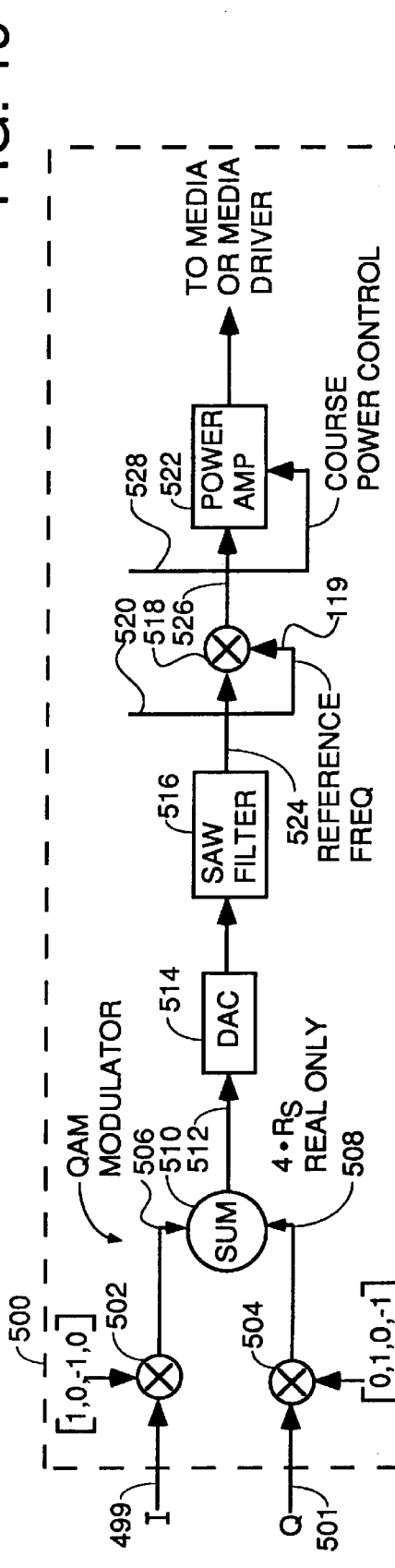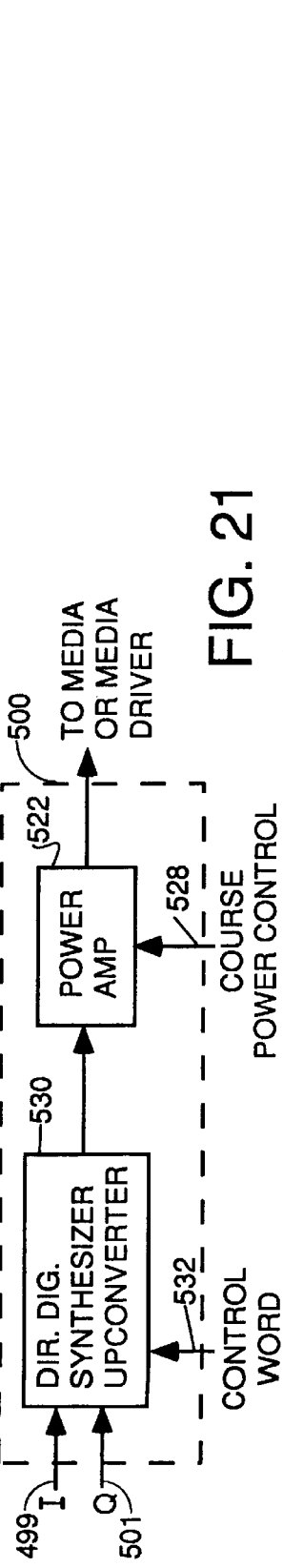
FIG. 19
FIG. 20
FIG. 21

DEMODULATOR/DEMULTIPLEXER

APPARATUS AND METHOD FOR SYNCHRONIZING AN SCDMA UPSTREAM OR ANY OTHER TYPE UPSTREAM TO AN MCNS DOWNSTREAM OR ANY OTHER TYPE DOWNSTREAM WITH A DIFFERENT CLOCK RATE THAN THE UPSTREAM

FIELD OF USE

This application incorporates by reference the teachings of PCT Publication WO97/08861, published Mar. 6, 1997 for details of SCDMA transmitters and receivers, and incorporates by reference the teachings of PCT publication WO97/34421, published Sep. 18, 1997 for apparatus and methods of using SCDMA on hybrid fiber coax plants to use ATM cells for data transfer.

The invention is useful in the field of digital communications over any media, but, in particular, over hybrid fiber coax (HFC).

An emerging technology for cable TV systems is the provision of interactive, bidirectional digital data communications over the same HFC media as is used to provide TV signals to subscribers. Terayon Communication Systems first started shipping cable modems in July of 1997 that had the capability to send digital data using synchronous code division multiple access (SCDMA) multiplexing of digital data from multiple sources bidirectionally over HFC. In that system (described fully in the PCT publications incorporated herein, hereafter sometimes simply referred to as the PCT publications), downstream and upstream transmissions had gaps between frames. Frame synchronization in the upstream between the same frame number transmitted by different remote units (RUs) at differing distances from a central unit (CU) was important for low ISI noise. This was achieved by transmitting barker codes upstream at variable delays from each RU until a delay was found for each RU which resulted in its barker code arriving in the center of the gap between CU frames. This transmit frame timing delay determined for each modem in a trial and error process called ranging is then used for transmission of subsequent upstream frames by that RU. All RUs align to the same frame.

Downstream synchronization was achieved by transmission of barker codes from the CU to the RUs during every downstream gap. The RUs detected the CU barker codes and used that information to determine the CU downstream frame boundaries. The downstream barker codes also were encoded to include the downstream chip clock so that all the RUs could synchronize to the CU master chip clock. Known pilot channel data transmitted during timeslot 0 in the downstream (the SCDMA multiplexing is done over a TDM input stream) from the CU was used to do carrier recovery and monitor frame synchronization and to transmit kiloframe information. Clock recovery in the RUs was from the downstream barker codes using early-late gating techniques. In subsequent evolutions, the pilot channel data was only used to send frame sequence data and kiloframe marker information, and no carrier recovery was performed using the pilot channel data. Carrier recovery was done from the recovered downstream clock since at the CU the downstream carrier was generated to be phase coherent with the downstream clock. The arrival of the barker code in the downstream frame gaps also served as a reference for each RU from which to measure a transmit frame timing delay to achieve upstream frame synchronization.

An emerging standard for use in digital multi-service delivery through TV distribution systems is MCNS. In this standard, MAC layer data frames are broken down into MPEG packets which are 64-QAM or 256-QAM modulated and sent downstream in a continuous stream after FEC encoding. The FEC encoding involves four layers of processing: the MPEG packets are broken up and encoded into Reed-Solomom blocks with block boundaries bearing no relationship to MPEG packet boundaries; an interleaver mixes up the resulting 7 bit symbols so symbols formerly contiguous in time are no longer contiguous; a randomizer that takes the output of the interleaver and scrambles the symbols in pseudorandom order; and a trellis encoder adds some redundant bits. There are no gaps in the downstream data in which the CU can send a barker code which carries the master chip clock and which signals frame boundaries. There are no downstream frame boundaries related to the MPEG packet frames, but there are FEC frames delineated by a 42 bit FEC sync trailer appended to the end of 60 R-S blocks for 64-QAM, each R-S block containing 128 7 bit symbols. There is a 28-bit unique sync pattern in the first 4 symbols of the trailer. The remaining 14 bits are utilized for interleaver control. The trailer is inserted by the R-S encoder and detected by the R-S decoder to locate FEC frame boundaries. There is no synchronization coupling between the FEC and transport layers where MPEG packets are processed.

SCDMA upstreams require that all RUs be synchronized in frequency and have their frame boundaries aligned in time at the CU. To do this, the upstream must be synchronized to the downstream and mechanisms are needed to account for the fact that the propagation delay in transmissions from each RU to the CU encounter different propagation delays. The difficulty in resynchronizing an SCDMA upstream to a downstream with a different clock rate is that there are a wide range of different standards and different clock rates. Further, digital resampling can lead to two different downstream clock rates even within the same downstream.

If an SCDMA upstream is to be used with a downstream with an arbitrary clock rate such as an MCNS downstream or a IEEE 802.14 standard downstream, there arises a need for:

(1) a way to maintain a rational relationship between the downstream and upstream clock rates through the use of PLLs or digital resamplers;

(2) circuits for generating timestamp messages to establish a CU reference replacing the barker codes from which the round trip delay can be measured for fast ranging;

(3) a circuit for reducing the jitter of the timestamp messages to improve the accuracy of delay estimates for fast ranging;

(4) a circuit for detecting upstream clock slips.

SUMMARY OF THE INVENTION

There is described herein two examples of systems for transmitting digital data bidirectionally over shared media such as cable TV plants using upstream Synchronous CDMA multiplexing. The distinguishing characteristics of a genus to which these two species belong is the generation in the RUs of an upstream carrier and upstream chip clock both of which are synchronized in phase with a CU master clock. They are synchronized in phase by virtue of being synchronized in phase with a downstream symbol clock which is recovered from the downstream data transmitted by the CU, the downstream symbol clock being both synchronized in phase with the CU master clock and having a different frequency than the upstream chip clock. The advantage of the aspect of the invention that synchronizes the upstream clock to the CU master clock or at least makes it phase coherent therewith and which generates a phase coherent upstream carrier from the recovered downstream clock is that it eliminates the need for upstream clock and carrier recovery circuitry in the CU since the upstream clock and carrier are phase coherent with locally generated clock and carrier signals in the CU. In other words, since the upstream clock and carrier are phase synchronous with the CU master clock, the upstream data can be demodulated and demultiplexed using upstream clock and carrier signals generated from the CU master clock after suitable phase and amplitude adjustments for each RU derived from known preamble data transmitted by the RU using the upstream clock and carrier derived from the recovered downstream clock. Although a PLL is used in the CU, it is used to generate an upstream local clock signal from a master clock signal which has its frequency set so as to generate a downstream clock signal or at some multiple of the downstream symbol clock frequency. In other words, a distinguishing characteristic of the first genus of inventive species is that they employ a master clock to generate a clock signal which can be used directly or indirectly for whatever clock frequency is used for one direction of transmission and a PLL or digital resampler which generates a phase synchronous clock signal which can be used for the other direction of transmission. That is, if the CU master clock generates a clock signal that is either the symbol or bit clock rate for the downstream, a PLL coupled to the CU master clock generates a local clock signal at the upstream chip clock rate which is phase synchronous with the downstream clock rate but at the frequency needed by the upstream demodulator even if that is a different frequency than the downstream frequency. The upstream clock frequency generated by the PLL is related to the downstream clock frequency by the ratio M/N where M and N are integers and the PLL multiplies the downstream clock frequency generated by the CU master clock by the ratio M/N to generate the upstream clock. The reverse can be true where the CU master clock generates the upstream clock and the PLL multiplies this clock by a ratio M/N of integers to generate a downstream clock.

Although the two examples given utilize an SCDMA upstream and an MCNS or TDMA downstream, the invention is intended to work with any downstream type transmission having any chip clock, symbol clock or bit clock rate which is different than the upstream chip clock rate of the SCDMA circuitry but which is related by the ratio of integers M/N. The invention can be employed regardless of whether the downstream data is either a simple stream of data from a single source or a multiplexed stream from multiple sources as long as the downstream and upstream clock rates or some integer multiple of one or both can be related by the integer ratio M/N.

Also disclosed is a system to speed up the ranging process taught in the PCT publications incorporated by reference by determining a frame alignment offset for the RU prior to the start of ranging. This is done using timestamp messages normally sent in the MCNS downstream to establish a reference to the CU master clock such that a determination can be made of the time offset between the CU frame boundary and the RU frame boundary. This is done by sampling a local kiloframe counter clock when a downstream sync message is Equation (5), and the RU kiloframe boundary is adjusted per this calculation. Then ranging using barker codes is performed to establish precise frame alignment.

The RU kiloframe boundary offset calculation is more accurate if the sync messages arrive with low jitter from the CU. An apparatus and method is taught which adjusts the time of insertion of sync messages so that they do not straddle MPEG packet headers and are always inserted in the same place in an FEC frame.

In embodiments where an SCDMA upstream is used, code misalignments cause ISI and interfere with reception of data from other RUs. This can be caused by clock slip between the upstream clock synthesized from the recovered downstream clock so as to be phase coherent. A clock slip detector counts the upstream clock cycles during a predetermined interval established by the recovered downstream clock and generates an interrupt which causes a service routine to read the count and compare it to the expected count and shut down the RU transmitter and attempt to resynchronize if slip of more than 35 nanoseconds is detected.

Also disclosed is the preferred form of an SCDMA RU upstream transmitter adapted for use in the minislot environment of 802.14 or MCNS systems. This transmitter breaks upstream APDUs (ATM packets with parity) into Reed-Solomon blocks of programmable size and encodes them with a programmable number of error detecting and correcting bits, all in accordance with instructions from the headend controller. The encoded blocks are interleaved and buffered for release when minislot assignments are received from a TC layer process which receives its minislot assignments in downstream messages from a headend controller process. A minislot counter in the RU is offset by the ranging process to an offset such that when the RU minislot counter reaches the count of the first assigned minislot, data is released from the buffer into the CDMA spreading circuitry. The timing is such that it arrives aligned with the minislot boundaries of the CU. The data released from the buffer is broken up into information vectors each having an number of elements equal to the number of codes in the codebook. The number of codes is programmable in accordance with instructions from the headend controller. Each element is a chip. The chip rate is programmable in accordance with instructions from the headend controller process. Only the chips corresponding to codes which are mapped to the assigned minislots are populated with data. All the RUs and CU have a permanent mapping of codes to minislots stored in lookup tables. The information vectors are trellis encoded by a programmable trellis encoding modulator. Modulation types are programmable in accordance with instructions from the headend controller. Trellis encoding can be turned off. The information vectors then have their spectrums spread by matrix multiplication by a code matrix, and a framing circuit concatenates the result vectors, each of which is one symbol, into eight symbol frames followed by a programmable size gap. A programmable pre-emphasis filter adjusts the spectrum in accordance with tap weights established by a training process and a polyphase transmit filter raises the sample rate, limits the bandwidth of each image to 6 mHz and applies a fine gain control. A programmable frequency translator then QAM modulates the chips onto sine waves at the sampling rate frequency, converts the digital data to an analog signal and mixes the frequency with a programmable reference frequency to obtain an RF signal the desired upstream frequency. A final programmable power amplifier applies coarse power control.

Also disclosed is a ranging/training process adapted for the 802.14 and MCNS environment to achieve frame/minislot alignment, channel equalization and power alignment. The CU sends downstream ranging invitations naming the gap by number during which ranging information is to be sent by any RU needing to range. The frames and gaps of the upstream are numbered and there is a mapping known to all the RUs and the CUs as to which frames correspond to which minislot numbers. Each RU responds by sending a 17 gap sequence of barker codes starting with a "start bit" comprised of a 16 chip barker code. The "start bit" is followed by 16 gaps of on or off bits with an on bit defined as a gap in which the barker code is sent and an off bit defined as a gap in which the barker code is not sent. The 16 gaps are exactly 50% populated by barker codes in a unique temporary ID sequence. Gaps are referenced to the RUs minislot/frame/gap counting timebase, not the CU's timebase. If no response message is received indicating the RU hit the gap, the RU adjusts its offset value by 4 chips and waits for the next ranging invitation. This process happens at a single inaugural power level. If an entire frame worth of incrementations has occurred without hitting the gap, the power level is incremented and the offset incrementation is started again.

When the RU hits the gap, the CU detects this fact, and, sends a downstream message so indicating. If more than one RU has hit the same gap, a collision message is sent and the RUs execute a collision resolution protocol which causes some of them to stop attempting to range temporarily. After, an RU has successfully ranged, the CU sends a training invitation to the RU. The RU then executes a training process by sending known data on known codes. The CU then determines what, if any fine tuning of the offset is needed, and allows its adaptive filters to settle on tap coefficients that equalize the channel. During the training interval, the CU also determine power levels which cause the codes from the RU in training to arrive at the CU at the same power levels as codes from other RUs. The tap coefficients and power levels and any fine tuning of the offset are sent downstream to the RU to adjust its transmitter. The CU then sends a downstream message requesting the 48-bit MAC address of the RU and the RU responds.

BRIEF DESCRIPTION OF THE DRAWINGS

FIG. 18A is a diagram symbolizing the process of creating one information vector from which one symbol will be generated.

FIG. 18B is a diagram symbolizing the process of trellis encoding the information vector.

FIG. 18C is a diagram symbolizing the process of matrix multiplying the real part of the information vector times the code matrix to generate the real part of the result vector.

FIG. 19 is a block diagram of one embodiment for a polyphase transmit filter.

FIG. 20 is a block diagram of one embodiment for a frequency translator and coarse power control circuit.

FIG. 21 is a block diagram of the preferred embodiment for a frequency translator and coarse power control circuit.

DETAILED DESCRIPTION OF THE PREFERRED AND ALTERNATIVE EMBODIMENTS

Figure 1:
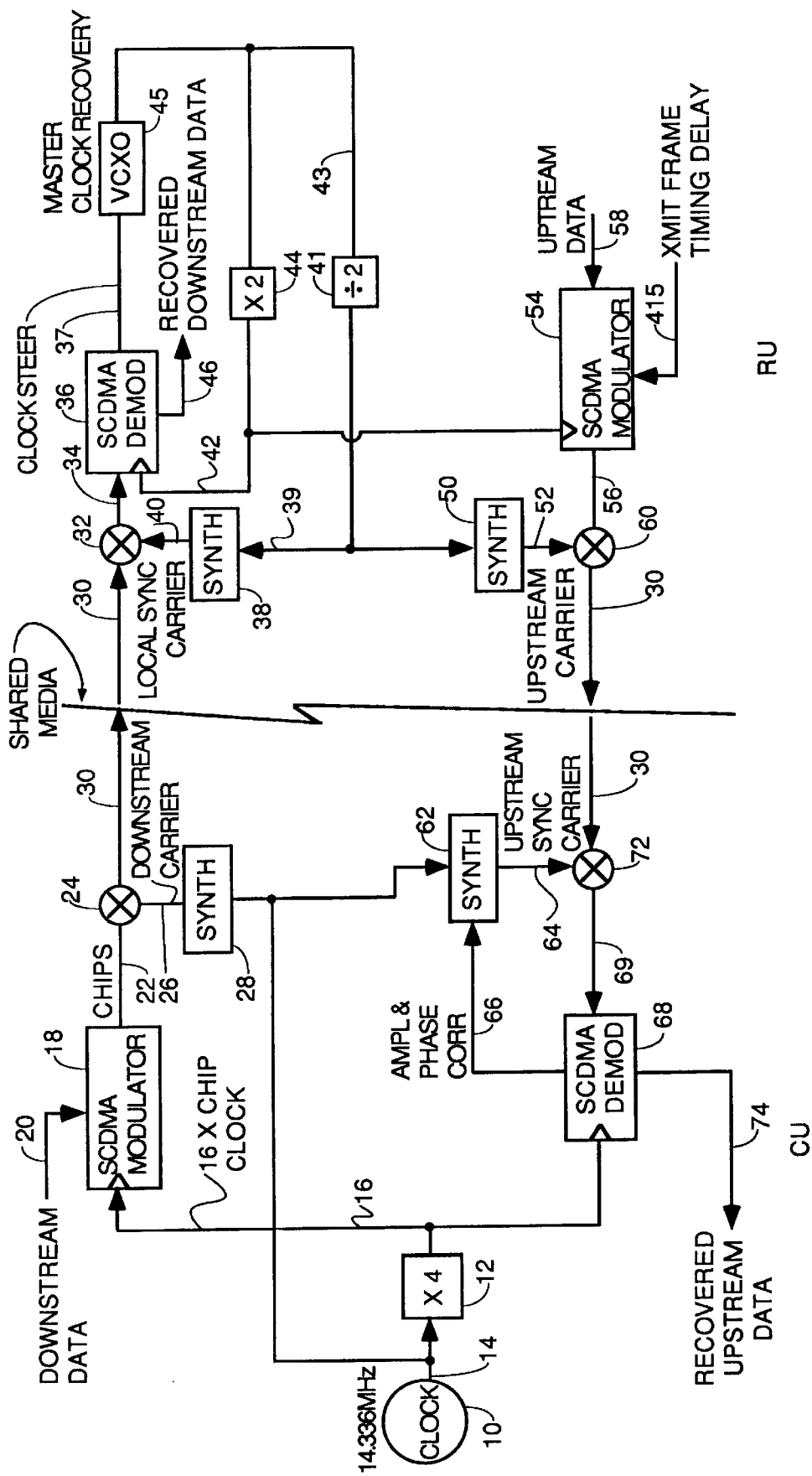
FIG. 1 is a block diagram of an SCDMA downstream/SCDMA upstream system with the same clock rates in each direction, all clock and carrier information in both the RU and CU being synchronized to one master clock in the CU.

Referring to FIG. 1, there is shown a block diagram of a system which uses SCDMA for both downstream and upstream digital communications with the same downstream and upstream clock rates, both the downstream and upstream clocks being phase coherent. Comparison of the embodiment of FIG. 1 with the embodiment of FIG. 2 where the downstream and upstream clocks are at different rates reveals that there is no rate conversion PLL in the CU or RU of the embodiment of FIG. 1. These rate conversion PLLs (or digital resampler) are used to generate phase coherent upstream clocks from the downstream clocks at different frequencies.

Figure 2:
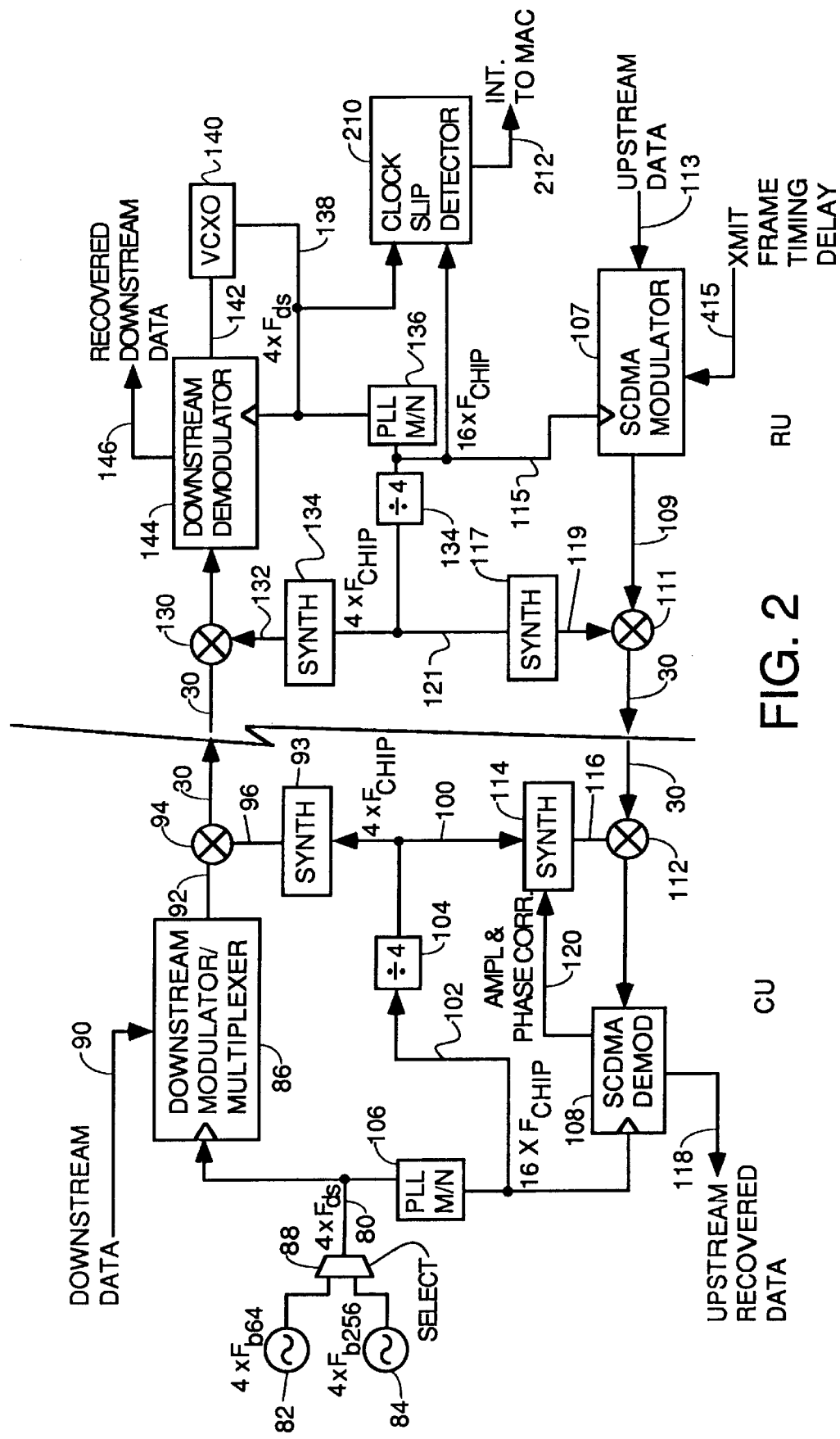
FIG. 2 is a block diagram of a system for synchronizing an SCDMA upstream to a downstream having any multiplexing protocol and an arbitrary clock rate.

In all the embodiments of FIGS. 1, 2, 4 and 13, a master clock 10 in the CU serves as the fount of all synchronization information for both the CU and RU. For simplicity, most of the ranging and training circuitry are not shown in the embodiments of FIGS. 1, 2 and 4. However, it can be the same circuitry as is shown to accomplish these functions in the transmitter of FIG. 13 and the receiver of FIG. 24. The novelty in FIGS. 1 and 2 is believed to be the use of phase coherent upstream clock and carrier signals synthesized from a recovered downstream clock which is phase coherent with a master clock in the CU. This point of novelty also exists in the embodiment of FIG. 4 along with circuitry to support three additional points of novelty—an RU offset calculation from MCNS or 802.14 timestamps prior to ranging, a low jitter timestamp message insertion method and apparatus and a clock slip detector to detect loss of upstream synchronization.

In FIG. 1, a frequency multiplier circuit 12 multiplies the clock frequency on line 14 by 4 to generate a 16× chip clock signal on line 16. The local clock signal is used by SCDMA modulator 18 to multiplex downstream data received on line 20 into downstream frames comprised of multiple symbols each with multiple QAM modulated chips at an intermediate frequency on line 22. Multiplier 24 mixes the signal on bus 22 up to an RF frequency in the downstream band of frequencies using a downstream carrier on line 26 generated by synthesizer 28 from the master clock signal on line 14. A filter (not shown) removes unwanted sidebands. The modulated carrier is then transmitted on shared media 30.

In an RU, the signal on shared media 30 is demodulated by demodulator 32 using a synchronized local carrier on line 40 generated by synthesizer 38 from a local clock signal on line 39 generated from a divide by 2 clock divider circuit 41 which may take the form of a PLL. The local downstream carrier on line 40 is therefore generated from the recovered downstream clock on line 43 which is phase coherent with master clock in the CU. The clock steering signal is generated from downstream barker codes detected by SCDMA demodulator 36. The SCDMA demodulator uses a local clock on line 42 generated by a times 2 frequency clock multiplier circuit 44 from the recovered master clock signal on line 43. The recovered downstream data is output on line 46.

Upstream transmissions use a chip clock and upstream carrier also derived from the master clock signal on line 43. Divide by 2 counter 41 generates a local clock signal on line 39 which is used by another synthesizer 50 to generate an upstream carrier on line 52. The times 2 PLL 44 output chip clock on line 42 is used by RU SCDMA modulator 54 to code division multiplex upstream data on line 58 into multiple symbols comprised of multiple chips on line 56 coupled to modulator 60. The resulting modulated upstream carrier, which has a different frequency than downstream carrier on line 26, is launched into shared media 30.

In the CU, another synthesizer 62 uses the master clock signal on line 14 to generate a synchronized local carrier on line 64 which is synchronized to the upstream carrier used by each RU. Because of propagation delays which are different for each RU, the local carrier on line 64 is adjusted in phase for reception of signals from each RU by a phase correction signal on line 66. The phase and amplitude correction signal on line 66 is generated by a SCDMA demodulator 68 from the demodulated data on line 69 from known preamble data transmitted by each RU during its assigned timeslot(s). The phase and amplitude correction for the QAM data by each RU is stored in memory. The synthesizer generates a local upstream carrier signal on line 64 which is synchronized in frequency and phase with the upstream carrier of the RU currently being received. This local carrier is used by demodulator 72 to demodulate the signal received from shared HFC or coax 30 to generate a baseband signal on line 69 which is demultiplexed by SCDMA demodulator 68 to generate recovered upstream data on line 74. A local upstream chip clock on line 16 derived from CU master clock 10 is used by SCDMA demodulator 68 to demultiplex the upstream data.

The correction factor signals on bus 66 represent only one way of achieving synchronization in the CU modem for each individual RU. Another way is to use the slicer error/rotational amplifier combination in the CU receiver described in the PCT publications incorporated by reference herein.

Although the SCDMA circuits are referred to as modulators and demodulators, they are, more correctly, multiplexers and demultiplexers.

Although both the upstream and downstream circuitry in FIG. 1 is indicated in the figure as being SCDMA multiplexed, the genus represented by FIG. 1 is broader than that. Specifically, any form of known time division or code division multiplexing circuitry can substituted for the SCDMA multiplexing and demultiplexing circuitry in FIG. 1. The principal feature which is believed by the applicants to be new is the elimination of CU upstream clock recovery circuitry by generating the CU downstream clock from the CU master clock to be phase coherent therewith, and recovering the downstream clock in the RUs and using it to generate the upstream carrier and clocks so as to be phase coherent with the CU master clock. The clock and carrier recovery circuitry for the upstream can then be eliminated in the CU. This is done by using locally generated clock and carrier signals generated from the CU master clock. Phase and amplitude errors in the QAM points transmitted by the RU are caused by channel impairments and the phase differences of each RU's clock and carrier from the corresponding locally generated signals in the CU caused by each RU's unique propagation delay to the CU. These errors are corrected by the slicer/rotational amplifier combination described in the PCT publications incorporated by reference herein.

Referring to FIG. 2, there is shown a block diagram of a system for synchronizing the clock rate of an upstream signal to a downstream signal having a different clock rate so long as the clock rates can be related by a ratio M/N where M and N are integers. Like the embodiment in FIG. 1, the embodiment of FIG. 2 enjoys the advantage that no upstream clock recovery circuitry is needed in the CU. The embodiment of FIG. 2 represents a subgenus of embodiments in the genus of embodiments represented by FIG. 1 all of which are characterized by use of a master clock in the CU to control generation of downstream and upstream clocks in both the CU and RU which are phase coherent with the CU master clock even though the downstream and upstream clocks are at different rates. In FIG. 2, this single master clock signal in the CU is on line 80 and is designated in equation (1) below as $4 \times F_{ds}$ where $F_{ds}$ is the downstream symbol rate. The symbol rate is the rate at which symbols are output on line 92 to mixer 94 (the downstream symbols on line 92 are equivalent to chips on line 109 in the RUs in MCNS downstream and other embodiments since in the upstream SCDMA transmissions each frame is comprised of three symbols each of which is comprised of a plurality of chips. Hopefully this slight terminology difference in the upstream and downstream use of "symbol" will not confuse the reader.

Two master clocks at 82 and 84 are shown each with different clock rates to illustrate embodiments where a downstream modulator 86 implements the MCNS standard and is capable of 64-QAM (clock 82) or 256-QAM (clock 84) modulation. Multiplexer 88 selects which clock's signal to couple to line 80.

The downstream modulator 86 can be any conventional modulator which is capable of receiving downstream data on line 90 and processing it to generate a plurality of symbols to be transmitted and modulating the data onto a downstream carrier generated by synthesizer using any known modulation scheme. Further, if downstream data from multiple sources needs to be kept separate or if downstream data from a single source needs to be directed to selected ones of a plurality of RUs either at different times or simultaneously as if a plurality of virtual channels existed, each virtual channel being between the CU and only one RU, then the downstream modulator 86 can also include any form of known multiplexing circuitry of the time division or code division multiplexing variety. For example, if data from multiple sources needs to be transmitted to each RU, time division multiplexing can be used where each source is assigned to a different timeslot and any RU needing data from a particular source listens to only the timeslot assigned to that source. Or, if all RUs need data from the same source simultaneously, or from specific sources each RU can be assigned to a unique spreading code and data to be transmitted only to that RU can have its spectrum spread with the spreading code assigned to that RU for the downstream.

The symbols generated on line 92 from the downstream data, regardless of whether or not they are multiplexed, are input to a mixer 94 which uses the symbols to control one or more characteristics of one or more transmitted carrier signals on shared transmission media 30. The mixer 94 receives one or more carrier signals on line 96 from synthesizer 98. The synthesizer uses a clock signal on line 100 derived from the CU master clock to generate the carrier(s) on line 96 so that the downstream carrier or carriers on line 96 are phase synchronous with the master clock signal on line 80.

The clock signal on line 100 has a frequency of 4 times the chip clock rate, but this is merely a design choice dictated by the structure of the preferred downstream modulator 86. The preferred downstream modulator is an MCNS modulator. The chip clock rate is the clock rate at which an upstream SCDMA modulator 107 in each RU outputs chips on line 109 to mixer 111. This clock signal on line 100 is derived from a clock signal on line 102 which has a frequency of 16 times the upstream chip clock rate by a divide by 4 counter 104.

The clock signal on line 102 at 16 times the upstream chip clock rate is derived from the CU master clock signal on line 80 by a phase lock loop (hereafter PLL) 106 according to an M/N relationship. The upstream clock which is phase coherent and which has the M/N frequency relationship to the downstream clock (where M and N are integers) can also be generated by a digital resampler. If the clock signal on line 80 is called $4{\times}F_{ds}$ and the clock signal on line 102 is called $16{\times}F_{chip}$, then the relationship between these two clock signals created by PLL 106 is:

$$16*F_{chip} = \frac{M}{N} *(4*F_{ds}) \quad (1)$$

where the frequency of clock $16*F_{chip}$ is a design choice dictated by the needs of a CU upstream SCDMA demodulator 108 and the clock signal $4*F_{ds}$ and is 4 times the downstream symbol clock rate $F_{ds}$, and where $F_{chip}$ is the upstream chip clock rate for SCDMA transmissions, and where M and N are integers determined by the desired relationship between the downstream symbol clock rate $F_{ds}$ and the upstream chip clock rate $F_{chip}$, and wherein for each different downstream symbol clock rate that is used, a different set of integers is used to produce the upstream chip clock rate, and wherein the values of M and N are constrained by PLL chip implementations (M and N can also be constrained in such a way to allows migration to a downstream demodulator which uses digital resampling for its timing recovery), and where the factor of 4 in clock frequency $4*F_{ds}$ is a design choice determined by implementation details of the downstream modulator 86.

The $16*F_{chip}$ signal on line 102 is coupled to the clock input of SCDMA demodulator 108 and is used to synchronize demultiplexing the upstream data. This works because the RUs recover the downstream symbol clock and generate their upstream chip clocks in phase synchronization therewith. The SCDMA upstream modulator 107 in the RU and the SCDMA upstream demodulator 108, in the preferred embodiments, can be any of the SCDMA circuitry embodiments disclosed in the PCT publications incorporated by reference herein (hereafter the PCT publication) or any other prior art CDMA circuitry which is compatible with the ranging processes described in the PCT publications and the offset calculation process described herein, if used. In addition, the upstream modulator 107 can include any conventional time division multiplexing or no multiplexing circuitry at all if there is only one RU. In the case where there is only one RU, the upstream modulator can be any conventional digital data transmitter using any conventional modulation scheme, the novelty being the use of an upstream carrier and clock which are generated to be phase synchronous with a master clock in the CU from recovered downstream clock signals which are phase synchronous with the master clock in the CU.

Detection of the upstream SCDMA QAM modulated data and conversion to a baseband signal is carried out by mixer 112 using a carrier on line 116 generated by synthesizer 114 from the clock signal on line 100. Since the clock signal on line 100 is phase coherent with the master clock signal on line 80, the carrier on line 116 will be phase coherent with the CU master clock. Since the RUs generate their upstream carriers from the recovered downstream symbol clock, and since the downstream symbol clock is phase coherent with the CU master clock, the upstream carrier will also be phase coherent with the CU master clock.

To recover the upstream data in the CU SCDMA demodulator with a low error rate, frame synchronization or minislot frame boundary synchronization must exist, and corrections must be made for phase and amplitude errors in the transmitted constellation points caused by channel impairments and differences of propagation delay for each RU. Frame or minislot boundary synchronization can be achieved by the ranging processes described in the PCT publications for SCDMA downstreams or by the 802.14 ranging process or the ranging process described in FIG. 23 in minislot environments such as 802.14 or MCNS systems. Frame or minislot boundary synchronization means that a proper offset is determined for an RU such that when it transmits a frame or minislot of data having a particular number, that frame or minislot will arrive at the CU with its boundaries aligned in time with the boundaries of the same number frame or minislot in the CU. Phase and amplitude errors in the constellation points from each RU can be corrected using the slicer error/rotational amplifier loop inside the CU SCDMA upstream demodulator described in the PCT publications and shown in FIG. 24.

Figure 24:
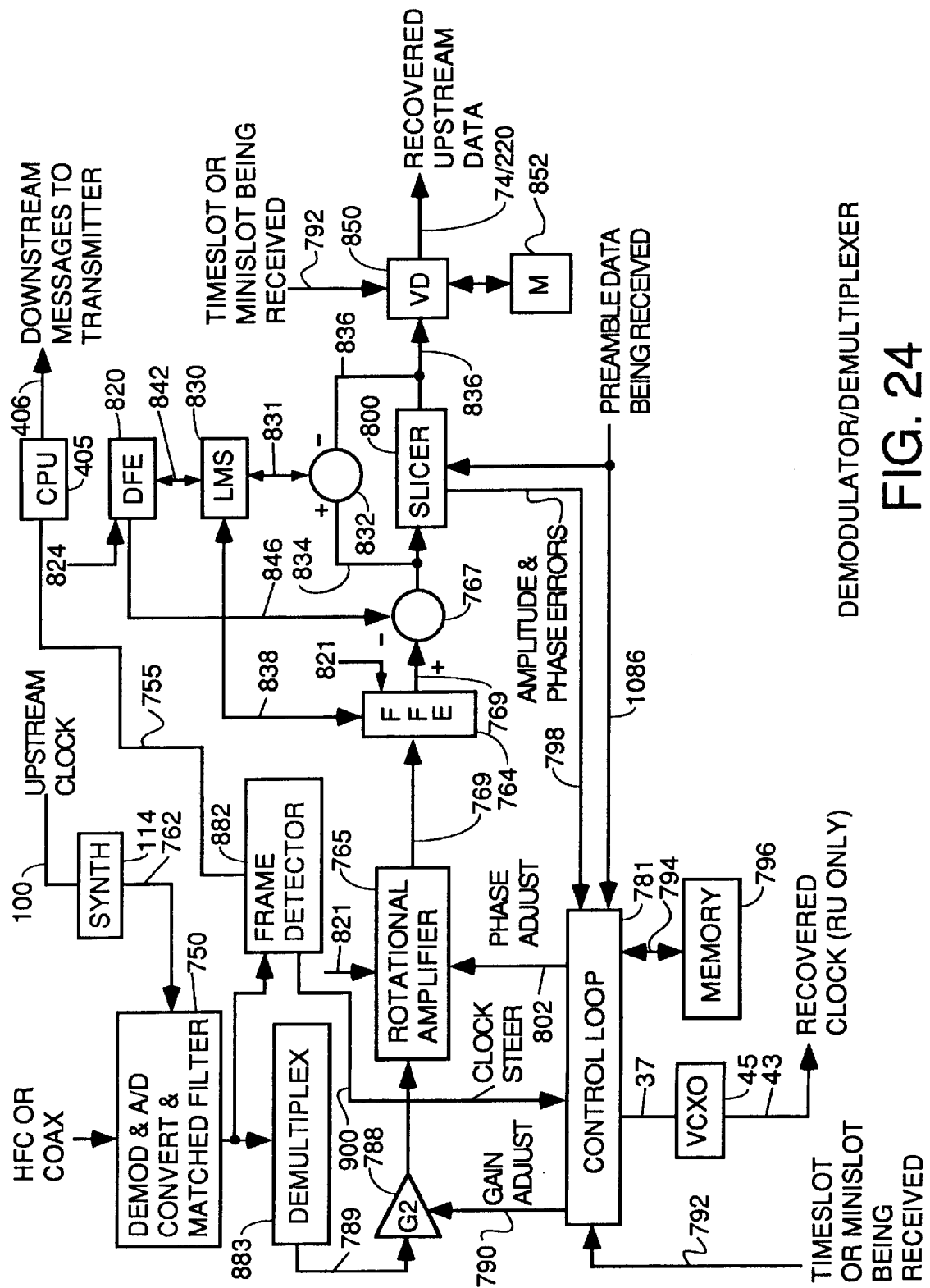
FIG. 24 is a block diagram of a demultiplexing receiver which can be used to receive multiplexed upstream or downstream data in an 802.14 or MCNS or other system and which is capable of ranging and training.

Returning to the consideration of the embodiment of FIG. 1, the control signals on line 120 in FIGS. 1 and 2 are intended to symbolize either the slicer/rotational amplifier circuitry described in FIG. 24 or an alternative method of changing the phase and amplitude of the local carrier signals on line 116 to match each RU's signals during that RU's chip times (corresponding to assigned minislots and corresponding assigned codes) so as to eliminate the phase and amplitude errors.

In some embodiments, the upstream modulator 107 is an SCDMA modulator described in the PCT publications incorporated by reference herein when the downstream is SCDMA. In another embodiment the RU SCDMA modulator and CU SCDMA demodulator are adapted for use with minislots with no SCDMA downstream such as the transmitter embodiment of FIG. 13 and the receiver of FIG. 24.

In alternative embodiments such as TDMA multiplexing or even no multiplexing in the upstream such as where there is only one RU, phase and amplitude correction can be done the same way as described with reference to FIG. 24 using the rotational amplifier, but the corrections for a particular RU are applied only during timeslots when data from that RU is being received.

In the alternative embodiments where no slicer/rotational amplifier is used and synchronous detection is used, phase and amplitude corrections specific to each RU is applied via signals on bus 120 to the locally generated upstream carrier on line 116. Phase adjustments of the local CU upstream carrier on line 116 can be accomplished using a variable delay line. Amplitude adjustments can be made by a scaling amplifier.

The RU upstream carrier is phase coherent with the CU master clock by virtue of being generated from the recovered downstream clock. In each RU, a synthesizer 117 generates on line 119 two upstream carriers having the same frequency but separated in phase by 90 degrees (the upstream carrier frequency is different than the downstream carrier frequency so that traffic in the two directions may be separated by known FDMA techniques). These two carriers are also phase coherent with the CU master clock signal on line 80 because they were generated from a clock signal on line 121 in each RU which was generated from the recovered downstream symbol clock, which itself is phase coherent with the CU master clock signal on line 80. These two carriers are used to QAM modulate the chips output on line 109 by SCDMA modulator 107. Circuitry in SCDMA demodulator 108 generates an amplitude and phase correction signal on line 120 for each RU based upon slicer errors detected during the transmission of known preamble data by each RU prior to transmitting its payload data. These slicer errors are used to generate amplitude and phase correction error signals for each RU on bus 120. These error signals are used by the synthesizer 114 to adjust the local carrier signal on line 116 to correct for amplitude and phase shifts in each QAM point caused by channel impairments on shared media 30 and differing propagation delays as each QAM constellation point is transmitted from each RU to the CU.

In the preferred embodiment, the master downstream symbol clock is recovered in the RUs and used to transmit data upstream. Upstream payload data transmissions are preceded by transmission of known preamble data. The preamble data from each RU is used by circuitry in the CU SCDMA demodulator 108 to generate an amplitude and phase error correction factor on bus 120 for that RU. The signals from that RU are then demodulated using the local carrier on bus 116 adjusted for phase and amplitude errors caused by channel impairments and latency with the local carrier on line 116 being phase coherent with the CU master clock. Upstream data from that RU is demultiplexed using the CU master clock adjusted in phase to be phase coherent with upstream chip clock.

Phase and amplitude errors in the detection process caused by latency and channel impairments affecting each RUs transmissions are eliminated or reduced by using the phase and amplitude correction factors developed for that RU from its preamble data. Thus, there is no need for continuous tracking loops in the CU receiver to recover the clock and carrier used by each RU to transmit its data.

This single master carrier and master clock concept and the frame synchronization provided by the ranging process to be described below are useful in any form of bidirectional digital data distributed communication system regardless of the form of encoding, multiplexing or modulation used. Further, the improved throughput and lower error rates provided by the equalization and power alignment processes taught in the PCT publication incorporated by reference herein are also useful in any form of bidirectional digital data distributed communication system regardless of the form of encoding, multiplexing or modulation used. Examples of the types of multiplexing that can be used in such systems are CDMA, TDMA, inverse Fourier, DMT or any other system where orthogonal signals are used to encode each separate channel of data from a source such as sine and cosine signals etc.

In the RU, to receive the downstream signals, a mixer 130 demodulates the signal from shared media 30 using a local carrier on line 132. The local carrier is generated to be phase coherent with the master clock signal on line 80 in the CU by a synthesizer 134 from a clock signal on line 121 which has a frequency $4 \times F_{chip}$. This clock signal on line 121 is generated by a divide by 4 counter 134 which receives the output signal of a PLL 136 which is identical to PLL 106 in the CU. This PLL generates a clock signal on line 115 which is $16 \times F_{chip}$ and phase coherent with the recovered master clock signal $4 \times F_{ds}$ (4 times the downstream symbol rate) on line 138. The upstream clock which is phase coherent with the downstream recovered clock and which has the M/N frequency relationship to the downstream clock (where M and N are integers) can also be generated by a digital resampler. This clock signal on line 138 is generated by a VCXO 140 which receives a clock steering signal on line 142 from conventional clock recovery phase detector circuitry in downstream demodulator 144.

A clock slip detector has one input coupled to receive a clock signal equal to 4 times the downstream recovered symbol clock on line 138 and another input coupled to receive the synthesized upstream clock signal equal to 16 times the chip clock on line 115. The clock slip detector determines when slip of more than a predetermined amount has occurred between the two clock signals in the manner described separately below, and, when slip has occurred, generates an interrupt signal to the MAC layer process on line 212. This cause the MAC layer process to shut down the upstream transmitter of this RU and to perform a synchronization loss recovery routine to force the RU to reestablish synchronization. The details of the clock slip detector are described below in a separate section.

The downstream demodulator outputs recovered downstream data on bus 146. The downstream demodulator 144 can be any conventional demodulator and downstream data recovery circuit which includes any necessary conventional demultiplexing circuitry dependent upon whether the downstream data is multiplexed and what type of multiplexing is used.

The use of PLL 106 in the CU synchronizes the downstream and upstream clocks. The clock recovery circuit in each RU synchronizes the recovered downstream clock on line 138 to the downstream clock on line 80 in the CU. The PLL 136 synchronizes the upstream recovered clock signals on lines 115 and 121 to the recovered downstream clock on line 138. Since each of these RU clock signals are synchronized in phase to the CU master clock, all upstream recovered clock signals on lines 121 and 115 in each RU are synchronized to each other.

Upstream Frame Alignment

The second point of novelty disclosed herein is a way to speed up the iterative ranging process described in the PCT publications by making an initial offset calculation before starting the ranging process thereby reducing the number of iterations. The circuitry and process described herein for transmitting timestamp data downstream from the CU (hereafter the timestamp invention) are used to replace the transmission of framing data downstream by the CU. The timestamp data is used to develop an initial estimate of the proper position for the RU upstream kiloframe boundaries relative to the CU kiloframe boundaries to achieve proper frame alignment prior to starting the iterative ranging process thereby speeding it up greatly. This process also works in the 802.14 and MCNS environments where no kiloframe boundaries exist but minislot boundary alignment and superframe boundary alignment must be maintained on the upstream.

An additional point of novelty is that the circuitry and process described for transmitting timestamp data downstream from the CU (hereafter the timestamp invention) allows the RUs to align their upstream frame and kiloframe boundaries to CU upstream frame and kiloframe boundaries even if the CU is not transmitting frames or kiloframes downstream as is the case with MCNS downstream circuitry and is not transmitting frame alignment data downstream for the use of the upstream SCDMA circuitry.

Of course the timestamp invention described below also works with TDMA or SCDMA downstreams where there are frames and kiloframes transmitted downstream regardless of whether the CU aligns its upstream SCDMA frame and kiloframe boundaries with the downstream frame and kiloframe boundaries.

Regardless of what type of downstream circuitry and multiplexing protocol is in use, if SCDMA is to be used for the upstream there remains an accounting problem that must be dealt with. The CU assigns orthogonal codes to the RUs for use during specific numbered frames of its upstream frame and kiloframe count. This means that the CU must keep an upstream frame and kiloframe count regardless of whether or not there are frames and kiloframes being transmitted in the downstream. This upstream frame count is required because the CU is expecting to get data from those RUs using the assigned codes during the specific numbered frames during which each code was assigned. The RUs upstream frames and kiloframes are not aligned with the CUs frames and kiloframes when they first power up. Therefore before they have any hope of being properly demultiplexed by the CU, each RU must align its upstream frame and kiloframe boundaries with the CU's upstream frame and kiloframe boundaries such that each RU's frame 100 arrives with its frame boundaries aligned in time with the CU upstream frame 100 boundaries. The timestamp invention deals with this problem for systems where no frame and kiloframes or CU frame or kiloframe boundary information is transmitted downstream. The timestamp invention described herein can be substituted for the frame synchronization and CU kiloframe information transmitted in the CU pilot channel and the CU downstream barker codes and circuitry to deal with both these types of information in the parent references. However, it is especially useful in systems where the downstream is any system which has a different downstream clock rate than the upstream SCDMA chip clock rate (so long as the upstream and downstream clocks or some multiples thereof are related by the ratio of integers M/N, i.e., are phase synchronous) and where no barker codes or kiloframe information in a pilot channel is transmitted downstream from the CU. Basically, the timestamp invention described below substitutes timestamp messages in the downstream for the barker codes and synchronization and kiloframe marker information in the CU pilot channel to establish a CU reference from which the RUs can get their upstream SCDMA frame and kiloframe boundaries aligned in time with the CU's upstream frame and kiloframe boundaries.

The CU arbitrarily establishes its upstream frame boundaries and kiloframe boundaries when it is first powered, and this is true whenever there is an SCDMA upstream regardless of whether or not the downstream has frames and kiloframes. Thus, even in systems where there are no frames and kiloframes in the downstream which are the same size as the frames in the upstream or no frames at all such as MCNS systems, frame alignment of RU upstream frames at the CU with each other is still important. That is, for the upstream SCDMA stream to have large throughput and allow multiple RUs to transmit simultaneously but multiplexed by different, orthogonal spreading codes without interfering with each other, it is necessary for the frame and kiloframe boundaries of each RU to be aligned in time at the CU regardless of the distance of that RU from the CU. In systems where the downstream data has frames and kiloframes, the RU data may also be aligned with the CU frame and kiloframe boundaries. In the system described in the PCT publications incorporated herein, RU frames were aligned in time with each other and with the CU downstream frame boundaries by a brute force trial and error ranging process wherein a transmit frame timing delay value was continually incremented until a value was found which resulted in frame boundary alignment with the frames from all other RUs of a frame launched from the RU at the end of the delay. Two problems arise with that process where the downstream has no gaps. First, there are no downstream barker codes the receipt time of which serves as reference from which the variable delay is measured. Second, the repeated iterations take up precious processing time of both the CU and RU. Therefore, it is necessary to establish a CU reference time in each RU to replace the downstream barker codes, and it is helpful to make a preliminary estimate of the offset of the RU kiloframe boundaries from the proper alignment. Offset is the amount of misalignment in time at the CU of an RU upstream frame boundary from the time of arrival of a frame boundary of the same number frame from an RU that is properly aligned. RU frames have numbers and are organized into kiloframes. Each RU is assigned one or more timeslots in a TDMA stream which is input to the SCDMA modulator and is assigned a unique orthogonal spreading code(s) to use during the assigned timeslot(s), but those assignments apply to specific frames since, in the preferred embodiment, the assignments of which codes to use during various frames changes. In the preferred form of SCDMA modulator, the data in the TDMA stream timeslots is then interleaved, randomized, Trellis encoded and has its spectrum spread using the assigned orthogonal spreading codes for the frame being constructed. As mentioned above, it is important to properly demultiplexing the data using the transpose of the code matrix used to spread the spectrum of the data that the CU being using the same codes to despread the data that the RUs used to spread the spectrum during specific frames, and it is important that each RU frame arrives aligned with each other RU frame to prevent intersymbol interference from reducing the number of RUs that can simultaneously transmit and reducing the data throughput rate.

Figure 3:
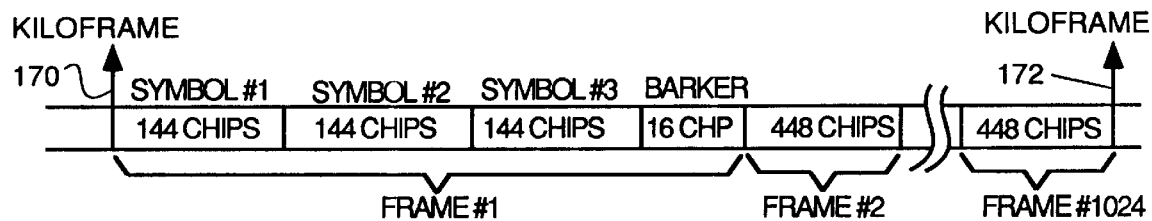
FIG. 3 shows the structure of the SCDMA upstream waveform.

FIG. 3 shows the structure of the SCDMA upstream waveform. There are 1024 frames in each kiloframe. The kiloframe boundaries are shown at 170 and 172. Each frame is comprised of three symbols, each having 144 chips, followed by a gap comprised of an interval 16 chip times long. A chip is a collection of 4 bits. The total length of each frame is 448 chips.

Figure 4:
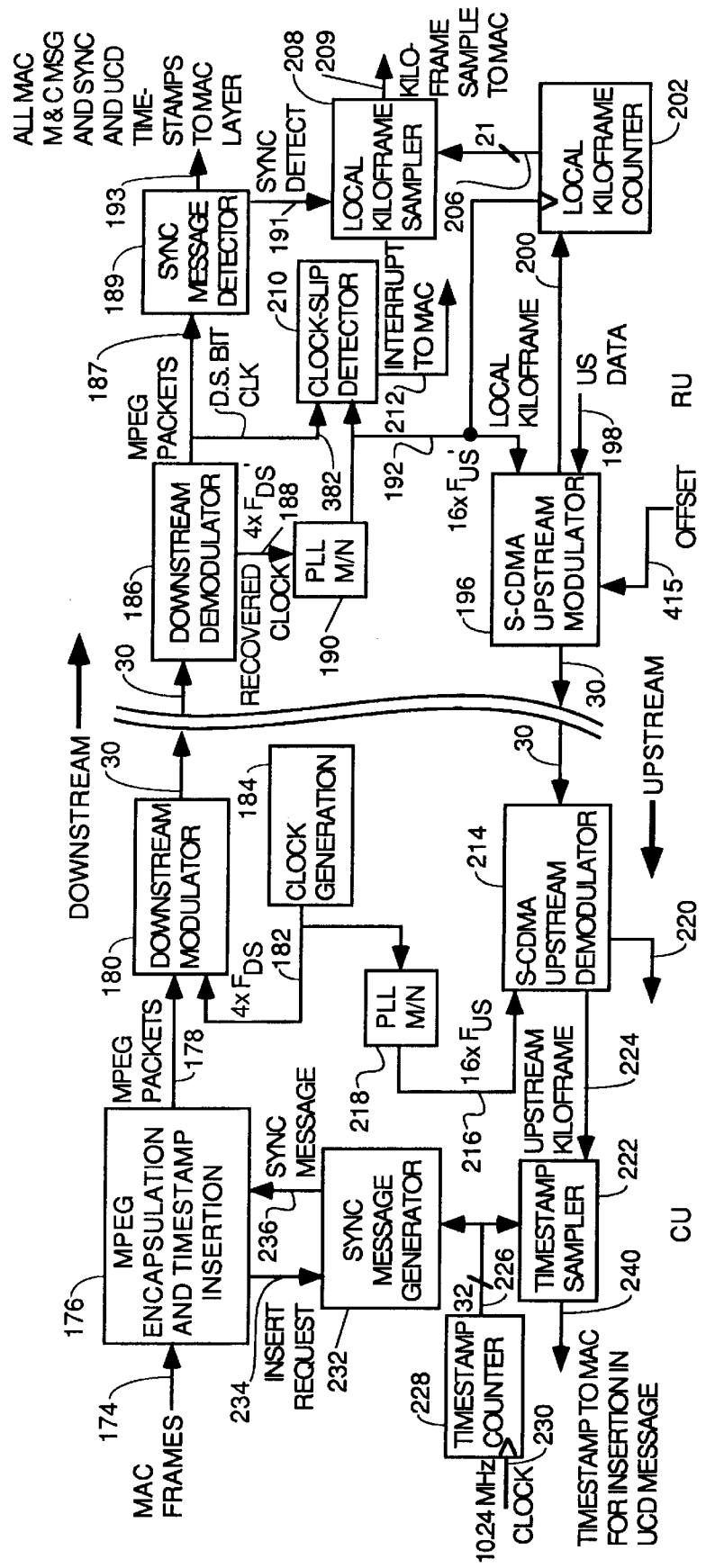
FIG. 4 is a block diagram of the preferred embodiment of a system capable of determining an estimate of the RU frame alignment offset using timestamp messages in the downstream. The system of FIG. 4 also uses a single master clock in the CU to synchronize the downstream clock and carrier in phase coherent relationship to the upstream clock and carrier even though the downstream and upstream clocks are at different rates.

The creation of a CU clock reference which is used to replace the downstream barker code is accomplished, in the preferred embodiment, using a timestamp counter in the CU and sampling the timestamp counter at various times and sending the sample downstream to the RUs. FIG. 4 is a block diagram of the preferred embodiment of a system capable of determining an estimate of the RU frame alignment offset using timestamp messages in the downstream. The system of FIG. 4 also uses a single master clock in the CU to synchronize the downstream clock and carrier in phase coherent relationship to the upstream clock and carrier even though the downstream and upstream clocks are at different rates. In the specific example of FIG. 4 used to illustrate the type of circuitry needed to perform the offset calculation algorithm, the downstream circuitry is an MCNS system or time division multiple access system using MPEG packets developed from MAC layer frames.

The MAC frames arrive on bus 174 where they are broken down into MPEG packets and timestamps are inserted at the times to be described below in discussing the algorithm. The MPEG packets are output on bus 180 to a conventional MCNS or TDM modulator 180. This modulator receives a clock signal on line 182 which is four times the downstream clock rate $F_{ds}$ and which is derived from CU master clock 184. The downstream multiplexer/modulator 180 uses the clock signal on line 182 to synchronize the downstream multiplexing process and symbol generation and also generates the downstream carrier from the clock signal on line 182. The downstream modulator 180 outputs a carrier signal on shared media 30 which is modulated with the symbols generated from the MPEG frames. The manner in which the symbols are generated from the MPEG packets is a standard and is well known in the art as are TDMA multiplexing systems.

The downstream signals are demodulated and demultiplexed by a conventional demodulator and demultiplexer 186 in the RU hereafter referred to as the downstream demodulator. The downstream demodulator outputs the recovered MPEG packets at a MPEG packet interface on bus 187. This bus contains the recovered downstream bits and a recovered downstream bit clock. The downstream bit clock is coupled to a clock slip detector 210 via line 382.

The recovered downstream MPEG packet bits are coupled via bus 187 to a sync message detector 189 which functions to. detect sync messages and UCD messages containing timestamps and all other MAC layer management and control messages inserted into the downstream data. A sync message is a 34 byte message which must be sent at least every 200 milliseconds and which contains a sample of the CU timestamp counter which is counting the ticks of the CU master clock. This master clock establishes the sampling rate. A UCD message is a message which may be sent anytime but which contains a timestamp counter sample taken at a kiloframe boundary of the CU.

The sync message detector 189 outputs a Sync Detect signal on line 191 and outputs the management and control messages to the MAC layer processes via line 193. The MAC layer processes recognize the sync and UCD messages and extract the timestamps contained in the sync and UCD messages for use in the timestamp algorithm. The downstream demodulator also recovers the downstream clock signal in a conventional manner and supplies it on line 188 to a PLL 190. This PLL uses the M/N ratio previously described to generate a clock signal on line 192 which is 16 times the upstream chip clock rate. The upstream clock which is phase coherent with the downstream recovered clock and which has the M/N frequency relationship to the downstream clock (where M and N are integers) can also be generated by a digital resampler.

The clock signal on line 192 is used by an upstream SCDMA multiplexer and modulator 196 (hereafter the upstream modulator) to code division multiplex upstream data received on bus 198. The preferred species of SCDMA transmitters use carrierless modulation and Hilbert transform filters to select orthogonal 6 mHz spectra in the upstream frequency band from the spectra generated by the CDMA spreading circuitry. However, in alternative embodiments where actual carriers are used, the upstream modulator also generates two orthogonal upstream carriers from the clock signal on line 192 and uses the chips and symbols generated therein to QAM modulate these two carriers. The two carriers have the same frequency but separated in phase by 90 degrees. The resulting modulated signals are output on shared media 30 and separated from the downstream signals by frequency division multiplexing. The upstream modulator 196 outputs a kiloframe marker signal on line 200 to a local kiloframe counter 202 which resets the counter at the beginning of each new kiloframe. This counter also receives the 57.344 mHz clock signal on line 192 which is phase locked to the downstream clock rate and phase locked to the $16 \times F_{us}$ locally generated upstream clock on line 216 in FIG. 4. The kiloframe counter outputs a 21 bit signal on bus 206 which is sampled by a local kiloframe sampler circuit 208 each time the Sync Detect signal on line 191 is activated.

An optional clock slip detector circuit 210 receives the recovered downstream bit clock on line 382 and the upstream clock signal on line 192 synthesized from the recovered downstream clock and determines if any clock slip between the upstream and downstream clocks have occurred. If the upstream clock slips more than 35 nanoseconds, misalignment of the codes (frame boundaries) from that RU will occur in the CU and cause intersymbol interference. If a clock slip occurs, the RU which has slipped has its transmitter shut down by an interrupt signal to the media access control (MAC) layer processes to prevent ISI generated by that RU's slipped alignment from interfering with transmissions from other RUs. The structure and operation of the clock slip detector will be described more fully below.

In the preferred embodiment, the SCDMA upstream modulator 196 has the structure of any of the embodiments disclosed in the PCT publications incorporated by reference herein.

The upstream signal is received by an SCDMA demultiplexer and demodulator 214 (hereafter upstream demodulator). The upstream demodulator receives a clock signal on line 216 which is 16 times the upstream chip clock rate. Inside upstream demodulator 214, this clock signal on line 216 is adjusted in phase and amplitude for each RU's signal using known preamble data transmitted by each RU and slicer error signals in the manner described above with reference to FIGS. 1 and 2. A local upstream carrier which is adjusted in phase and amplitude is generated from the clock signal and used to demodulate the incoming signals and they are then demultiplexed and detected using the locally generated upstream chip clock. The clock signal on line 216 is generated by a PLL 218 using the M/N ratio described above from the master clock signal on line 182. The upstream clock which is phase coherent with the downstream clock and which has the M/N frequency relationship to the downstream clock (where M and N are integers) can also be generated by a digital resampler. The recovered upstream data is output on line 220 after being reassembled into the TDMA stream in which it arrived on bus 198 in the RUs.

The upstream demodulator also outputs an upstream kiloframe signal on line 224 to a timestamp sampler 222. This timestamp sampler receives a 32 bit timestamp count on bus 226 from a timestamp counter 228 which is continuously counting a 10.24 mHz clock signal on line 230. The count on bus 226 is also supplied to a sync message generator 232. The sync message generator receives insertion request signals on line 234 and generates a sync message including the timestamp count on line 236. This sync message is received by the MPEG encapsulation and timestamp insertion circuit 176 and inserted in the downstream data stream at times and in a manner to be described below in connection with the discussion of the circuit of FIG. 8. Either the circuit of FIG. 8 or its simplified form described below is preferred for the MPEG encapsulation and timestamp insertion circuit 176 to achieve low jitter to improve the accuracy of the RU kiloframe offset calculation described below in connection with the discussion of FIGS. 6 and 7. The timestamp sampler circuit 222 also outputs the timestamp on line 240 to the MAC layer processes for inclusion in a UCD message the purpose of which will be explained below.

Figure 5:
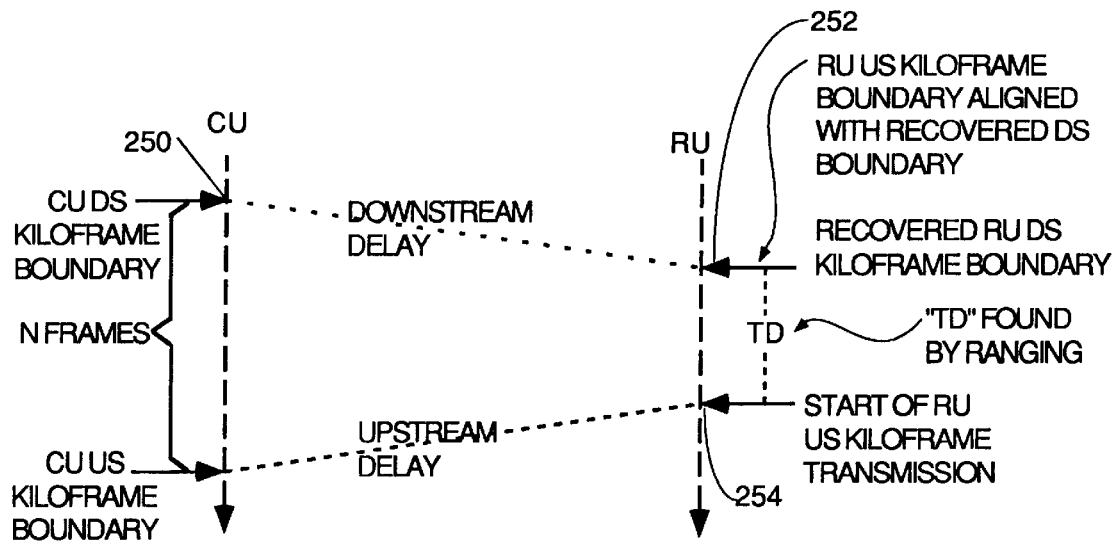
FIG. 5 is a diagram of the ranging situation used in the systems taught in the parent applications and the PCT publications which are incorporated herein by reference.

FIG. 5 is a diagram of the ranging situation used in the systems taught in the parent applications and the PCT publications which are incorporated herein by reference. These systems use SCDMA downstream signals having the same kiloframe and frame structure as the upstream SCDMA signal structure shown in FIG. 3. FIG. 5 shows the effect of propagation delays in causing a kiloframe boundary offset between the upstream and downstream kiloframe boundaries. Point 250 represents the CU downstream (DS) kiloframe boundary. Data on a pilot channel transmitted downstream causes a frame counter in the RU to detect the downstream kiloframe boundary at point in time 252 which is offset by the downstream propagation delay from time 250. The RU upstream (hereafter sometimes abbreviated US) kiloframe boundary is aligned in time with the recovered downstream kiloframe boundary time 252.

The downstream signals from the CU in the systems of the parent application have gaps between frames. During every gap, a barker code is transmitted, and these barker codes are detected by the RUs to determine the CU frame boundary positions. The RUs establish their downstream frame boundaries using this information. Frame numbering information including the location in time of the kiloframe boundaries is transmitted downstream by the CU in the pilot channel data on code 0. This pilot channel data is bpsk modulated and is applied to a slicer (not shown) in a frame detector/frame sync and kiloframe detector circuit (not shown) in the SCDMA downstream demodulator (not shown). A pseudorandom number sequence generator exists in the RUs which generates a pseudorandom number sequence from the pilot channel data which is supposed to match the synchronization sequence data encoded in the pilot channel data. The CU downstream kiloframe marker is encoded in the pilot channel data and is detected in the RU when the pseudorandom number generator (a feedback shift register) contains a predetermined sequence therein which is decoded to generate the CU downstream kiloframe marker. The RU can then align its downstream kiloframe boundaries with the CU downstream kiloframe boundaries although there will be an offset of N frames.

After this downstream synchronization, the RUs align their upstream kiloframe boundaries to coincide with its downstream kiloframe boundaries which are aligned with the CU downstream kiloframe boundaries but offset by the downstream propagation delay. Since the CU upstream frame boundaries are aligned in time with the CU downstream kiloframe boundaries, the act of aligning each RU's downstream kiloframe boundaries with the CU downstream kiloframe boundaries at time 252 effectively aligns the RU's upstream kiloframe boundaries with the CU upstream kiloframe boundaries based upon an indirect observation of those CU upstream kiloframe boundaries contained in the downstream pilot channel data kiloframe markers (but offset by N frames). The N frame offset represents a transmit frame timing delay value TD derived by the ranging process. The value of TD is the delay relative to the recovered RU downstream kiloframe boundary time at 252 and the start of transmission of the next RU upstream kiloframe shown at time 254 needed to achieve upstream frame alignment. This value is different for each RU.

After recovering the RU downstream kiloframe boundary at 252, each RU must determine its value for TD to compensate for round trip cable plant delay. This is done by performing the ranging process described in detail in the PCT publications incorporated by reference herein. If a previous value for TD has been stored, this value is used as a starting point and should be very close to the final value. In the ranging process, barker codes are transmitted upstream at different values of delay TD until a value is found which causes the upstream barker code to arrive in the middle of a CU upstream frame gap.

When an MCNS or TDMA downstream is used, the downstream data does not contain the framing information such as the CU downstream kiloframe marker. However, the ranging process is still performed by the RUs at powerup to develop a value for TD which achieves upstream frame synchronization for the SCDMA upstream. In order to be able to use this value for TD, the RU must have a mechanism which provides a fixed time reference to the CU upstream receiver so as to enable establishment of an initial upstream kiloframe reference. This mechanism involves CU timestamp messages sent in the downstream TDMA or MCNS data.

The CU timestamp counter 228 is a key circuit for achieving an initial upstream reference. This timestamp counter generates timestamps which are 32 bits wide and which increment at the 10.24 mHz rate of the timestamp clock. The timestamp clock does not have to be synchronized with the CU master clock 184 or the upstream chip clock signal derived therefrom, but it can be in some embodiments or can even be the same clock in some circumstances.

Figure 6:
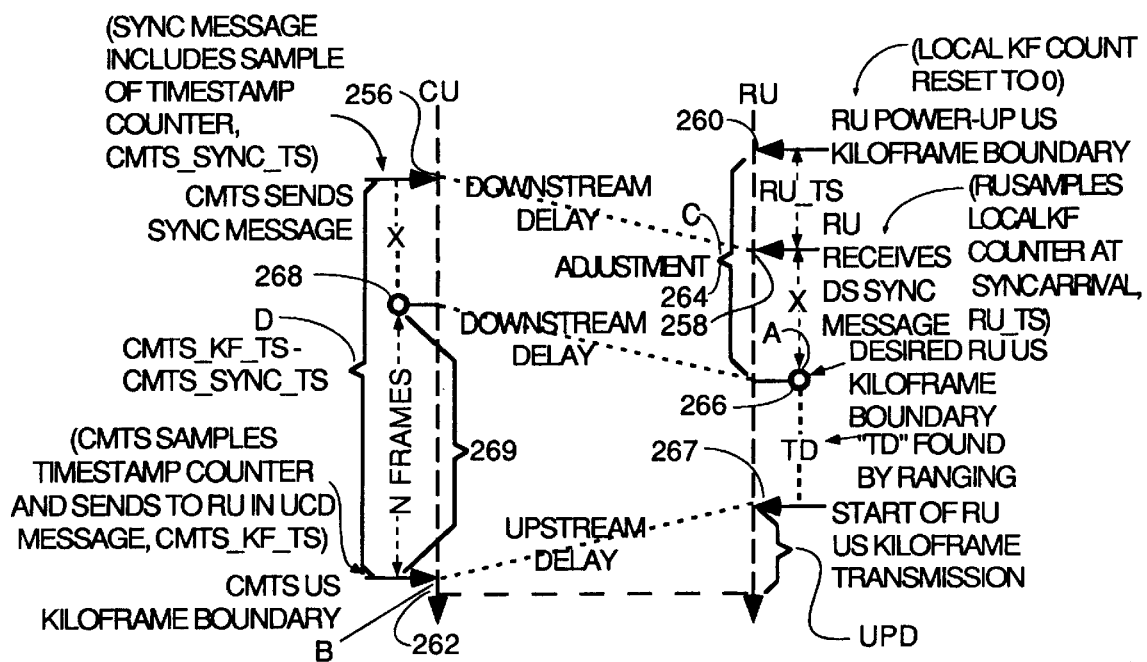
FIG. 6 shows how the CU timestamps in sync messages and UDP messages are used to establish a reference to the CU upstream kiloframe frame boundaries from which the RU can shift its upstream kiloframe boundary for proper initial alignment.

FIG. 6 shows how the CU timestamps in sync messages and UCD messages are used to establish a reference to the CU upstream kiloframe frame boundaries from which the RU can shift its upstream kiloframe boundary for proper initial alignment. FIG. 6 also shows a preferred messaging protocol which is used to calculate the offset of the RU from the correct upstream kiloframe alignment. There follows a detailed set of equations that describe the required relationships precisely. For readers who are not mathematically inclined or who do not understand the significance of the equations upon first reading, there is a plain english description of what is going on in the section below marked SUMMARY OF THE OFFSET CALCULATION FOR A FRAME ALIGNMENT PROCESS.

The first step in the protocol is to send a downstream sync message at time 256. The first sync message contains a sample of the timestamp counter 228 in the CU at the time the Insert Request signal on line 234 is activated. This sync message timestamp is called CMTS_SYNC_TS in the equations below. A sync message is sent downstream periodically with less than 200 milliseconds between adjacent sync messages. The sync message should have a relatively low latency jitter, but absolute transmission delay is unimportant as long as it does not change by more than plus or minus 500 nanoseconds. At the precise instant this sync message is detected in the RU at time 258 by sync detector 189 in FIG. 4, the RU takes a sample of its own local kiloframe counter 202. This is accomplished by activation of the Sync Detect signal on line 191 which causes local kiloframe sampler 208 to sample the bits on bus 206 from the output of the local kiloframe counter 202. The local kiloframe counter increments every ¹⁄₁₆th of a chip time and is reset to zero at every RU upstream kiloframe boundary by activation of the Local Kiloframe signal on line 200. This local kiloframe counter sample is RU_TS in the equations below.

When the RU first powered up, it established an arbitrary upstream kiloframe boundary at time 260. At that time, the local kiloframe counter 202 was reset to zero by activation of the Local Kiloframe signal on line 200 in FIG. 4. This process establishes a reference to the CU timestamp counter in the CU and establishes the time offset between the RU kiloframe boundary and the time of the first timestamp message from the CU.

The CU (referred to in FIG. 6 as the CMTS) also samples its timestamp counter 228 at each upstream kiloframe boundary at time 262 in FIG. 6. This is accomplished by activation of the Upstream Kiloframe signal on line 224 by the SCDMA upstream receiver 214. This second timestamp sample is sent to the MAC layer processes via bus 240 in FIG. 4 and incorporated into a management and control message called a UCD message which is sent downstream to all RUs. The timestamp in this UCD message is called CMTS_KF_TS in the equations below.

When the RU receives this UCD message, it knows the elapsed time between the first sync message at time 256 in FIG. 6 and the CU upstream kiloframe boundary at 262 in FIG. 6, a quantity of time equal to the difference $$CMTS\_KF\_TS - CMTS\_SYNC\_TS \qquad (2)$$

The object of all this is to calculate the value of a time shift adjustment 264 in FIG. 6 between the original arbitrary RU upstream kiloframe boundary established at powerup at time 260 and a desired RU upstream kiloframe boundary at time 266. The desired RU upstream kiloframe boundary at time 266 is far enough in advance of the time of the CU upstream kiloframe boundary at time 262 such that:

$$A + TD + UPD = B \qquad (3)$$

where

A = time 266; and

TD = the value of TD found during the previous ranging process; and

UPD = the upstream propagation delay; and

B = equals the CU upstream kiloframe boundary time 262.

The adjustment value shown by bracket 264, labelled C, is equal to:

$$C = RU\_TS + X \qquad (4)$$

where

RU_TS is the value of the local kiloframe counter at the time 258 when the first sync message was received; and X = the unknown time value needed to complete the calculation of the adjustment value.

Equation (5) below shows how to calculate the unknown factor X to finish calculating the required adjustment C between the unaligned arbitrary RU upstream kiloframe time 260 and the desired RU upstream kiloframe boundary at time 266.

$$X = (CMTS\_KF\_TS - CMTS\_SYNC\_TS) * \text{timebase\_conversion\_factor} - (N*16*448) \qquad (5)$$

where

CMTS_KF_TS−CMTS_SYNC_TS is the number of CU timestamp counter clock ticks between time 256 in FIG. 6 of the first sync message and time 262 of the UCD message; and N*16*448 equals the number of RU kiloframe counter clock cycles in N frames and N equals the number of upstream frames between the time 268 and the CU upstream kiloframe boundary time 262, where time 268 is the time of the RU upstream kiloframe boundary minus the downstream propagation delay.

The timebase conversion factor in Equation (5) is the relationship between the CU timestamp clock frequency of approximately 10.24 mHz and the RU kiloframe counter clock frequency of approximately 57.344 mHz which is 16 times the upstream chip rate. If the CU timestamp clock and the RU kiloframe counter clock are synchronized in phase, then the timebase conversion factor is known and constant. However, this is not necessarily the case and is not the case in FIG. 4. Where the CU timestamp clock and the RU kiloframe counter clock are not synchronized in phase, in some scenarios, they could vary by 50 parts per million (PPM). A variation of one of these clocks by only 10 PPM would cause a calculation error of 5 upstream chips over a kiloframe. This is insufficient accuracy to meet initial frame alignment criteria. Fortunately, if the ratio of the clock frequencies between the CU timestamp clock and the RU kiloframe counter clock is not known precisely, it can be calculated to within 1 PPM by observing two successive CU kiloframe timestamps. The time between the two successive kiloframe timestamps (CMTS_KF_TS2 and CMTS_KF_TS1) will correspond exactly to an integer number of CU receiver kiloframe periods. Knowing the nominal ratio between the two clocks, it is a simple matter to figure out how many kiloframe periods the timestamps span and then calculate the actual ratio as follows. The timebase conversion factor is:

$$\text{timebase\_conversion\_factor} = \frac{\text{Num\_CU\_Kiloframes} * 16 * 448 * 1024}{CMTS\_KF\_TS2 - CMTS\_KF\_TS1} \quad (6)$$

where $$\text{Num\_CU\_Kiloframes} = \text{round}\frac{(CMTS\_KF\_TS2 - CMTS\_KF\_TS1)}{16 * 448 * 1024} \quad (7)$$

where the factor 16*448*1024 in both equations is the number of clock ticks of the 57.344 mHz RU local kiloframe counter clock (16 times the chip rate) which are in one upstream kiloframe where there are 448 chips in each upstream frame, and where the ratio 28/5 in Equation 7 is the ratio between 57.344 mHz and 10.24 mHz, and where CMTS_KF_TS2 and CMTS_KF_TS1 are the values of two consecutive CU timestamps received second in time and first in time, respectively.

All of that being said, it is clear from the foregoing equations and FIG. 6 that:

$$\text{adjustment} = \text{mod}(RU\_TS + X, 16 * 448 * 1024) \quad (8)$$

where mod(A,B)=A−B with a floor of A/B and 16*448*1024=the number of RU kiloframe counter clock cycles that are in one kiloframe.

The value of X might be some whole number of frames plus a fraction of a frame, but the desired adjustment is the fraction of a frame so the value of X is calculated modulo one kiloframe so if the answer is 3.4 kiloframes, X is 0.4. Further, since the SCDMA upstream modulator 196 works on a clock having a period equal to 1/16th of an upstream chip interval, the value of X modulo one kiloframe is converted to the number of 1/16th chip intervals that are in the value of X after it is calculated modulo one kiloframe.

Summary of the Offset Calculation in the Frame Alignment Process

What the above mathematical relationships mean in plain English is as follows. The quantity CMTS_KF_TS−CMTS_SYNC_TS in Equations (2) and (5) is the number of clock ticks of the CU timestamp clock between the sync message and the CU upstream kiloframe boundary which map to a larger number of clock ticks of the RU kiloframe counter clock. The RU kiloframe counter clock is going about 5 times as fast as the CU timesample clock, so a timebase conversion factor is needed since the adjustment needed will be expressed in terms of some number of clock ticks of the RU kiloframe counter clock which ticks 16 times during every upstream chip. The quantity CMTS_KF_TS2−CMTS_KF_TS1 in the timebase correction factor of Equation (6) is the number of ticks of the CU timestamp clock that occur over the number of CU upstream kiloframes that separate the timestamps of CMTS_KF_TS2 and CMTS_KF_TS1. Equation (7) is simply the integer number of CU kiloframes that separate the timestamps CMTS_KF_TS2 and CMTS_KF_TS1, i.e, the number of CU kiloframes that have elapsed during CMTS_KF_TS2−CMTS_KF_TS1 ticks of the CU timestamp counter clock. Therefore, timebase correction factor of Equation (6) is simply the number of ticks of the RU kiloframe counter clock which occur during the number of ticks of the CU timestamp counter clock over the number of CU upstream kiloframes in the interval CMTS_KF_TS2−CMTS_SYNC_TS1. This makes X in Equation (5) equal to the number of clock ticks of the RU kiloframe counter clock which equal the number of CU timesample clock ticks in the interval D in FIG. 6 minus the number of RU kiloframe counter clock ticks that occur during the N CU upstream frames in interval 269. Once X is known, the adjustment is a simple calculation of adding X to the quantity RU_TS which is equal to the time 260 when the first arbitrary RU kiloframe boundary occurs and the time 258 when the first sync message is received by the RU.

In the embodiment shown in FIG. 4, the 10.24 mHz clock is a free running clock which is not phase locked to the 16×$F_{us}$ (16 times the upstream chip rate) clock signal on line 216 or to the clock signal on line 182. In alternative embodiments, the above described timestamp algorithm can be simplified by generating the 10.24 mHz clock from the clock signals on one or the other of lines 182 or 216. Since, in the preferred embodiment, the RU local kiloframe counter clock is the 16×$F_{us}$ clock signal on line 192, which is phase locked to the clock signals on lines 182 and 216, the 10.24 mHz CU timestamp counter clock and the 57.344 mHz RU local kiloframe counter clock signals will be locked in phase to each other and will have a known timebase conversion factor which is equal to the integer ratio 28/5. This constant ratio can then be substituted for the timebase_conversion_factor in Equation (5) and the steps in the algorithm to calculate the variables defined by Equations (6) and (7) can be eliminated thereby simplifying the algorithm. If either or both of the CU timestamp counter clock on line 230 or the RU local kiloframe counter clock is free running such that the two clocks are not phase locked, then the timestamp algorithm still works, but the variables of Equations (6) and (7) must be calculated so that the exact ratio between the frequencies is known and the timebase conversion factor can be calculated for substitution into Equation (5). The ratio between the frequencies of the CU timestamp counter clock on line 230 or the RU local kiloframe counter clock need not be an exact integer ratio for the timestamp algorithm to work. An exact integer ratio is only necessary between the downstream clock and the upstream clock or some multiples of one or both so that the downstream and upstream clocks are maintained in phase lock. This phase locked relationship is necessary so that the CU can have the advantage of using its locally generated master clock to recover upstream data without the need for a PLL or other clock recovery circuitry to recover the upstream clock from the upstream data. The system according to the invention only needs to adjust the phase and amplitude of its locally generated carrier signal and adjust the phase of its locally generated upstream clock for each individual Ru based upon that RUs preamble data to cancel the effects of phase shifts and amplitude losses resulting from upstream transit time and channel impairments.

In alternative embodiments, the clock supplied to the local kiloframe counter 202 can be a free running clock instead of the phase locked clock on line 192. The clock supplied to local kiloframe counter can also have other frequencies, with the choice of frequency controlled by the degree of resolution desired in shifting the RU upstream kiloframe boundary after performing the timestamp algorithm described below. Likewise, the choice of 10.24 mHz for the free running clock on line 230 supplying the CU's timestamp counter 228 was chosen for compatibility with the MCNS standard, and it too can have other frequencies and be either free running or phase locked in other applications.

Figure 7:
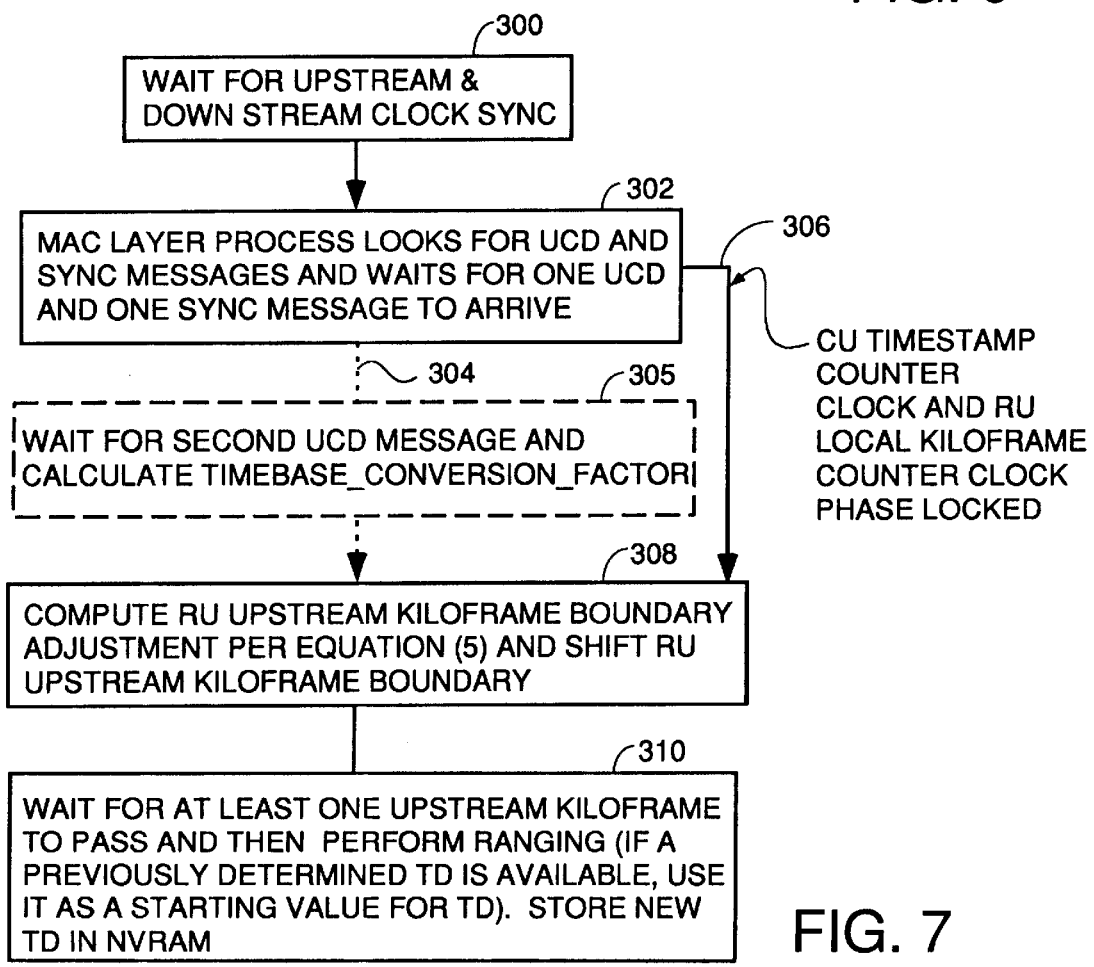
FIG. 7 is a flow chart for the process carried out by a microprocessor (not shown) which carries out the MAC layer process to perform the timestamp algorithm.

Referring to FIG. 7, there is shown a flow chart for the process carried out by a microprocessor (not shown) which carries out the MAC layer process to perform the timestamp algorithm. This microprocessor is coupled to receive the management and control messages on bus 193 and the local kiloframe sample data on bus 209 and use the timestamp data, local kiloframe counter samples and some or all of the equations defined above to calculate the RU kiloframe offset adjustment. Step 300 represents the process of waiting after powerup of the RU for downstream clock recovery and synchronization of the upstream clock and carrier signals generated therefrom to the recovered downstream clock. Step 302 is the process of carried out by the MAC layer of looking for UCD and sync messages in the management and control messages received in the downstream data and waiting until one UCD and one sync message has arrived.

The next step performed depends upon whether or not the CU timestamp counter clock is phase locked to the RU local kiloframe counter clock. If not, step 305 is performed next. If so, step 308 is performed next. Step 305 is the process of calculating the timebase_conversion_factor using Equations (6) and (7) after a second UCD message has arrived. Step 308 represents the process of computing the RU upstream kiloframe adjustment using Equation (5) and then shifting the RU upstream kiloframe boundary based upon the result. The timebase_conversion_factor used in the calculation of step 308 is either the timebase_conversion_factor computed in optional step 305 or the fixed, known timebase_conversion_factor when path 306 is taken from step 302 to step 308 because the CU timestamp counter clock and the RU local kiloframe counter clock are phase locked.

Step 310 represents the process of waiting for at least one upstream kiloframe to pass and then performing a brute force ranging process as described in the parent references to determine a new value for TD (TD is $T_d$ in the parent references). If a value for TD determined from a previous ranging process exists, that value is used as the starting value for TD in the first iteration. After a new TD is determined, it is stored in nonvolatile RAM.

Low Jitter Timestamp Insertion Algorithm

It is important for proper operation of the algorithm to adjust the RU upstream kiloframe alignment such that the timestamp messages have low jitter. Jitter is caused by insertion of timestamp messages such that they straddle MPEG packet framing information or other framing information. Complete elimination of straddling is not possible, but jitter is not caused if the straddle is the same every time the timestamp message is inserted.

A timestamp message is a plurality of bytes. MPEG packets have 4 byte headers that are inserted every 188 bytes and then collections of MPEG packets are encapsulated into forward error correction frames in MCNS downstream circuitry. If the timestamp message is inserted into the data stream at a time such that part of it is on one side of an MPEG packet header and another part is the other side and this same exact straddle does not happen each time the timestamp message is inserted, jitter results.

Jitter happens when the latency time from the time of transmission from the CU of a first timestamp message to its recognition by the sync message detector 189 in the RU is different for the first timestamp message than it is for a second timestamp message comprising the same number of bytes. Jitter happens when the timestamp messages are inserted by the MAC layer process at such times in the data stream to be transmitted downstream such that sometimes the timestamp messages straddle MPEG packet boundaries or FEC overhead bits and sometimes they do not. The jitter results from the insertion of overhead bytes and bits such as header information, FEC redundancy bits. etc. land someplace within the string of bytes that comprises the timestamp message. These overhead bits and bytes need to be stripped out by the downstream demodulator in the process of demodulating and detecting the FEC frames and reassembling the MPEG packets. This process of stripping out the overhead bits and bytes takes time in the RU. Further, since more bytes and bits need to be transmitted to transmit a timestamp message that has straddled an MPEG packet boundary or FEC overhead bits than in a case where the timestamp message is inserted at such a location in the data stream that no straddles result, it also takes longer to transmit the first timestamp message than the second timestamp message. Thus, it takes longer from the time of insertion of the first timestamp message which straddles to the time of detection in the RU by the sync message detector than it does in the case of a timestamp message which does not straddle. This difference in detection times is jitter because it is the time of arrival of the sync messages which triggers sampling of the local kiloframe counter 202 in FIG. 4. For example, if four sync messages are inserted exactly 200 milliseconds apart, but the latency time to a particular RU is different for each because some straddle others do not, the number of local kiloframe counter clock ticks between RU samples of the local kiloframe counter 202 at the time of detection of each of the four sync messages will be different. This degrades the accuracy of the calculation of the RU upstream kiloframe adjustment because the purpose of the timestamp algorithm is to tie the CU timestamp counter to the RU local kiloframe counter. If the apparent downstream delay changes because of variable latency caused by straddling, then uncertainty arises with regard to what count was in the CU timestamp counter at each sample of the RU upstream kiloframe counter, i.e., jitter in the value of RU_TS arises.

Since the timestamp algorithm is performed only once at each powerup time and only one sync message that causes sampling of the RU kiloframe counter is sent during the timestamp algorithm, there is no variation or jitter because there was only one sample. However, this single sample causes an initial value of RU_TS to be calculated which results in a calculation per Equation (5) of an adjustment. This is followed by a determination of the proper value for TD by ranging and this value for TD is stored for use in the next ranging process. The jitter problem arises on subsequent powerups of the RU modem. If the sync message sent during the second powerup suffers a different latency than the sync message sent during the first powerup, a different value for RU_TS will result which causes a different adjustment to be made. Then when the TD from the first powerup ranging process is called up as the initial starting point for ranging during the second powerup, it will be wrong and the ranging process will take longer to conclude although a new correct value for TD will eventually result. Thus, the jitter does not cause the timestamp algorithm to break, but it does slow down the process of initializing the system by slowing down the ranging process.

The basic idea of the low jitter timestamp insertion algorithm is to vary the insertion times so that MPEG packet straddles do not occur and the same number of overhead bits and bytes from the FEC framing process get inserted into every timestamp message. This causes the latency of each timestamp message from insertion to detection to be the same. The way this is done is to calculate exactly where in the MPEG packet each timestamp insertion would occur if insertion was perfectly periodic. From this calculation and based upon the length of the timestamp message, a calculation is performed to determine if that periodic insertion point would result in a straddle of an MPEG packet boundary. If so, the insertion point is shifted so that a MPEG packet straddle does not result. The insertion point is controlled to always be at the same place in every FEC frame. This results in the amount of overhead bits and bytes inserted into each timestamp message from the FEC framing process to be the same in each sync message. This reduces jitter to the jitter levels inherent in the rest of the circuitry and eliminates jitter caused by differences from one sync message to the next of FEC overhead bit straddle.

Besides the overhead of MPEG packet headers, there are other framing functions that are performed on the downstream data as it proceeds through an MCNS downstream modulator. For example, the bytes from the MPEG packets are broken up into Reed Solomon blocks and error detection and correction bits are calculated for each block and appended thereto. There is also interleaving and scrambling and a forward error correction process wherein redundant bits are added to symbols for use in the MCNS demodulator in aiding the detection and error correction process. An FEC frame for 256-QAM contains 88 Reed Solomon blocks plus a 40 bit frame word of overhead that defines the mode of the interleaver and a unique alignment word. For 64-QAM, an FEC frame is 60 R-S blocks plus a 42 bit frame word. R-S encoders take in 122 7-bit symbols and output 128 7-bit symbols, the added 42 bits being FEC framing overhead. Different straddling of the FEC frame word or different straddling of R-S blocks between successive sync messages can also be a source of jitter. All of these processes result in overhead bits being added to the downstream data which can cause jitter problems if straddled differently in different transmissions of timestamp messages. This straddling in FEC frames is unavoidable, so it is controlled by preferably injecting the sync message at the beginning of an FEC frame or at least at the same place in every FEC frame so that whatever straddling does occur always occurs the same in every sync message and cannot become a source of jitter.

The discussion in the previous paragraph was specific to the MCNS environment. However, the low jitter sync message insertion algorithm can be made to work to reduce jitter in any environment with downstream sync messages in a stream of frames with overhead bits therein or packets with headers therein or other overhead bit insertions where the time of arrival of the sync message is important to establishing and maintaining good synchronization. The algorithm also works to reduce jitter if the sync message insertion is controlled so straddle of MPEG packet boundaries occurs, but it is the same for every sync message.

Figures 8, 9, 10:
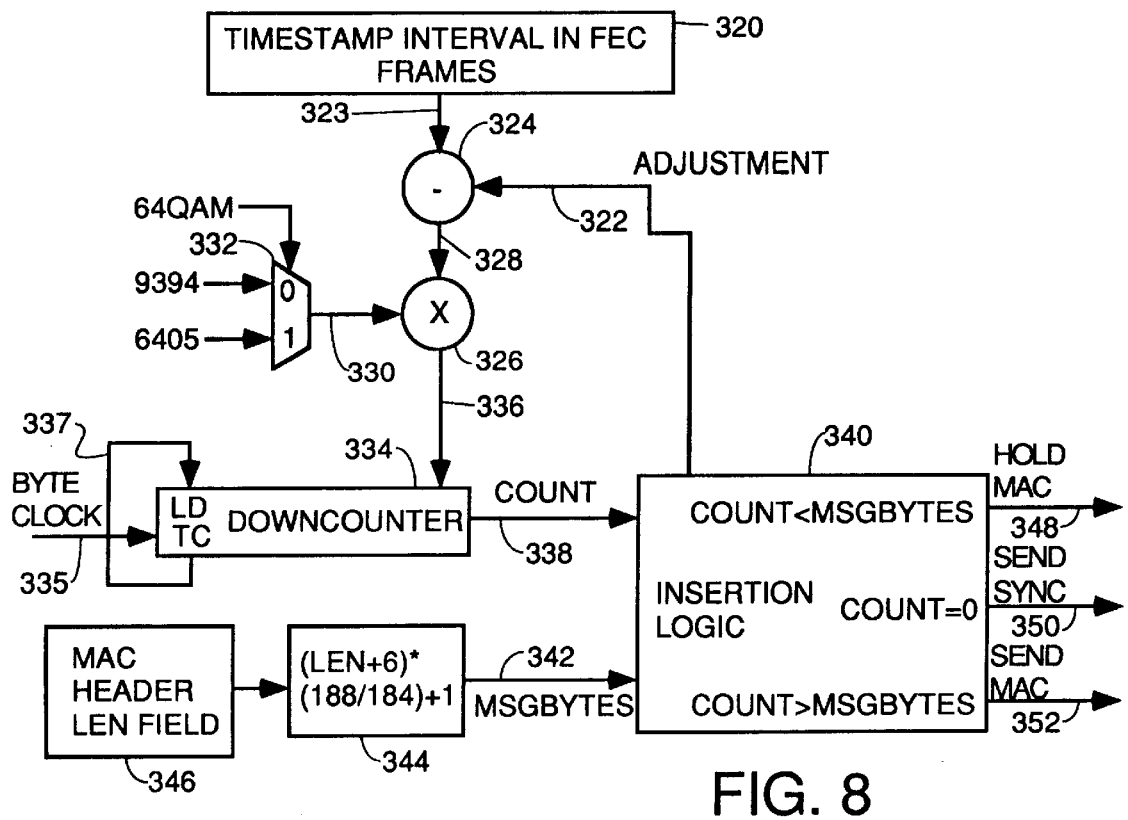
FIG. 8 is a circuit that could perform the low jitter timestamp insertion algorithm, although the same functionality could also be performed solely in software.
FIG. 9 is a table of adjustment values for sync message start positions calculated per Equation (9) for 64-QAM.
FIG. 10 is a table of adjustment values for sync message start positions calculated per Equation (9) for 256-QAM.

There is an algorithm which can be performed in a MAC or TC (Transmission Convergence) layer process or in the insertion logic 340 of FIG. 8 to determine the insertion point start$_k$ for a timestamp. This algorithm is based upon the observation that an FEC frame in 64-QAM is comprised of 34 MPEG packets+13 bytes and, in 256-QAM, an FEC frame is comprised of 50 MPEG packets−6 bytes. Using this information, the algorithm figures out exactly where within the MPEG packet in which the sync message will land to insert the sync message so that it is completely encapsulated within the MPEG packet. In other words, the algorithm requires that the TC or MAC layer process or the insertion logic needs to keep track of when the next sync message has to be inserted in the downstream data such that MPEG packet which will carry it completely encapsulates it and no straddle occurs. If the next scheduled sync message insertion will land so as to straddle two MPEG packets, the algorithm reschedules the sync message to occur at an earlier time.

All this means that the timestamp insertion interval is programmed to be at regular intervals which satisfy the MCNS or other pertinent specifications, but that there are exceptions to the scheduled insertions which are made to avoid straddles while always inserting the timestamp at the same position in every FEC frame. Further, these exceptions are programmed to always be shorter than the scheduled interval. The algorithm is designed in the preferred embodiment to always shorten the interval rather than increase it or allow it to vary on both sides of the regularly scheduled interval so that the regularly scheduled interval can also be thought of as the maximum interval. In alternative embodiments, the insertion point can be altered by always lengthening the interval since the last insertion or by either lengthening or shortening at the choice of the software.

FIG. 8 is a circuit that could perform the low jitter timestamp insertion algorithm, although the same functionality could also be performed solely in software. Register 320 stores a programmable timestamp insertion interval which defines the number of FEC frames between timestamp insertions. A value of 94 stored in register 320 means that there will be approximately 180 milliseconds between regularly scheduled timestamp insertions.

The value in register 320 is converted to the number of bytes to transmit before the next regularly scheduled timestamp insertion. There are two components to the interval. One of these components is established by an adjustment signal on line 322 which causes subtracter 324 to subtract some calculated integer number of FEC frames from the number on bus 323 and output the result on bus 328.

The other component of the insertion interval is established by a multiplier 326 which multiplies the integer number of FEC frames on bus 328 times a constant on bus 330 output from multiplexer 332. The multiplexer 332 has a constant 9394 coupled to one input and a constant 6405 coupled to the other input. These two constants represent the constants needed to convert the integer number of FEC frames on bus 328 into bytes to transmit before the next insertion for 64-QAM and 256-QAM. The value 9394 coupled to the 0 input of MUX 332 is number of bytes in an FEC frame for 256-QAM as measured at the input to the modulator. The constant 6405 is the number of bytes in an FEC frame when 64-QAM modulation is being used. When counting bytes within MPEG packets, all 188 bytes of the MPEG packet are counted including the MPEG header. By always supplying an integer number of FEC frames on bus 328 and multiplying that number by the number of bytes in an FEC frame on bus 330, a number of bytes is developed on bus 336 representing the insertion interval which causes the timestamp to always be inserted at the same place in every FEC frame. Although insertion at the beginning of an FEC frame is preferred because that results in the lowest delay, low jitter can be achieved so long as the timestamp insertion occurs at the same place in every FEC frame.

A down counter 334 is loaded with the number on bus 336, and is used to count down the bytes until the next timestamp as bytes are transmitted. Line 335 is the byte clock signal which indicates when each byte of the current MPEG packet is to be transmitted. When the downcounter count reaches zero, the downcounter activates a terminal count output signal on line 337. Activation of this signal causes the new byte value on line 336 to be loaded into the downcounter 334.

The current count is output on bus 338 to insertion logic 340. Each time a new MAC frame becomes available for transmission, the TC layer process that manages timestamp insertions examines the LEN field in the MAC frame header to determine whether the MAC frame message should be transmitted before or after the next timestamp insertion. The TC process makes this decision by comparing the current count on bus 338 with the length of the MAC message as indicated by the LEN field. Since the LEN field does not count the length of the MAC frame header, 6 bytes are added to the LEN value for this calculation. In addition, the LEN value needs to be converted into MPEG bytes by multiplying by 188/184. The ratio 188/184 is the ratio of MPEG packet length to the number of payload bytes in an MPEG packet. Finally, an additional byte is added to account for the pointer_field.

The precise arithmetic described above can be replaced by an approximation at the expense of causing the MAC message to sometimes be held when it is not actually necessary which will decrease the total throughput somewhat. Assuming that a timestamp is inserted every 100 ms, and that each time a 1524 byte MAC message is held, the result is a loss in capacity of 0.12 Mbps (0.5% degradation). The actual degradation will typically be less since every MCNS frame will not be the maximum length of 1524 bytes.

The adjustment value on bus 322 is used by the TC layer process to adjust the interval between timestamp insertions so that a timestamp message will not straddle two MPEG packets. To avoid straddling, the TC layer process must use the location within the current MPEG packet of the current timestamp insertion, and add in the offset caused by the timestamp interval to determine the exact point of insertion of the next timestamp if it were to be inserted at the regularly scheduled interval. If the calculated insertion point for the next sync message is at a location in the MPEG packet where the 34 bytes of the sync message will not fit entirely within the data portion of the MPEG packet, then an adjustment needs to be made. The needed adjustment will move the scheduled insertion point to a different location in the MPEG packet under consideration or an earlier MPEG packet to avoid a straddle. In alternative embodiments, the insertion point can be moved to a later point or moved to either an earlier or later insertion point at the choice of the software so that the sync message will fit entirely within the data portion of the packet.

Additionally, in the preferred embodiment, if the scheduled insertion point is less than the $6^{th}$ byte, then a portion of the MPEG header and pointer_field will be within the sync message and a straddle will occur unless an adjustment of the insertion point is made.

The formula for calculating the next start position given the current start position is given in Equation (9) below. Note that the start value is a 0 based index meaning that a value of 0 corresponds to the $1^{st}$ byte of the MPEG packet.

$$\text{start}_k = \text{start}_{k-1} + ([13,6] * TS\_\text{interval}) \text{ modulo } 188 \quad (9)$$

where $\text{start}_k$ = the insertion point of the next timestamp;
$\text{start}_{k-1}$ = the insertion point of the previous timestamp; and
$[13,6] * TS\_\text{interval}$ = the number of bytes to the next regularly scheduled interval, as indicated by the current value of the downcount on bus 338—the [13,6] notation means that the value of TS_interval is multiplied by 13 for 64-QAM and by 6 for 256-QAM.

The insertion point and any required adjustment is calculated by insertion logic 340. The insertion logic will calculate where within an MPEG packet the next schedule timestamp will start (based on where the current timestamp starts and the timestamp interval), and if that starting location would cause the timestamp to straddle an MPEG header, then the insertion logic will compute the adjustment. The adjustment value is chosen to prevent the straddling of the MPEG header. Since the timestamp message is a fixed length, then the adjustment required can be gotten from a table lookup which uses the unadjusted starting position calculated using Equation (8) as the index into the table of FIG. 9 for 64-QAM or the table of FIG. 10 for 256-QAM.

To accomplish all this, the insertion logic receives as inputs the current value in the downcounter on bus 338 and the value of the LEN field plus 6 times 188/184 +1 on bus 342. The value on bus 342 is calculated by arithmetic logic 344 from the value of the LEN field stored in register 346.

The insertion logic generates a hold MAC signal on line 348, a Send Sync signal on line 350 and a Send MAC signal on line 352. These signals cause the MAC layer to stop adding payload bytes to the downstream data stream and add all the bytes of the sync message at the appropriate insertion point which will not cause the sync message to straddle an MPEG header. The conditions under which each of these three output signals on line 348, 350 and 352 are activated are as follows.

hold_MAC—This signal is asserted when the count on line 338 (number of bytes until next timestamp insertion) is less than the size of the next MAC message(including MPEG overhead). When asserted, hold MAC prevents the MAC message from being sent. It will remain asserted until after the timestamp is transmitted.

Send_SYNC—This signal is asserted when the count on line 338 equals 0. When asserted, this signal causes the MAC layer process to insert the timestamp message for transmission.

Send_MAC—This signal is asserted in all other cases indicating that the MAC message can be transmitted. This signal is redundant with the hold_MAC signal.

If the result of the calculation by insertion logic 340 causes any of the sync message to fall within any MPEG header, then the value loaded in the downcounter 334 will need to be adjusted. Since the sync message is 34 bytes long, this means that if the insertion point is greater than 154, the sync message will straddle two packets. Also, if the start position is less than 5, then the MPEG header and the pointer_field will cause the sync message to be delayed. Tables 1 and 2 in FIGS. 9 and 10 contain the adjustment values for 64-QAM and 256-QAM, respectively, for various calculated values for the insertion point. The 64-QAM adjustments are always even to prevent jitter being caused by an FEC frame being 9607.5 64-QAM symbols long.

Figure 11:
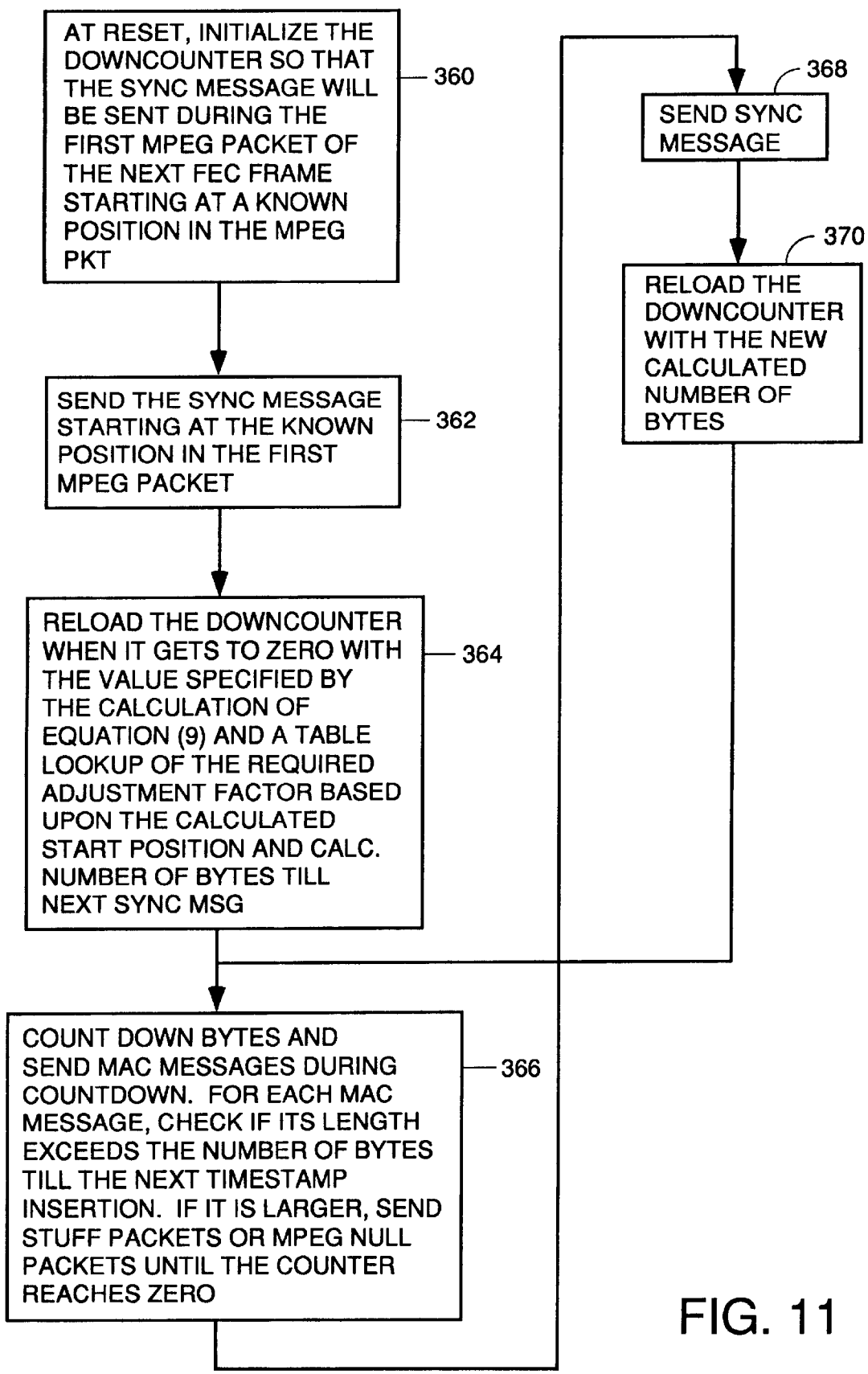
FIG. 11 is an exemplary method to carry out timestamp insertion using the precise arithmetic of Equation (9) to calculate the new starting position followed by a table lookup of an adjustment value for the number of FEC frames between insertions and calculation of the number of bytes in that number of FEC frames.

An exemplary method to carry out timestamp insertion using the precise arithmetic of Equation (8) to calculate the new starting position is given in the flowchart of FIG. 11. Step 360 represents the process of initializing the downcounter at reset time so that the sync message will be sent during the first MPEG packet of the next FEC frame starting at a known position within that MPEG packet. In step 362, the sync message with timestamp is sent starting at the known position in the first MPEG packet. Step 364 represents the process of reloading the downcounter when it gets to zero with the value specified by the calculation of Equation (9) carried out by the circuitry of FIG. 8 (or its modified version for the simpler embodiment described below). This calculation involves calculating the new proposed start position using Equation (9) and doing a table lookup using the newly calculated start position as a search key into the data in tables I and II in FIGS. 9 and 10 to determine the required adjustment value, if any. This adjustment value is then subtracted from the interval value in register 320 and the result is multiplied by 9394 for 256-QAM or 6405 for 64-QAM. The resulting number of bytes is loaded into downcounter 334 when it reaches 0 and the terminal count signal on line 337 is activated.

Step 366 is the process carried out by the insertion logic 340 and the downcounter 334 to determine when to activate the various control signals. Step 366 represents the process of counting down the number of bytes until the next sync message using the downcounter and sending MAC layer messages while the down count is proceeding. For each MAC message that is sent however, the insertion logic checks to determine if its length, as indicated by the number on bus 342, is greater than the number of bytes remaining until the next sync message, as indicated by the number on bus 338. If the length of the MAC message is larger than the number of bytes remaining until the next sync message insertion, then the insertion logic asserts the hold MAC message on line 348. This automatically causes the MAC layer process which is assembling bytes for transmission to start inserting stuff packets or MPEG null packets until the downcounter 334 reaches 0.

Step 368 represents the process of sending the sync message when the downcounter count reaches zero. To do this, insertion logic 340 asserts the Send SYNC signal on line 350 when the count reaches zero and continues to assert the hold MAC signal until the sync message has been completely sent. The signal Send MAC is asserted at all times when the MAC messages may be transmitted and is the complement of the hold MAC signal.

Step 370 represents the process of reloading the downcounter with the new calculated number of bytes until the next assertion based upon the same calculation type as was performed in step 364 using the start position of the sync message just inserted as $start_{k-1}$. Processing then proceeds again to step 366, and the process continues in this loop until the system is powered down or reset.

Simpler Timestamp Insertion Method

The process for the simple method is the same as the process shown in FIG. 11 except the step 364 is modified in that no calculation of the result of Equation (9) is necessary nor is there required a lookup of the necessary adjustment based upon the results of the calculation is required. The only thing that is necessary to carry out step 364 in the simpler embodiment described in the next section is to multiply 94 times the selected constant at the input of the multiplexer 332 and load the result into the downcounter. This results in loading the downcounter with a value of 602069 for 64-QAM and 883035 for 256-QAM. The rest of the process remains the same.

In the simpler method, the interval stored in register 320 in FIG. 8 is set to 94 FEC frames. When this is done, the sync message remains at fixed locations in the MPEG packet, and there will be no need to figure out when the sync message will be straddling multiple MPEG packets. For 64-QAM modulation, 94 FEC frames is 3202.5 MPEG packets and for 256-QAM, 94 FEC frames is 4697 MPEG packets. For the case of 64-QAM modulation, this means that the sync message will alternately start at 2 different locations in the MPEG packets separated by ½ an MPEG packet or 94 bytes. To have no jitter, it is still required that the sync message does not straddle MPEG packets. For 256-QAM, the sync message will always be inserted at the same position within the MPEG packet.

The benefit of this implementation is that it is simpler, but at the cost that the sync message cannot be sent at any other rate. Equation (8) for the simplified algorithm is also simplified. Equation (9) below is the analog for Equation (8) for 64-QAM.

$$start_k = start_{k+1} + 94 \qquad (9)$$

Equation (10) below is the analog for Equation (8) for (9) 256-QAM.

$$start_k = start_{k+1} \qquad (10)$$

To implement this simpler algorithm, the circuitry of FIG. 8 can be modified by eliminating the subtractor 324 and the register 320 and applying a hardwired value of 94 to the input 328 of the multiplier 326. The arithmetic unit 344 to calculate the number of message bytes on bus 342 from the LEN field still is necessary to calculate the data on bus 342 so that the insertion logic 340 can determine when to activate the hold MAC signal on line 348. The insertion logic still generates the signals on lines 348, 350 and 352 the same way it did for the more complex algorithm, but it is simplified in that it does not need to calculate the new start position using Equation (9) or (10) and does not need to do a table lookup for the adjustment value based upon the calculated start position to generate the signal on line 322.

Upstream Clock Slip Detector

If for any reason, the upstream clock signal in the RU slips a cycle, synchronization between the CU upstream clock and the upstream clock in the RU will be off. This will result in misalignment of the codes in SCDMA embodiments and will result in the generation of undesired noise which can destroy or hinder proper reception of data from the Rus. That is, misalignment of one or more codes at the CU may cause enough self generated noise as to prevent data reception from all Rus. As a result, the system shown in FIGS. 2 and 3 may include optional clock slip detectors 210 to improve their performance although they will work satisfactorily without clock slip detectors until a clock slip occurs.

As a result, in the preferred embodiment, the genus represented by FIG. 2 and the subgenus represented by FIG. 3 have preferred species therein which use clock slip detectors to detect clock slips and initiate a recovery process if any clock slip greater than 35 nanoseconds occurs. If any clock slip greater than this amount occurs, the RU having the slipped clock shuts down its transmitter and initiates a resynchronization process.

Figure 12:
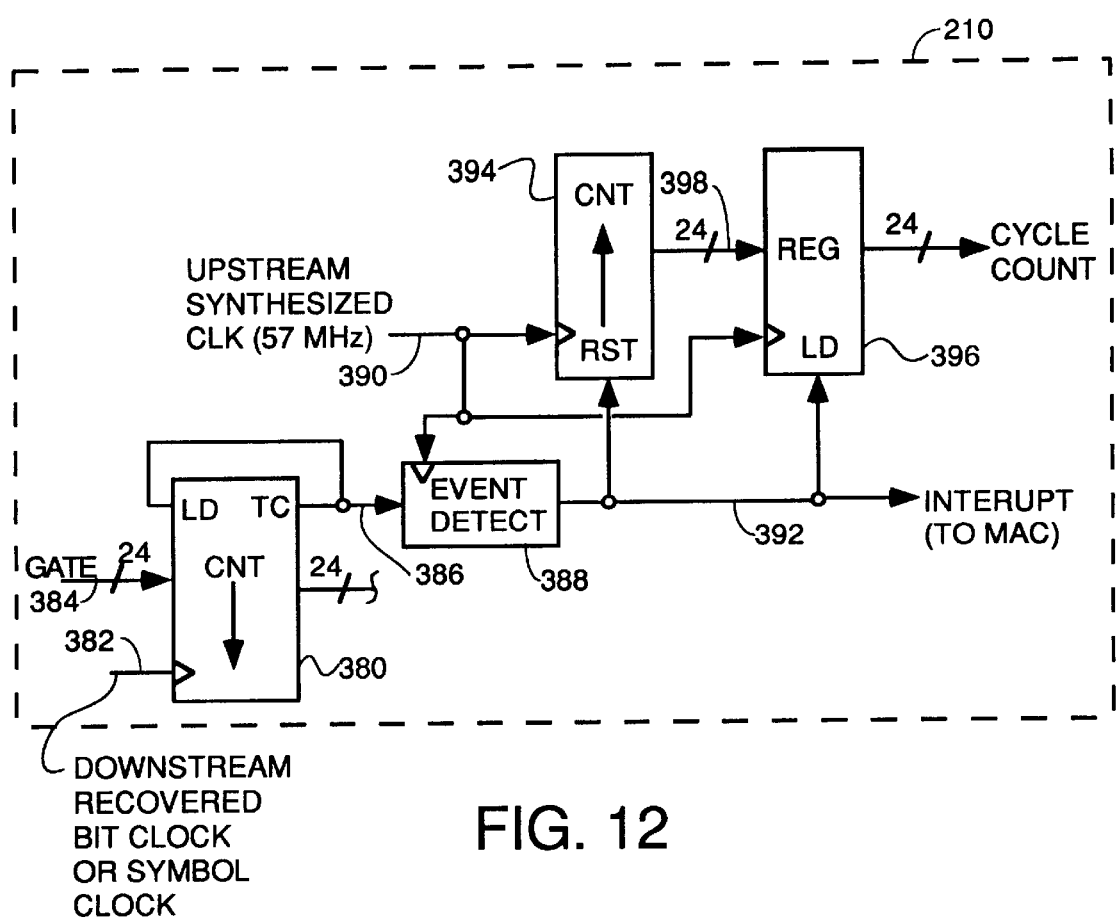
FIG. 12 is a block diagram of one embodiment for a clock slip detector.

Referring to FIG. 12, there is shown a block diagram of one embodiment for a clock slip detector. The basic function of the clock slip detector is to monitor the upstream clock using the downstream clock and count the number of upstream clock cycles that occur in a known interval defined by the downstream clock. If the count is anything other than close to the expected number, clock slip has occurred, and the interrupt is generated.

The circuit of FIG. 5 comprises a downstream counter 380 which provides a gating period over which to count upstream clock signals. The gating period is programmable, and the upstream cycle count is reported to the MAC layer during each gating period by an interrupt mechanism. In alternative embodiments, the upstream cycle count can be compared in the clock slip detector to a known constant, and an interrupt generated only when a slip is detected. This relieves the MAC layer process of the overhead of making the comparison to determine is slip has occurred. The downstream counter 380 receives the downstream recovered symbol clock or bit clock on line 382. In the embodiment of FIG. 2, the downstream clock signal used to define the count period is not the downstream bit clock but is the recovered downstream clock equal to four times the downstream symbol period. This clock signal also serves to define a known period during which a certain number of expected upstream bit clock or chip clock cycles should have occurred. The downcounter 380 also receives a preload number on line 384 which defines the length of the monitoring interval. The downcounter counts down from this preloaded interval value at the downstream bit clock rate and rolls over when it reaches the preload value plus one clock. The 24 bit counter size means that the maximum counting period is 300 milliseconds.

The circuit of FIG. 12 is designed to detect upstream clock slips greater than two 57 MHz clock cycles. The downstream bit clock on line 382 will be either a serial bit clock of 27 or 38 MHz (for MCNS downstreams and depending upon whether 64-QAM or 256-QAM modulation is in use) or a $2*F_{ds}$ clock of approximately 10 MHz, depending upon the MpEG interface in use. In either case, the gating period derived from whatever downstream clock is used should have very low jitter.

The rollover event activates a signal on line 386 which activation is detected by event detector 388. The rollover event is synchronized to a transition of the 57 MHz upstream clock signal on line 390 by virtue of connection of that clock line to the clock input of the event detector. When the event detector detects a rollover event, it activates an interrupt line 390 to the MAC layer. This causes an up counter 394 to reset. The clock input of this up counter is coupled to the synthesized upstream clock on line 390 resulting in upstream clock counter 394 counting the number of upstream clocks that occur between each rollover event of the downstream clock counter 380. Activation of the interrupt line 392 also cause a register 396 to load the current count at the output 398 of counter 394 in synchronism with a transition on clock line 390.

The interrupt service routine executed by the MAC layer reads the count value stored in register 396 and makes a comparison of the count to an expected number of cycles. If the count is more than 35 nanoseconds off, the RU transmitter is shut down and resynchronization is attempted.

The event detector will preferably have a peak to peak jitter equal to one 57 MHz clock cycle. Given this amount of jitter, the reported cycle count could be one cycle more or one cycle less than the expected value for any given gating period. Any clock slip greater than 2 cycles would then be detected by a reported count which is 2 or more from the expected value.

Figure 13:
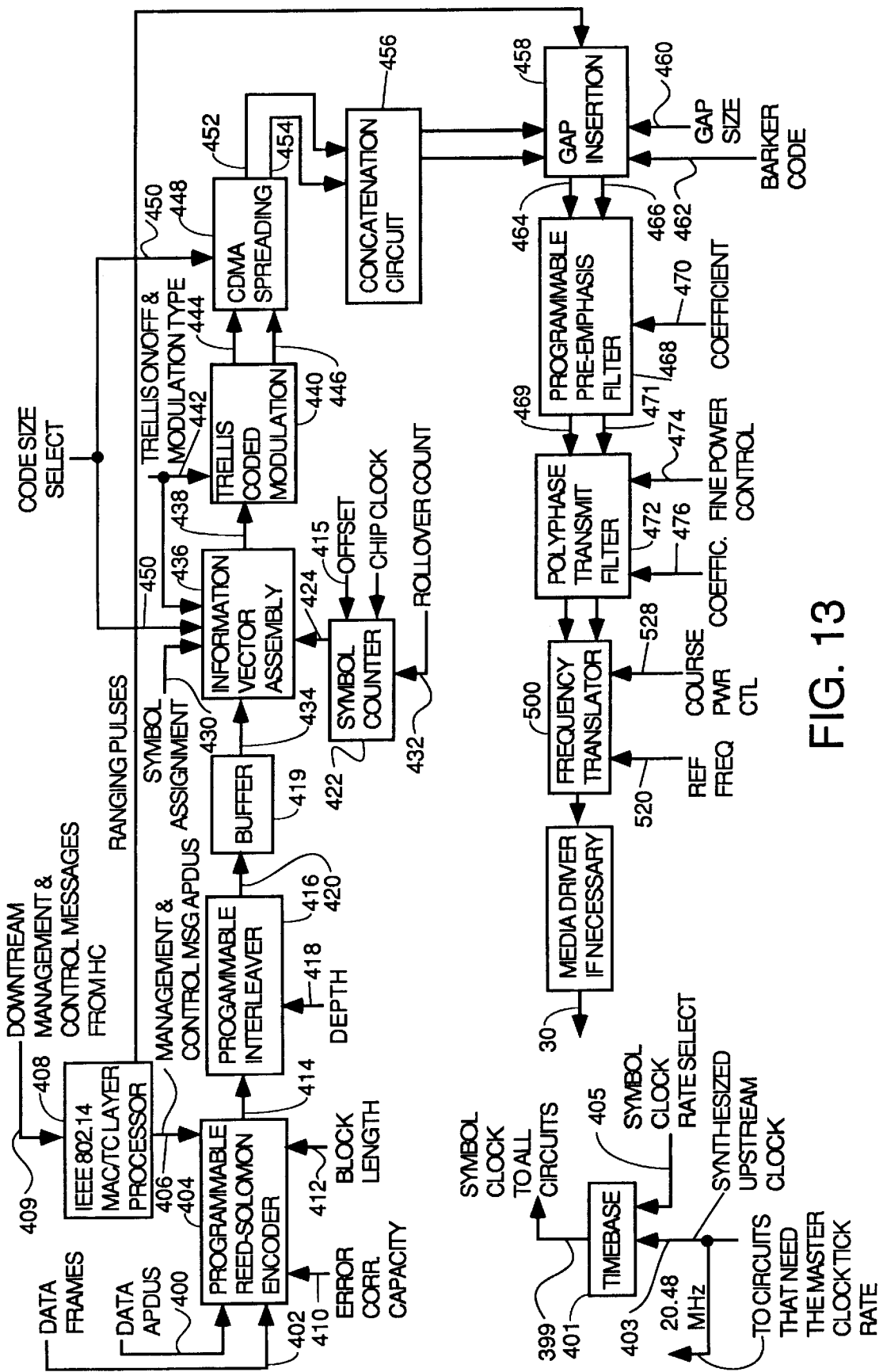
FIG. 13 is a block diagram of one embodiment for an SCDMA RU upstream transmitter for use in an 802.14 or MCNS type system.

Referring to FIG. 13, there is shown a block diagram of the preferred form of RU SCDMA transmitter for upstream transmissions in an system for bidirectional data communication over HFC according to the IEEE 802.14 or MCNS standards. The transmitter of FIG. 13 is intended to use upstream clock and carriers which are phase coherent with the recovered downstream clock, the CU master clock and the CU upstream and downstream clocks generated therefrom, in the same way as the systems shown in FIGS. 1, 2 and 4 and can also include the timestamp counter circuitry and other circuitry from FIG. 4 needed to support the offset calculation of FIG. 7 and the clock slip detector to detect upstream loss of synchronization and may also include the low jitter sync message insertion circuitry of FIG. 8. However, the transmitter of FIG. 13 can also be used with conventional clock circuitry where the upstream clock and carrier are independent of the downstream clock and the CU receiver includes clock and carrier recovery circuitry.

For purposes of being able to understand the SCDMA technology of FIG. 13 in the context of the 802.14 and MCNS specifications, some terminology changes from the SCDMA technology disclosed in the PCT publications is necessary. First, an SCDMA upstream frame now comprises eight subframes and a gap. Each subframe corresponds to one information vector in FIG. 18A, and each information vector or subframe has a number of symbol elements therein equal to the number of codes in the codebook. If the codebook has 156 codes, an information vector will include 156 symbols, each comprising some programmable number of bits of data. After each information vector is spread by the spreading matrix, a result vector is generated with a number of chip elements equal to the number of codes in the codebook. A 156 code spreading matrix generates a 1×156 result vector with 156 chips in the element positions.

The transmitter of FIG. 13 is characterized by a high degree of configurability and is able to take a stream of upstream bytes delivered from the MAC/TC layer and minislot assignments for upstream transmissions from a headend controller process (hereafter sometimes referred to as the HC) and send the upstream data at a variable upstream symbol clock rate in the assigned minislots using synchronous CDMA using spreading codes which have a fixed mapping to particular minislot numbers known to both the CU and all RUs. The programmable symbol clock rate makes the SCDMA transmitter compatible with the programmable symbol rate of the 802.14 CU of 5.12 mHz, 2.56 mHz, . . . as established by the headend controller.

The digital circuitry in the transmitter is coupled to receive a programmable symbol clock signal on line 399 generated by timebase 401. The timebase receives on line 403 the synthesized upstream clock which is generated from and phase coherent with the recovered downstream clock. The synthesized upstream clock, in the preferred embodiment, has a frequency of 20.48 mHz to match the tick rate of the clock driving the timestamp counter in an 802.14 IEEE type CU and which the headend controller uses. A symbol clock rate select signal on line 405 generated by a MAC or TC layer process executing on a processor 408 in accordance with downstream messages from the headend controller process received on bus 409 from the RU receiver. The processor 408 is coupled to most if not all the various circuits in the transmitter by data and address buses (not shown). These connections are symbolized functionally by various signal lines which are coupled to various circuits that need information from the MAC or TC layer process. The function of each such signal is specified, and thus specifies the nature of the MAC and TC layer programs needed to control the processor to generate the needed signals.

The selectable symbol rates match the selectable symbol rates of an 802.14 CU and are all divide-by-2 factors of the 20.48 tick rate. Specifically, the symbol rates that can be selected are 5.12 mHz, 2.56 mHz etc. down to 0.16 mHz. At the 5.12 mHz rate, 4 ticks is a downstream symbol, so if a minislot is 48 upstream symbols, every 192 ticks of the 20.48 mHz CU clock will establish a minislot boundary. Each RU preferably has the downstream clock recovery and upstream clock synthesis circuitry shown in FIG. 4 or can have conventional independent upstream and downstream clocks with clock recovery circuitry for the upstream required in the CU.

The transmitter shown in FIG. 13 is the preferred form of SCDMA transmitter 196 in the embodiment of FIG. 4 where the upstream is TDMA multiplexed using minislots according to the IEEE 802.14 specification.

Upstream payload data arrives on bus 400 from a MAC layer process that accepts raw upstream data from peripheral devices or computer processes. The upstream data is organized in the form of APDUs as defined in the IEEE 802.14 specification. An APDU is an ATM protocol data unit. Basically it is a 54 byte packet of data and is the standard way 802.14 MAC layer processes expect to give data to the physical layer circuitry. Bus 402 represents an optional form of receiving the upstream data organized as variable length frames of bytes.

Another source of upstream data is management and control message APDUs on bus 406 generated by an IEEE 802.14 MAC or TC layer process executing on a processor 408. The TC or transmission convergence layer is a layer of software processing which has processes which function to configure and control the circuitry of the physical layer to control modulation types, data rates etc. These programmable factors are set by the headend controller via downstream messages to the processes on the TC layer of the RUs.

A programmable Reed-Solomon encoder 404 receives the upstream data on either bus 400 or 402 and the data on bus 406 and breaks the APDUs down into programmable size Reed-Solomon coding blocks. The TC or MAC layer processes send two control inputs to the encoder 404. An error correction capacity signal on bus 410 controls the number of errors (from 0 to 10) that can be detected and corrected in each block by controlling the number of error detection and correction bits that will be generated for each block. A block length signal on line 412 controls the size of the Reed-Solomon blocks that are created. The parameters of the Reed-Solomon code, for example the primitive polynomial, are specified in 802.14.

The Reed-Solomon (R-S) blocks, including appended ECC bits, are output on bus 414 to the input of a programmable interleaver 416. The interleaver interleaves the R-S blocks to provide better burst noise immunity in accordance with known interleaving processes defined in the IEEE 802.14 specification. The algorithm of the interleaving process will be fixed in the preferred embodiment, but the depth is programmable. The headend controller process sets up the physical circuitry of the receiver at the CU to expect a certain type or depth of interleaving. A downstream management and control message is then sent to the MAC or TC layer processes in the RUs which instructs them on what depth of interleaving is to be used. The RU MAC or TC layer process which receives this downstream message generates a depth control signal on bus 418 which controls the programmable interleaver to use the interleaving scheme the CU is expecting.

The interleaved R-S blocks are output on bus 420 to buffer 419. This buffer functions to store upstream data until an award of upstream minislots is received from the headend controller. The upstream data format in a 802.14 system is burst TDM organized as an endless stream of timeslots called minislots with no frame structure superimposed thereon (an MCNS upstream is almost identical). Each SCDMA RU can only transmit the symbols mapped to the minislots assigned to it on the codes inherent in the symbol to minislot mapping established by the programmable symbol numbering scheme (this will become clear in the discussion of FIG. 22). One of the advantages of the SCDMA upstream is that the pure 802.14 upstream TDMA minislots get mapped from the time dimension to symbols which are mapped by a programmable mapping to both a time dimension and a code dimension. The downstream assignment of minislots to an RU get mapped to specific symbols and codes that correspond to that minislot and the RU transmits on those counts of its symbol count using the codes which correspond to those symbols. The actual transmission times of the RU do not correspond to actual time boundaries of the assigned minislots in the upstream. It is up to the CU receiver to receive the symbols transmitted on the various codes which correspond to the assigned minislots, reassemble the data into the assigned minislots and transmit those minislots of data to the MAC layer process which assigned the minislot numbers to the RU. If the minislots assigned to one RU do not consume all the codes, other RUs can transmit on other codes that correspond to their assigned minislots simultaneously with transmissions from the first RU. The CU TC layer process will reassemble the data transmitted by the second RU into its assigned minislots in the TDMA stream of data sent by the TC layer to the MAC layer.

Figure 22:
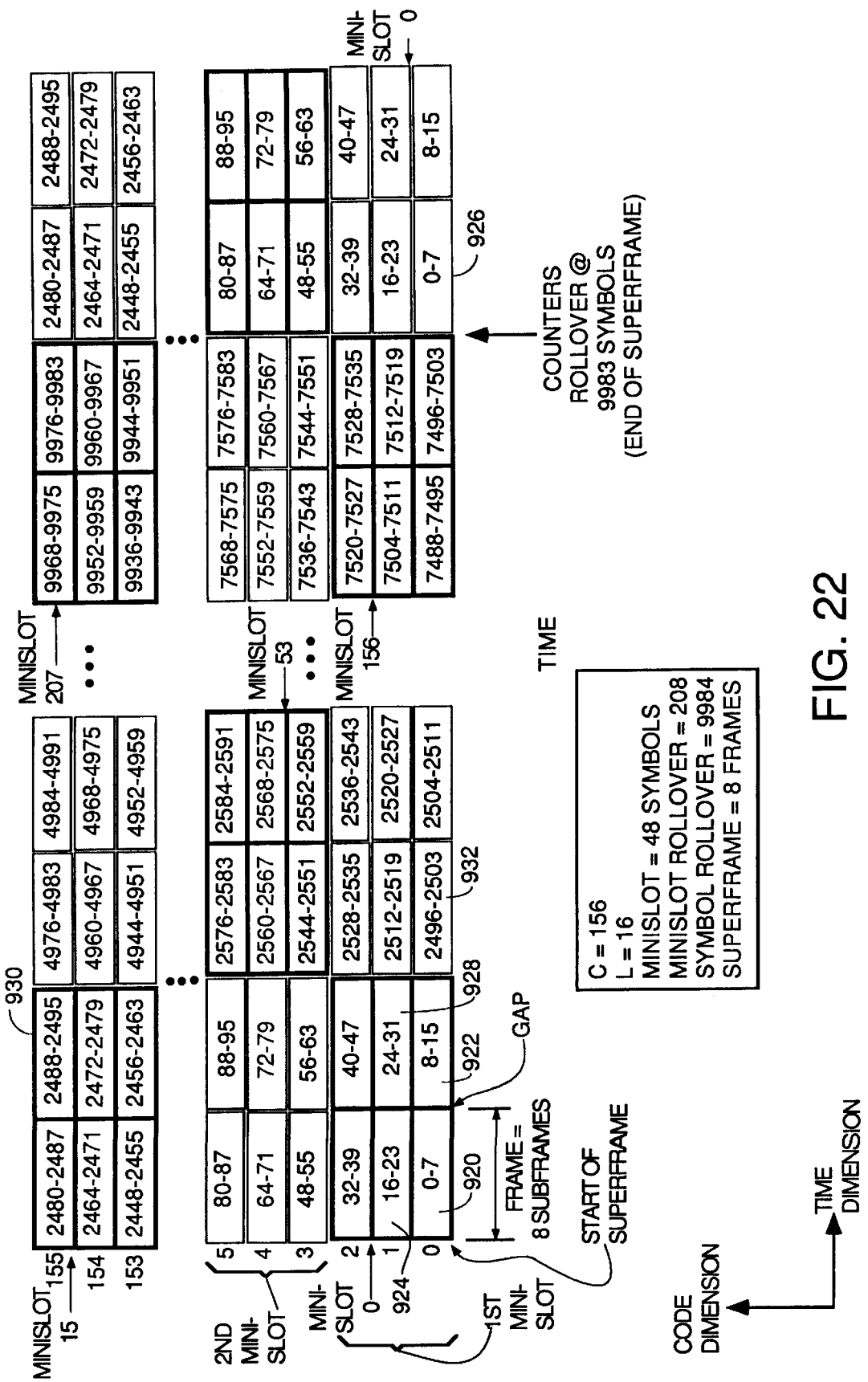
FIG. 22 is a diagram indicating one possible frame numbering scheme.

To make this clearer, refer to FIG. 22. FIG. 22 illustrates one example of a programmable mapping between assigned minislot numbers and the symbols and codes which will be transmitted by the RU receiving the minislot assignment. The 802.14 and MCNS CU MAC and TC layers, if conventional, only understand minislots in the upstream and have no provisions to understand or reassemble HS-CDMA frames. The TC layer of a 802.14 or MCNS CU compliant CU and RU modem supplied by the assignee of this invention will be modified to understand ranging and barker codes in gaps in HS-CDMA frames and to understand a programmable mapping from HS-CDMA frames, subframes, symbols and codes to minislots. This mapping will be rendered transparent to the CU MAC and RU MAC by the CU and RU TC layer processes.

In this mapping, each minislot has a number, and the CU and RU TC or MAC layers have the ability to keep track of each minislot number. When an RU receives upstream data to transmit, it sends an upstream management and control message to the headend controller saying "I have upstream traffic for you". This is called an access request. Since the headend controller has no idea when the RU will send these access requests, it assigns a subset of the minislots for this purpose. These minislots are often referred to as contention minislots, since multiple RUs could send access requests in the same minislot and thus contend with one another or collide. The RUs have contention resolution algorithms which are similar to the ranging contention resolution algorithm described in the PCT publications for this purpose.

The headend controller responds to an access request with a downstream management and control message awarding an integer number of specific minislots to the RU. The downstream message passes unchanged through the CU TC layer and arrives at the RU MAC layer processes of all RUs. The specific RU to which the message is directed recognizes the address and sends a command to the RU's TC layer process telling it to transmit on the assigned minislot(s).

FIG. 22 shows how minislots are mapped to specific symbol numbers and specific codes. Each frame is represented by a box of which boxes 920, 922 and 924 are typical. Each frame has the symbol numbers which are transmitted during that frame written inside it. Each symbol, depending on its data content, is mapped to one constellation point of the constellation of the specific modulation type in use, e.g., QPSK, 16-QAM, etc. There are two dimensions. They are the code dimension along the vertical axis and the time dimension along the horizontal axis. The numbers along the vertical axis are the code IDs for the codes in the codebook. Some of the minislots in FIG. 22 have bold boundaries such as minislot 0 in the first group of 208 minislots during which symbols 0 through 47 will be transmitted.

Each frame has 8 subframes (not shown) with a gap between frames. Each subframe has C symbols in it (not shown) with C equal to the number of codes in the codebook (not shown), which in the example give is 156. In the particular example given, the symbol to minislot mapping requires 48 symbols to be transmitted during every minislot (with "symbols" being the new definition and corresponding to one element of an information vector and not the entire information vector or result vector under the old definition in the PCT publications). The minislot counters in the CU and RU rollover at a count of 208 in the example of FIG. 22. Each of the CU and RU have symbol counters that reset at the minislot boundary and which rollover at a count of 9984 (208×48) simultaneously when the minislot counter rolls over at 208. Frame 926 represents the first frame after the rollover of the symbol and minislot counter at 9983 and 208, respectively. Frame 926 is the first frame in minislot 0 of the next group of 208 minislots. There is a superframe construct in the SCDMA upstream which is defined as 8 SCDMA frames and the boundary of which is marked by simultaneous rollover of the minislot and symbol counters. Ranging is the process of establishing an offset in each RU such that if a pulse were transmitted exactly at the superframe boundary in the RU, it would arrive at the CU exactly at the corresponding superframe boundary in the CU.

Each RU can be assign anywhere from 1 to C codes upon which it may transmit during a single subframe. This code assignment is made indirectly by the HC by assignment of minislot to that modem since the minislot numbers map to specific codes as well as specific symbol numbers. Assigned minislot numbers are mapped to symbol numbers and code number as follows. Starting at the superframe boundary or the beginning of minislot 0 which corresponds to beginning of frame 0, start numbering symbols on the first code along the time dimension until the programmable value L (16 symbols in the example) is reached. Since only code 0 is being used to spread this symbol, the result vector which results will have 156 elements therein each of which will be the product of the symbol times a code element which corresponds in index to the index of the result vector element (see FIG. 18C). Thus, if the first symbol, symbol 0, has content X, and the individual code elements of code 0 have content symbolized by the numbers 1, 2, . . . C etc., then the result vector elements will be X*1, X*2, X*3 . . . X*C. That first result vector will, assuming trellis modulation is turned off, will be transmitted during the first subframe of frame 1. Symbol 1 will also be spread by code 0 because we have not yet reached L (symbol 15), so its result vector will be transmitted as the second subframe of frame 0. If symbol 1 has content Y, then the result vector transmitted as the second subframe in frame 0 will have elements Y*1, Y*2 . . . Y*C. Since there are only 8 subframes per frame, only eight symbols (symbols 0–7) will be transmitted during the first frame or frame 0 shown at 920. Since L is 16, the next eight symbols (symbols 8–15) will be transmitted during the 8 subframes of the second frame (frame 1 shown at 922). Once L is reached, we continue mapping symbol numbers to minislots and codes by resetting L to zero, returning to the beginning of the minislot being mapped and starting numbering symbols again on the next code up the code dimension. In the example given, this means symbols 16 through 23 are mapped to the frame shown at 924 on code 1. Each time a symbol is assigned to a frame and subframe and code, L is incremented. This process continues until L reaches 16 again by mapping symbols 24 through 31 to the frame shown at 928. This process is repeated for all codes. Once all codes for L symbols along the time axis have been mapped, we go back to the first code (code 0) and increment along the time axis to frames that have not yet been mapped and start again. For example, after symbol 2495 has been mapped to the last subframe of the frame shown at 930 on code 156, symbol 2496 is mapped to the first subframe of the frame shown at 932 on code 0. This process is repeated until all 9983 symbols and 156 codes in the superframe have been mapped to specific minislots. The definition of superframe is the number of frame times which elapse between symbol counter rollover events. Then the process starts again at the rollover of the minislot and symbol counters in the CU and RU such that a new symbol 0 will be mapped to the new minislot 0 which starts with the frame shown at 926 on code 0.

The result is that a difference arises between 802.14 and MCNS systems and the SCDMA upstream. In 802.14 and MCNS systems, a minislot is defined as a number of symbols which are consecutive in time since they are pure TDMA systems. In the SCDMA upstream, the symbols are numbered in two dimensions (time and code) so symbols are not necessarily transmitted consecutively in time only. Note that this mapping concept also works when the second axis is not a code dimension but a frequency dimension as frequencies are used in DMT systems. In DMT systems, orthogonality between different data is achieved by modulating data from each different source onto different frequencies of a Fourier spectrum. The transmitted signal is derived by doing an inverse Fourier transform of the spectrum to derive a composite signal. The individual data is recovered by breaking the spectrum up into its component frequencies at the receiver and demodulating and detecting the data on each frequency.

In the example of FIG. 22, the minislot was assumed to be 48 symbols long. In the transmitter of FIG. 13, minislots could be any programmable integer number of symbols which is selectable by the HC. Setting a minislot equal to 48 symbols in the example causes the first minislot to be mapped to the first 48 symbols and the first three codes. Thus, if a first RU is assigned to the first minislot only, that RU will transmit data from its first six frames which are mapped to the first minislot during the first two frame times along the time axis, multiplexing the different symbols of data using a combination of code division multiplexing and time division multiplexing, code division multiplexing being accomplished using only the first three codes, 0–2, and time division multiplexing being accomplished using the 16 different subframe times of the first two frame times along the time axis.

Likewise, if another RU is assigned to the second minislot, that RU will simultaneously transmit the data in its first 6 frames during the first two frame time along the time axis using a combination of CDMA using codes 3 through 5 and TDMA using the 16 different subframe times of the first two frame times along the time axis. Data from the first and second RUs transmitted during the same subframe times can be separated because the symbols are transmitted on different orthogonal spreading codes.

This mapping of minislots to different symbols and codes allows multiple modems to transmit at the same time without loss of data even though the 802.14 and MCNS MAC layers understand only minislots and TDMA multiplexing and only one RU can transmit at any particular time on the upstream. If an RU has a high demand application with lots of data to transmit, it must have a bigger buffer than is necessary in the SCDMA upstream to hold data until the next minislot comes around. This additional memory increases the cost.

The MAC layer processes or the hardware in the RU and CU both keep minislot counters in 802.14 and MCNS systems and this is also true in an SCDMA upstream. However, in an SCDMA transmitter and receiver for use with an 802.14 or MCNS MAC layer process, the hardware or software also preferably implement frame, subframe and symbol counters.

Alternatives to this mapping scheme are available, but each has its tradeoffs. Having the value of L programmable is important for the following reasons. If the symbols are numbered consecutively in the time dimension from 0 to a very large L, then more RUs can transmit simultaneously because each RU uses fewer codes, but the latency time for each RU is longer. Latency time is the time from the start of transmission of a fixed number of symbols to the time those symbols are recovered at the receiver. Smaller values of L reduce the latency at the expense of fewer numbers of RUs that can simultaneously transmit.

Thus, the minislot concept in an SCDMA upstream is different than the pure TDMA minislot multiplexing in a pure 802.14 or MCNS system, but the TC layers and hardware of the CU and RU are programmed and structured to understand the differences and make them transparent to the MAC layer processes for compatibility.

In other words, one advantage of use of an SCDMA upstream in an 802.14 or MNCS system is that pure 802.14 and MNCS systems depend upon time division multiplexing by minislot assignment to keep the signals from different RUs separate.

This difference over pure 802.14 and MCNS systems provides several advantages. First, the use of SCDMA with 802.14 or MCNS MAC layers gives better immunity to impulse noise. Further, the despreading function will cause a high power CW signal at one frequency to be spread to all frequencies but at a power that is so low as to often be beneath the average noise floor. Third, with periodic minislot assignments to a particular RU, a constant transmission resource such as is needed to provide T1 service can be more easily provided and with higher quality because of better noise immunity. Finally, the smaller buffer advantage has been mentioned above.

FIG. 22 illustrate only one form of mapping of minislots to symbol numbers in a rectangular shape in the two dimensional code-time space. Other shapes are also possible such as L shapes etc. Each shape will have different latency and number-of-simultaneous-users attributes. It is also possible to do the mapping such that different shaped mappings are included within the same superframe. This provides the HC with the ability to assign minislots having low latency attributes to some RUs that need low latency and other minislots to other RUs where latency is not an issue but high numbers of simultaneous transmissions from different RUs are desirable.

Figure 14:
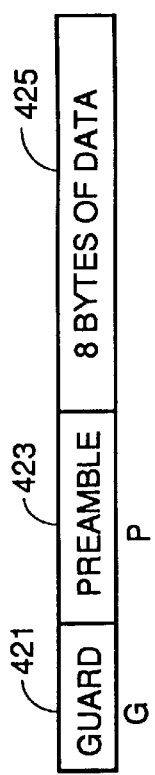
FIG. 14 is a diagram of the content of the first minislot in every block of assigned minislots in an 802.14 or MCNS system.

FIG. 14 illustrates the content of the first minislot in block of awarded minislots. The length or number of symbols in a minislot is configurable by the headend controller. The first component of the first minislot is a guardband 421 of variable length which functions to separate minislots from each other in case not all the RUs have their minislot boundaries exactly synchronized in time to keep the payload data sections from interfering with each other. This is necessary in pure 802.14 or MCNS upstreams where the RUs are not as tightly synchronized to the CU minislot boundaries as in an SCDMA upstream. With an SCDMA upstream, the guardband will typically be 0 bits in length to gain additional bandwidth. The second component is a variable length preamble 423 during which known preamble data is sent. The preamble will be sent on the symbols in the minislot, no matter where the symbols fall in respect to time and codes. Although the preamble is variable in length, it will be controlled to always be an integer number of symbols. The preamble data is sent so that the CU can perform training such as equalization and power alignment and determining phase and amplitude errors to use in the receiver for this particular RU. The third component is 8 bytes of payload data, 425. This component will consist of the appropriate number of symbols needed to carry eight bytes of information. The length in symbols will depend on the modulation type, coding, etc. being used. In subsequent minislots of an assignment, each minislot is all data, and all minislots are the same length.

One requirement of 802.14 is that each APDU occupy an integer number of minislots when transmitted. Each APDU ranges from 54 to 74 bytes depending upon whether R-S encoding is or is not turned on. An APDU is therefore basically an ATM cell plus one byte of header parity plus possible multiple bytes of R-S ECC bits. To insure that each APDU occupies an integer number of minislots, each transmitter is allowed to vary the number of symbols in the guardband and preamble fields of the first minislot. One advantage of the use of SCDMA is that such precise alignment of each RUs minislot boundaries with the minislot boundaries of the CU can be obtained with the ranging algorithm that the guardband is not necessary. This gives greater flexibility in obtaining an integer number of minislots.

As an example of how to do this, suppose QPSK modulation with no FEC and no trellis encoding has been mandated by the headend controller. The length of the first minislot is G+P+32 symbols where one symbol is the unit of data transmitted in one upstream QPSK symbol time or constellation point, and G is the length of the guardband in symbols and P is the length of the preamble in symbols. The number of bits in each symbol depends upon the modulation time and whether trellis encoding is turned on or off. For QPSK, no trellis, each symbol is 2 bits. The 32 symbols factor is 8 bytes times 8 bits divided by 2 bits/symbol=32. Assuming the APDU is 54 bytes long since parity has been turned off, since we need an integer number of minislots to carry this many bytes, the following relationship is true:

$$32+n(G+P+32)=216 \tag{11}$$

where 32 is the number of payload symbols in the first minislot and (G+P+32) is the number of symbols in each subsequent minislot and n is the integer number of additional minislots needed, and 216 is the number of QPSK, no trellis symbols in 54 bytes. Since n has to be a factor of (216−32)=184 and has to be an integer, we choose n to be 4 which means G+P+32 must equal 46. We can then choose P to be 12 and G to be 2 resulting in a total number of required minislots of 5 to send a 54 byte APDU.

Figure 15:
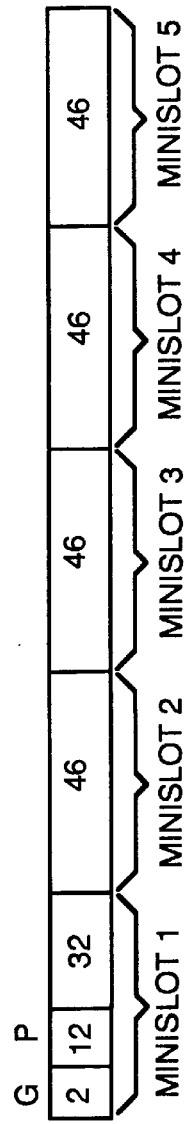
FIG. 15 is the resulting minislot data structure for a single QPSK, no trellis modulated transmission of a 54 byte APDU.

FIG. 15 is the resulting minislot data structure for a single QPSK, no trellis modulated transmission of a 54 byte APDU. When the headend controller picks a different modulation scheme or turns parity on, or both, the values for G and P will be recalculated by the headend controller and transmitted to the RUs. Modulation types or changes of parity occur infrequently and will usually be based upon line conditions and bit error rates. The RU, in some embodiments, does not need to figure out how many minislots it needs based upon the amount of upstream data. It just receives an award which is usually the number of minislots an RU needs to send one APDU. In other embodiments, the RU determines how many minislots it needs for the data it has to send and requests that many.

Figure 16:
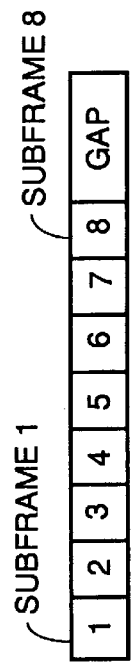
FIG. 16 is a diagram of the content of a single HS-CDMA frame generated by the transmitter of FIG. 13 showing the use of 8 symbols and a gap.
Figure 17:
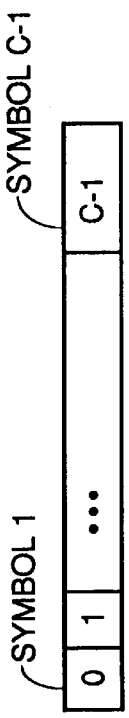
FIG. 17 is a diagram showing how each symbol in an HS-CDMA frame is comprised of the number of chips in the codebook.

To use SCDMA in this minislot environment there is a need to map the SCDMA frame structure to minislots. A new frame structure is defined for this environment which has 8 subframes and a gap in each frame, as shown in FIG. 16. With 802.14 and MCNS systems, 8-bit bytes are used, so by using an SCDMA frame with 8 subframes therein, no matter how many bits are transmitted in each subframe, there will always be an integer number of bytes of data that will have been transmitted in those 8 symbols. If there are C spreading codes in the codebook, each subframe will be comprised of C symbols, as shown in FIG. 17. In the SCDMA system, during one baud or symbol time, C symbols are transmitted. The codebook preferably has 156 codes, and each code has 156 elements, but the size of the codebook is programmable. If each code is a row in a two dimensional matrix, the matrix will have 156 columns each row of which is an element of one code. Each code therefore defines a 1×156 vector or one row of a code matrix. The subframe also defines a 1×156 vector with each element being a symbol for a 156 code codebook. To transmit that subframe by CDMA, the 1×156 vector of the subframe is matrix multiplied by the 1×156 vector of the code by multiplying the value of each symbol times the value of the corresponding element of the code vector and adding up the 156 partial products which result to give a 1×156 result vector (see FIG. 18C) comprised of 156 chips. That result vector is transmitted during that subframe's time of the SCDMA frame. Thus, if only one code is used in a 16 QAM R 3/4 trellis coded system with 3 payload bits per symbol, 3 payload bits will be transmitted in one subframe time=156 chip times of the result vector.

More precisely, the process of spreading the upstream payload data is illustrated in FIG. 18A through 18D. FIG. 18A represents the information vector created by the modem where 3 bits of payload data are put into each element of the information vector to which a spreading code has been assigned. The spreading codes are programmably mapped to particular minislot numbers in lookup tables stored in the CU and all RUs or maintained by minislot, symbol, frame and subframe counters in the CU and RU. Thus, the headend controller need not tell the RUs in the downstream minislot assignment messages which codes to use, and only tells them which minislots to which they have been assigned. Each RU converts this information to the symbol numbers to transmit and codes to transmit them on.

In FIG. 18A, it is assumed that the minislot assignment received by the RU maps to an assignment of only codes 1 and 2. Therefore, 3 payload bits comprising symbol 1 are put into the first element 427 of the 1×156 information vector I shown at 431 and 3 different payload bits comprising symbol 2 are put into the second element 429 of the information vector.

Next, assuming trellis encoding is turned on by the headend controller (hereafter HC), the information vector elements are processed by a trellis encoder to add one redundant bit to each of symbols 1 and 2, as shown in FIG. 18B. The trellis encoded symbols 1 and 2 are shown at 433 and 435. Each has 4 bits. If QAM or other phase and amplitude based modulation schemes are used, the trellis encoder actually outputs two information vectors. The first of these has elements that define the real part of every symbol and comprises the first two bits and the second of which has elements that define the imaginary part of every symbol and comprises the last two bits. The two separate information vectors are not shown in FIG. 18B. Each information vector is the raw data from which are result vector is created. Each result vector is the data transmitted during a subframe.

The next step is to spread the spectrum of the each of the real and imaginary parts of the information vector I by matrix multiplying it by the code matrix C representing the codebook to generate a 1×156 result vector R which also has real and imaginary parts. This matrix multiplication process is represented by FIG. 18C. There are actually two separate matrix multiplications, one for the real part of I and the other for the imaginary part of I. In FIG. 18C, only the matrix multiplication of the real part of information vector I is shown, and symbols 1 and 2 have been converted to the digital values for what each of their two bits represents.

The matrix multiplication is carried out as follows to calculate the real part of the first element of the real part 447 of the result vector R. To calculate the first element of R, the value of symbol 1, i.e., the first element of $[I]_{real}$ is multiplied by the first element 449 of the first row or code 1, and the value of symbol 2 is multiplied times the first element 451 of row 2 (code 2), and the value of symbol 3 (not shown) is multiplied times the first element in row 3 (code 3 not shown). Then the resulting 156 partial products are summed to yield some value X. This value X is assigned as the first chip 441 of the result vector $[R]_{real}$. Likewise, the second chip 445 of the result vector $[R]_{real}$ is derived by multiplying the value of symbol 1 of $[I]_{real}$ times the second element 453 of code 1 and multiplying the value of symbol 2 times the second element 455 of row 2, and so on (multiply each element of $[I]_{real}$ times the corresponding element of column 2) for all elements of $[I]_{real}$ to generate 156 partial products. The resulting partial products are then added to yield some value Y. This value Y is assigned as the second chip 445 of the result vector R. This process is repeated for each column of the code matrix C to yield the 156 chips of result vector $[R]_{real}$, and is then done again with the imaginary portion $[I]_{imag}$ of the information vector to compute the 1×156 vector $[R]_{imag}$. In other words, the value Z of chip 156 in the last element of $[R]_{real}$ is the sum of the partial products of multiplication of the 156 elements of $[I]_{real}$ times the elements of the 156th column of C. Note that although only two chips have nonzero values, this information is spread out in time over all 156 elements of the result vectors since the values of symbols 1 and 2 contribute to the value of each of the 156 chips of R. Note also that the "chips" of result vector 447 are really only the real parts of those chips and the actual chips of R are comprised of a real part and an imaginary part.

The value of the first element of $[R]_{real}$ is used to define the magnitude of one QAM point in the constellation, and the value of the first element of $[R]_{imag}$ is used to define the phase of that QAM point. This QAM point is transmitted during the first chip time during the transmission of subframe 1 of the CDMA frame. The real and imaginary components of the second chip 445 of the result vector define the magnitude and phase of a second QAM point which is transmitted during the second chip time of the first subframe time.

The discussion above describing the use of timestamp messages to determine a rough offset from the CU kiloframe boundaries is an improvement that helps speed up the trial and error ranging process described in the PCT publications incorporated by reference herein to achieve frame synchronization. This offset calculation process is not solely useful in MCNS environments. It can also be used in 802.14 and TDMA and SCDMA downstream environments like those symbolized by FIG. 1 so long as certain circuitry from FIG. 4 is included in the circuit of FIGS. 1 or 2 or 13 to generate timestamps and timestamp messages and to process them. The needed circuitry in the CU is timestamp counter 228, timestamp sampler 222 which samples at superframe or frame boundaries and at other times on a periodic basis, sync message generator 232 which sends sync and UCD messages in the downstream as described above, and MPEG encapsulation and timestamp insertion circuitry 176. The needed circuitry for the RU is the sync message detector 189, the local kiloframe sampler 208 and the local kiloframe counter 202. The kiloframes in an SCDMA receiver and transmitter for the upstream for use with an 802.14 or MCNS MAC layer correspond to the superframe boundaries defined above so substitute superframe boundary for kiloframe boundary in the previous discussion.

The RU offset calculation methodology of FIGS. 6 and 7 is equally applicable for use in the transmitters of FIGS. 1, 2 and 13 if the CU and RU include the timestamp and counter circuitry detailed in the paragraph next above and the MAC layer of the RU performs the algorithm described in FIG. 7. In the IEEE 802.14 environments in which the transmitter of FIG. 13 is intended to operate, there are no kiloframe boundaries in the CU upstream or downstream. However, there are rollover events of the minislot counter, and these rollover events effectively define superframe boundaries. Since the RU transmitters of FIG. 13 will include miniframe counters that are loaded to roll over at the same count the CU miniframe counter rolls over, the offset calculation of FIG. 7 will be performed to determine the offset between the CU superframe boundary or rollover event and the corresponding RU rollover event. The circuitry in the RU transmitter to do the needed symbol counting is shown at 422 in FIG. 13. This circuitry functions to count symbols (and may also count frames and subframes and superframes) thereby determining the minislot boundaries and superframe boundaries. The counter in the RU will be programmable and will include a load input on line 432 from the TC layer process to define how many symbol counts there are between rollover events.

Of course, all of the transmitters of FIGS. 1, 2 and 13 will work without the offset calculation and using solely the trial and error ranging process taught in either the 802.14 specification or the PCT publications to achieve superframe boundary and minislot boundary synchronization in the upstream. If the trial and error process is used alone, a transmit frame timing delay offset value will be generated from the ranging process, and that offset value will be supplied on line 415 in FIGS. 1, 2 and 4 to the upstream modulator, and on line 415 to the symbol counting circuitry 422 in FIG. 13. This offset value will be used to delay transmission of TDMA or SCDMA frames until a time when they will arrived aligned with the CU upstream TDMA or SCDMA frames or superframes. If the offset calculation adjunct to ranging is to be used in the embodiments of FIGS. 1, 2 and 13, then the aforementioned timestamp and counter and sampling circuitry and the MAC or TC layer process to carry out the algorithm of FIG. 7 will have to be included in the CU and RU. The resulting offset value, including any adjustments thereto resulting from the trial and error ranging process following the offset calculation, will be loaded via line 415 of FIGS. 1, 2, 4 or 13 to control release of symbol data into the multiplexing and modulation circuitry. In the transmitter of FIG. 13, the offset signal will be input to the symbol counter via line 415. The offset value offsets the symbol count on bus 424 in such a way as to achieve superframe boundary alignment for this RU with the CU superframe boundaries. During the trial and error ranging process, it is this offset value on line 415 in the embodiments of FIGS. 1, 2, 4 and 13 which is iteratively altered until the proper frame or superframe boundary alignment is achieved.

The buffer 419 receives R-S blocks and hold them until an information vector assembly circuit 436 asks for data.

In any of the embodiments of FIGS. 1, 2, 4 or 13, the coarse offset value resulting from the trial and error ranging process is followed by the fine tuning of frame or superframe boundary alignment carried out by the training algorithm taught in the PCT publication. Preferably, the offset value in these embodiments results from an offset calculation as detailed in FIG. 7 followed by the trial and error ranging process followed by the fine tuning of the frame or superframe alignment by the training algorithm. In still other embodiments where the system complies with 802.14, the 802.14 ranging process can be substituted for the trial and error ranging process described in the PCT publications to get a coarse frame/superframe boundary alignment followed by the fine tuning thereof by the training algorithm.

Returning to the consideration of FIG. 13, symbol counter 422 receives a rollover count on line 432 from the RU TC layer process in response to a message received from the HC. There are no frames in the upstream of an 802.14 system, but the rollover event effectively establishes a superframe boundary. In other words, the minislot counter in the CU gives each minislot a number, and the rollover count defines the end of the superframe at some integer number of minislots The HC's TC layer process in 802.14 compliant systems with SCDMA upstreams will be modified to understand that the RUs will be using spreading codes and symbol numbers that are mapped to minislot assignments by the process described with reference to FIG. 22. The HC TC layer process will be modified to reverse the process and assembled the recovered upstream data back into the assigned minislots for transmission to the CU MAC layer process.

The upstream data in the form of interleaved R-S blocks output by the buffer 419 on bus 434 are retrieved by an information vector assembly circuit 436. This circuit functions to take the data from the R-S blocks and assemble information vectors therefrom like the information vector I shown at 431 in FIG. 18A in accordance with the symbol numbers and code assignments inherent in the minislot assignment received by the MAC layer process from the HC. Each information vector is the raw data from which one subframe will be created. The information vector will ultimately get converted by other circuitry to a result vector R shown at 447 in FIG. 18C which will form one subframe in an 8-subframe frame as shown in FIG. 21.

The information vector assembly processor 436 receives a symbol number assignment on bus 430 and the modulation type from a signal on bus 442. It also receives a code size select signal on bus 450 which defines how many symbols may be put in each information vector so that there will be as many elements in the information vector as there are codes in the selected codebook defined by the signal on bus 450. The information vector assembly circuit also receives the current symbol count via bus 424 (and may also receive a frame and subframe count) from the symbol counter 422. The symbol counter 422 counts symbols and in some embodiments also counts frames and subframes and outputs this data on bus 424. The information vector assembly circuit compares the assigned symbol numbers on bus 430 to the symbol count on bus 424 and retrieves enough data from buffer 419 to assemble the assigned number of symbols given the modulation type. The modulation type is selected from a toolbox of supported modulation types by the HC. The selected modulation type determines how many bits are put into the symbols of the information vector. The specific symbols of the information vector which are populated with bits depends upon the minislot assignment because this defines the symbol numbers and codes which are to be used to send them. The information vector assembly circuit, in some embodiments, does a table lookup to map each symbol number in the assignment to a corresponding spreading code. In other embodiments, the codes for each symbol can be determined by the TC layer and sent to the information vector assembly circuit.

After determination of the codes to be used, the symbols are assembled from the R-S blocks and put into the elements of the information vector which correspond to the assigned code for each minislot. All other symbols that do not correspond to assigned codes are set to zero.

Eight information vectors are created per frame by the information vector assembly circuit 436, and these eight information vectors become, after trellis encoding, if any and CDMA spreading, the eight subframes transmitted for that frame. An integer number of frames will fit into each minislot, so all frames for the minislot in which they will be transmitted have their payload data put into the symbols of each information vector for the code or codes assigned to that minislot.

The information vectors are output on bus 438 to a programmable trellis encoded modulator 440. This modulator receives control signals on bus 442 from the MAC and/or TC layer processes in execution on processor 408. The content of these control signals are controlled by downstream messages from the HC. The control signals on bus 442 can turn trellis encoding on or off and select modulation types between the various types available. The modulation types available are QPSK, 8-QAM, 16-QAM, 32-QAM and 64-QAM. The HC controls the type of modulation used and whether trellis encoding is turned on or off based upon error rates which, in turn depend upon the vagaries of line infirmities. The modulation type selected controls the trellis encoding rate if trellis encoding is turned on.

For example, if QPSK is selected, a rate 1/2 trellis encoding is performed. If 8-QAM is selected, rate 2/3 trellis encoding is performed. If 16-QAM is selected, rate 3/4 trellis encoding is performed. If 32-QAM is selected, rate 4/5 trellis encoding is performed. Finally, if 64-QAM is selected, rate 5/6 trellis encoding is performed.

The trellis encoded modulator 440 performs the processing shown in FIG. 18B, has two internal components. The first is a convolutional encoder which is programmable to be turned on or off and which can encode at one of the selected rates. This can be as simple as a plurality of different rate trellis encoding convolutional encoders each of which can do one of the rates plus a bypass path and an input multiplexer that steers the input data to the appropriate encoder or bypass path if trellis encoding is turned off and an output multiplexer that takes output from the selected encoder or bypass path and couples it to an output bus. Thus, suppose 16-QAM is selected. In this case, the input data would be 3-bit chips which would be steered to the rate 3/4 convolutional encoder. Each 3-bit chip would be encoded with a redundant bit, and the output 4-bit chips would be coupled through the output multiplexer to the second component.

The second component of the trellis coded modulator is a symbol mapper. The symbol mapper takes the bits coming out of the convolutional encoder and maps them into the real and imaginary parts of the selected modulation type constellation. Thus, if 16-QAM is selected, the 4-bit chips coming out of the convolutional encoder are divided into two 2-bit real and imaginary parts. The two bit real part defines the amplitude of the vector to the constellation point and the 2-bit imaginary part defines the phase of that vector. The real and imaginary components are output from the symbol mapper on buses 444 and 446 to a CDMA spreading processor 448.

The CDMA spreading processor 448 can be any circuit that is capable of doing matrix multiplication of the real and imaginary information vectors on buses 444 and 446 by the code matrix of the codebook as shown in FIG. 18C.. The CDMA spreading circuitry receives a code size selection signal on bus 450 from the RU TC layer processor in accordance with instructions sent from the HC. For example, the code size may vary between 156 or 76. The CDMA spreading circuitry matrix multiplies each of the real and imaginary parts of each information vector times the code matrix of the selected codebook to generate real and imaginary parts of result vectors on buses 452 and 454.

The real and imaginary parts of each result vector are now ready to be assembled into a high-speed, synchronous CDMA frame. This is done by concatenation circuit 456 and optional gap insertion circuit 458. Concatenation circuit 456 functions to take the first eight result vectors and concatenate them end to end to form the payload portion of a first frame. The next 8 result vectors are concatenated to form the payload portion of the next frame.

The optional gap insertion circuit 458 functions to insert a programmable size gap vector comprised of any number of chips or a zero length gap. The size of gap is controlled by a gap size control signal received on bus 460 from the TC layer process. The gap insertion circuit inserts nonzero length gaps if a ranging algorithm is used which is other than the conventional 802.14 type ranging. If 802.14 ranging is to be used, the gap insertion circuit can be eliminated.

The gap insertion circuit also receives a barker code on bus 462 to define the data content of the chips of the gap vector. This will be explained more in the section on ranging below.

The resulting frames of data are supplied on buses 464 and 466 to a programmable pre-emphasis filter 468. The function of this filter is to alter the spectrum of the spread spectrum baseband data of the frames to be transmitted so as to counteract the effects of channel impairments. The channel impairments are determined during a training process which is described in greater detail in the PCT publications. Basically, the CU receiver determines the coefficients of a filter therein which causes the lowest error rate given current channel impairment conditions and sends those coefficients downstream to the RU transmitter via management and control messages. Those coefficients are determined by the iterative training process. The coefficients are then loaded into filter 468 via bus 470 by the TC layer process of the RU.

The output of the pre-emphasis filter 468 is applied to a polyphase transmit filter 472 via I and Q buses (I and Q rails) 469 and 471. The polyphase transmit filter comprises, among other things, a variable gain power amplifier, a square root raised cosine filter and a halfband filter. FIG. 19 is a block diagram showing more detail of the polyphase transmit filter. An upsampler circuit 480 receives the real and imaginary parts of the result vectors on the I and Q buses 469 and 471. The chips in these result vectors are arriving at a sample rate that has been selected by the HC. The function of the upsampler circuit is to double this sample rate $R_s$ so as to satisfy the Nyquist criteria. This is accomplished by inserting a zero between every chip in the real and imaginary result vectors thereby doubling their lengths.

The output of the upsampler 480 is coupled to I and Q inputs of a square root raised cosine filter 482. The square root raised cosine filter 482 converts the "white" Fourier spectrum of frequency components to a spectrum having an image in the frequency domain having a bandwidth of approximately 6 mHz (more precisely, 1.25*$R_s$, where $R_s$ is the symbol rate) and centered at zero frequency with additional images every 2*$R_s$ all the way out to infinity. The raised cosine filters has a bandwidth for its passband equal to the programmable symbol rate $R_s$ in use times 1 plus the alpha factor of the square root raised cosine filter, which is preferably set to 0.25. Thus, for a 5.12 megabaud "symbol" rate, i.e., 5.12 million symbols/second, the bandwidth of the raised cosine filter will be 6.4 mHz. The square root raised cosine filter has a transfer function characteristic suitable to shape the outgoing chip pulses so as to satisfy Nyquist criteria in a known manner so as to provide optimal signal-to-noise enhancement and so as to minimize intersymbol interference. Typically, there are two such square root raised cosine filters, one for the real and one for the imaginary rails, each having a transfer function which is the Hilbert transform of the other. In some embodiments, coefficient data is supplied via bus 476 from the TC layer process. The coefficient data on bus 476 provide the ability to set and change the filter characteristics of square root raised cosine filter.

The output of the square root raised cosine filter on buses 484 and 486 is a set of images in the frequency domain, each of which defines the entire signal to be transmitted and any one of which contains the entire information content of the information vectors. The output of the raised cosine filter is applied to a variable gain amplifier 490.

The variable gain amplifier 490 receives a fine power control signal on bus 474 from the TC layer process to control the level of output power of the transmitter so that all codes arrive at the CU at very close to the same power level. This fine power control is used in conjunction with a course power control signal described below to implement power incrementation in both ranging and training. The training process is described in the PCT publications. An adaptation of the ranging process defined in the PCT publications is described below.

Another upsampler circuit receives the output of the amplifier and doubles the sample rate again to 4*$R_s$. This changes the sampling rate of the signal at the output of the upsampler on buses 494 and 496 to cause a Fourier spectrum with images centered at zero frequency and at frequencies which are integer multiples of 2*$R_s$ out to infinity. The reason this circuit is used is to spread out the images further so that a SAW filter to be described below can be used to select one image without the need for tight filter specifications. To further prepare the spectrum for the SAW filter, the output of the upsampler 492 is coupled to a halfband filter 498. The halfband filter functions to remove every other image such that the images at 2*$R_s$ and 6*$R_s$ and 10*$R_s$ are removed and so on out to infinity.

The output of the transmit filter 472 is applied to the input of a frequency translator 500 in FIG. 13. Two equivalent embodiments for frequency translator circuits that can be used to practice the invention are shown in FIGS. 20 and 21. FIG. 20 shows a classical approach, while FIG. 21 shows the more modern approach using direct digital synthesizer technology. In FIG. 20, the incoming signal on buses 499 and 501 are each multiplied by a different 4 element repeating pattern vector that effectively defines the states of orthogonal sine and cosine waveforms at four phases 90 degrees apart, each having a frequency equal to the selected chip rate or sample rate $R_s$. For example, multiplier 502 multiplies the first chip in the result vector on bus 499 by 1 and the second chip by 0. The third and fourth chips are multiplied by −1 and 0 respectively, and then the process is repeated for the next four chips until the entire result vector has been so processed. Multiplier 504 multiplies the first chip in the result vector on bus 501 by 0 and the second chip by 1. The third and fourth chips are multiplied by 0 and −1, respectively, and then the process is repeated for the next four chips until the entire result vector has been so processed. This process mixes the signal which was QAM modulated in the trellis coding modulator up from baseband to the sampling rate $R_s$ and creates a real value signal instead of a complex value. The modified result vectors on buses 506 and 508 are vector summed by summer 510 and output on bus 512 to the input of a digital-to-analog converter 514. The DAC 514 converts the result vectors to analog signals which are applied to the input of a SAW filter 516 which functions to select one of the images out of the Fourier spectrum. Typically, the SAW filter has a bandwidth of approximately 6 mHz and has a fixed center frequency which is selected to pick an image centered at a frequency in the upstream band. This approach will work in embodiments with a fixed sampling rate $R_s$. However, in embodiments with variable sampling rates, there is a variable bandwidth at this point, so a bank of SAW filters of variable bandwidth with switching multiplexers will be needed (or a filter with a programmable bandwidth) so that the desired bandwidth can be selected to match the selected sample rate $R_s$.

To provide flexibility to the customer to center the transmitted signal at any desired frequency in the upstream band, a mixer 518 is provided which receives a reference frequency on line 520. This reference frequency is selected so that one of the sidebands will be at the desired frequency and the other is filtered out by a filter in the power amplifier 522. To avoid the expense of a bandpass filter and to allow a cheaper low pass filter to be used, typically, the signal on line 524 is mixed up so that all sideband components are out of the upstream band and then mixed back down so that only the lower sideband is in the upstream band at the frequency of interest, and a low pass filter is used to filter out all higher frequency components.

Finally, a power amplifier 522 having a course power control signal provided from the TC layer on line 528 is provided to amplify the signal on line 526 by a variable gain. The gain level is set in the ranging and training processes along with the fine power control signal on line 474 to cause all codes to be received at the CU at approximately the same power level.

The frequency translator of FIG. 21 uses an upconverter 530 which utilizes a direct digital synthesizer. The preferred form for this upconverter is as an Analog Devices 9856 chip. The upconverter receives the signals on buses 499 and 501 and performs all the functions of the circuit of FIG. 20 to mix them up to the desired output RF frequency, filter out undesired sidebands and convert the digital signals to analog signals. The reference frequency input on bus 520 is not required however, since the DDS has the capability to synthesize the needed reference frequency at a frequency controlled by a control word on bus 532 received from the TC layer process. Power amplifier 522 amplifies the output signal from the upconverter by a variable gain in accordance with a course power control signal on line 528.

Ranging in 802.14 Systems using SCDMA Upstreams

In the SCDMA transmitters of FIGS. 1, 2, 4 or 13, the offset value can be calculated using the conventional 802.14 ranging process as a substitute for the ranging process to be described herein. In the conventional 802.14 ranging process, there is no frame structure with gaps between frames in which barker codes can be transmitted. However, the HC will from time to time send a downstream management and control broadcast message telling all RUs that need to achieve synchronization with the CU minislot and superframe boundaries to send ranging information. This downstream message will assign an integer number of minislots of specified numbers during which to send the ranging information. Each RU will send some ranging information which can be detected with start of ranging transmission beginning at the boundary of the first assigned minislot in the block of minislots assigned to ranging information according to the RU's minislot count. The assigned minislots will be an integer number of minslots which totals about 400 microseconds, which is longer than the longest total turnaround time in the system. No RU will be assigned to send payload data during these minislots. Each RU's ranging data will be detected by the CU and the offset between that RU's ranging peak and the beginning boundary of the CU minislot block assigned to ranging will be calculated by the CU and sent downstream to that RU in a management and control message. The RU will then adjust its transmit frame timing delay so as to implement this offset so that its minislots will coincide with the corresponding CU upstream minislot boundaries. This way, the CU can demultiplex using the correct codes mapped to the various minislot numbers used by the RU to spread its upstream data.

Collisions between ranging data from different modems are resolved by the conventional 802.14 process.

Figure 23:
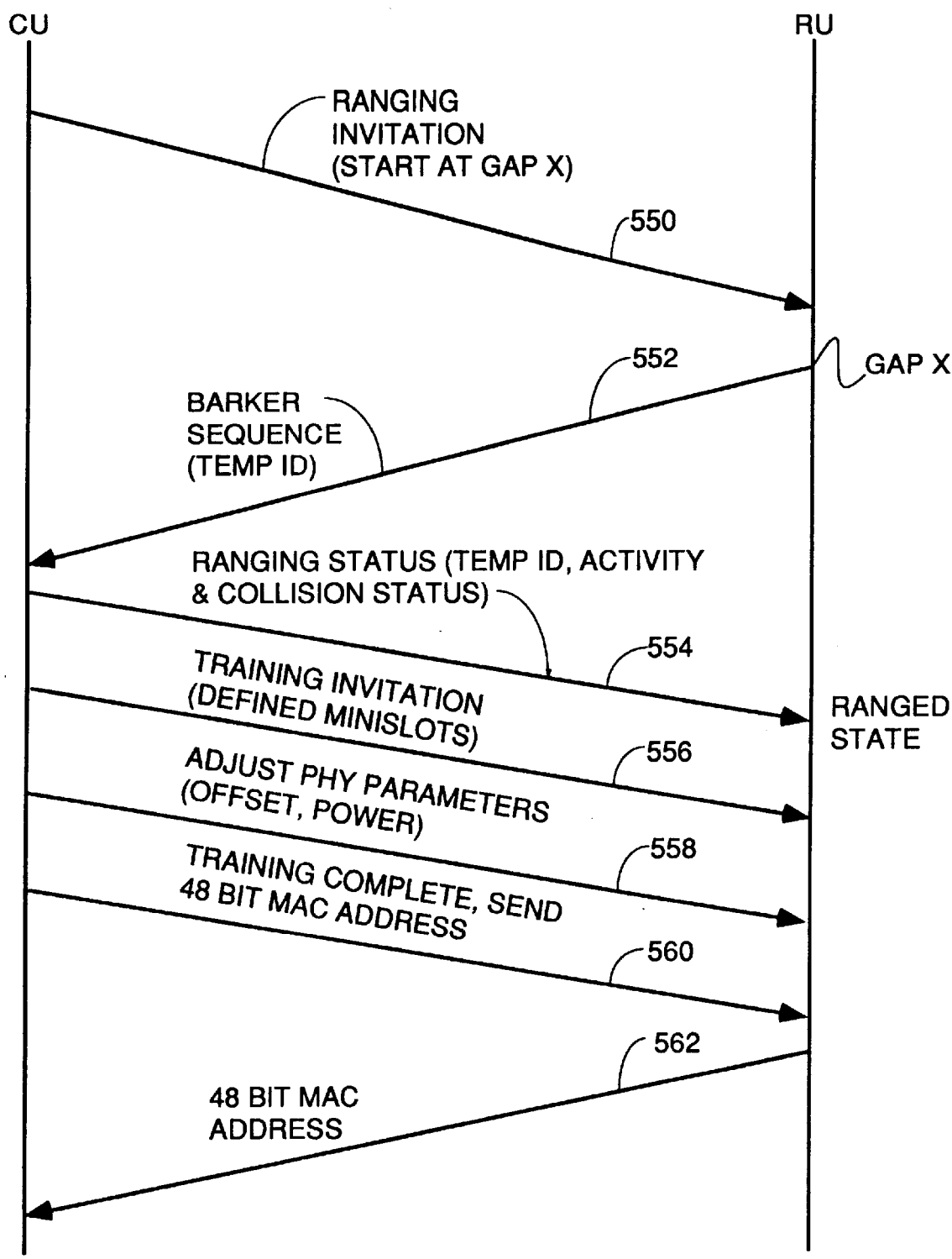
FIG. 23 is a message flow diagram of the preferred form of ranging and training processes that are carried out by the transmitter of FIG. 13 to achieve precise frame synchronization, equalization and power alignment.

The preferred form of ranging and training for an SCDMA upstream in an 802.14 or MCNS environment is symbolized by FIG. 23. The ranging and training processes are carried out by barker code detector 882 and computer 405 in the CU receiver of FIG. 24. The computer 405 is programmed to execute MAC and TC layer processes in the CU to generate the downstream messages detailed in FIG. 23 in response to signals received from the barker code detector 882 to implement the messaging protocol of FIG. 23. A programmed computer in the RU receives the downstream messages in MAC and/or TC layer processes and generates offset control signals and upstream management and control messages to implement the ranging and training transmissions as described with reference to FIG. 23.

In the ranging process of FIG. 23, the processor 408 in the SCDMA transmitter of FIG. 13 controls the gap insertion circuit 458 to insert gaps of 16 or 32 chips in every HS-CDMA frame. The programming of the CU TC layer processes executed by CPU 405 in FIG. 24 is modified from standard 802.14 or MCNS TC layers to understand these gaps and receive barker codes therein and implement the ranging protocol as shown in FIG. 23.

The ranging process is designed to determine the offset between the master clock tick counter and a corresponding tick counter in the RU. The CU has a 48-bit timestamp counter which counts cycles of the 20.48 mHz master clock. The RU also has a 20.48 mHz clock which is kept synchronized with the CU master clock by the clock recovery circuitry described earlier herein. The object of the ranging process is to determine the offset between these two counters and to determine a number which, when loaded into the 48-bit counter in the RU keeps its synchronized with the 48-bit timestamp counter in the CU. In FIG. 13, the 48-bit counter is one counter is a timebase of counter represented by symbol counter 422, and the offset being determined by the ranging process is the offset number on bus 415.

The ranging process starts with a downstream message 550 inviting any RU that needs to do ranging (also known as code synchronization) to commence ranging at some gap X (each gap is numbered as is each frame). The "gap X" terminology is actually a mapping to a particular count to be reached in the future by the CU 48-bit timestamp counter. Therefore, one modification to the CU TC layer process is that it needs to understand that the gaps are numbered and correspond to certain counts of its 48-bit counter. Any RU that needs to do code synchronization then sends a barker code sequence over a sequential series of gaps starting with gap X as determined from the 48-bit counter in the RU. That is, when the 48-bit counter in the RU reaches the count in the ranging invitation message, it starts to send its barker sequence.

The barker code sequence is a 17 gap sequence that has a start "bit", i.e., an initial barker code having 16 chips, followed by 16 consecutive on/off gaps with exactly 50% of the 16 gaps being on and 50% being off. An "on" gap is defined as a gap during which a barker code is sent and is termed a 1 bit whereas a gap with no barker code in it is a 0 bit. When beginning the ranging sequence, an RU will randomly choose a value with eight "1s" and eight "0s" to define the barker code sequence and act as the temporary ID. This temporary ID is used by the HC to communicate with the RU until it has achieved a fully ranged and trained state and can reliably transmit its full 48-bit MAC address.

Note that at the time the ranging transmission starts at what the RU thinks is the assigned gap, the minislot and symbol counters in the CU and RU, respectively, may be so far misaligned that the barker codes which appear to be in gaps as far as the RU is concerned are not in gaps when they reach the CU.

The 50% on/off sequence is used to allow the CU to determine when more than one RU's barker codes are simultaneously hitting the same gaps. The code synchronization process, with a 16 chip gap, can at most do code synchronization of one RU at a time. With a 32 chip gap, two RUs can be code synchronized at the same time.

Assuming that only one RU is doing code synchronization at some particular time, the RU picks an inaugural power level and transmit frame timing delay value, and using these assumed values, sends it 17 gap barker code sequence starting at what it thinks is gap X. The RU then waits for a downstream message from the CU saying it has seen that RU's temporary ID in the gap. The 17 gap barker sequence is symbolized by message line 552.

If no downstream message is received indicating that the barker code start bit hit the correct gap, the RU waits for another ranging invitation, and then increments its transmit frame timing delay value in its timebase by 4 chips (or some other programmable increment) and sends the sequence again at the same power level starting at the assigned gap in the ranging invitation. This process is repeated until either the downstream message is received indicating it hit the gap, or the transmit frame timing delay has been incremented enough to have moved through an entire HS-CDMA frame level. If the latter happened, then the power level is incremented, and the transmit frame timing delay is set back to its inaugural value and the process is repeated for the new power level and all values for the transmit frame timing delay until the gap is hit or an entire frame of incrementation has occurred.

Message line 554 represents the downstream message after the right combination of transmit frame timing delays and power level has been found to hit the gap and be heard. This downstream message will happen after the CU has listened to 17 consecutive gaps and determined either that it knows the RU's temporary ID or that more than one RU has hit the gap. In the hypothetical situation being considered, only one RU is ranging, so the latter possibility will not occur. But, if two or more RUs hit the gap simultaneously, more than 50% of the 16 on/off gaps following the start bit will be logic 1 meaning a collision has occurred. If a collision has occurred, the message 554 so indicates and each RU performs its collision resolution protocol. This protocol basically involves the digital equivalent of flipping a coin in each RU that is attempting ranging to determine whether that RU will continue attempting to range. The ones that lose, stop ranging and try again later. The ones that win, continue. Eventually, only one RU will have hit the gap, and downstream message 554 will state that and give the temporary ID of the RU that hit the gap.

That RU recognizes its temporary ID in message 554 and sets its offset value and power level at the values which caused it to hit the gap. The RU is now in a ranged state, except that the prior ranging process is actually only a coarse tuning of both the transmit frame timing delay and power levels. The fine tuning of both of these values comes next so as to minimize the ISI generated between codes.

Fine tuning starts with the downstream training invitation of message line 556. This causes the RU to start the training process described in the PCT publications incorporated by reference herein as the prechannel equalization training algorithm. The training invitation names the gaps and/or minislots in which it is expecting to receive the training data, and causes the RU which has just reached the ranged state to send predetermined training data known to both the CU and RU during the assigned minislots using predetermined codes. This training data will be injected into the transmitter by the RU TC layer process via bus 406 in FIG. 13. The CU correlates the transmitted training data against a number of neighboring codes to determine if the data is causing interference with neighboring codes, and then sends downstream messages to adjust the transmit frame timing delay of the RU to minimize the ISI. The CU may also do the fine timing alignment on gaps using an early-late gating technique.

The CU then does a power alignment, usually on minislots assigned by the HC TC layer. This is done by letting an adaptive gain control circuit in the CU receiver settle on a gain during the training sequence in the assigned minislots and sending that gain downstream to the RU to establish its power control signals at the proper levels so the data received from this RU arrives as very close to the same power level as data received from the other RUs. The RU then does an upstream equalization process by sending predetermined training data over a predetermined number of minislots. The CU responds by letting the FFE and DFE adaptive filters therein and the least means squared algorithm settle on tap weight coefficients which equalize the upstream channel. These coefficients are then sent downstream to the RU and are used to establish the tap weight control signals of the RU transmitter pre-emphasis filter on bus 470 in FIG. 13. This downstream transmission or transmissions to send the offset, power alignment power levels and equalization coefficients is symbolized by downstream message 558. The downstream equalization process taught in the PCT publications is not used and the standard 802.14 downstream equalization procedure is used since there are no CDMA spreading codes used in downstream transmissions.

After training is complete, the CU sends a downstream message 560 indicating that training has been completed and requesting the RU to send its 48-bit MAC address. The RU then responds with message 562 by sending its 48-bit MAC address. FIG. 24 is a block diagram of one form of receiver circuit that can be used in the CU to correct for phase and amplitude errors in the constellation points transmitted from each RU and implement the training and equalization processes described below. The receiver design of FIG. 24 can also be used as the RU receiver, and regardless of whether it is used in the RU or CU or both, is independent of the exact form of TDMA or CDMA multiplexing used. The description of the receiver below includes discussion of both RU and CU embodiments The RF signals arrives at the receiver on coaxial cable 30 or other media. An RF demodulator section 750 demodulates the RF signals in the case of the RU receivers using a local carrier reference signal on line 762 which is phase coherent with the downstream carrier generated by the CU transmitter. In the case of an RU receiver, a separate tracking loop (not shown) generates the local carrier signal on line 762 from the recovered downstream clock so as to be phase coherent with the master clock in the CU.

In the case of a CU receiver, the data from each RU is detected by generating local upstream carrier on line 762 from the CU master clock and achieving synchronization with the RU upstream chip clock using the ranging process. Phase and amplitude errors in the constellation points transmitted by each RU are corrected using the preamble data sent in each timeslot by the RU prior to sending payload data. The amplitude and phase corrections for each RU's constellation points is done and using the rotational amplifier 765 and G2 programmable gain amplifier 788.

In either the CU or RU case, the demodulator 750 U receives a synthesized local carrier signal on line 762 and uses it to demodulate the incoming RF. The RF demodulator 750 also samples the analog signal at 4 times the symbol or chip rate and outputs a stream of digital samples on line 752 carrying the chip or symbol amplitude information for all time slots or minislots. Phase separation of the sine and cosine components of the QAM modulated data is performed by a matched filter in demodulator 750. The matched filter has two filters which have filter characteristics that are the mirror image of the square root raised cosine filter in the transmitter. The matched filters separate the orthogonal real and imaginary components in the received signals and transmit them to the frame detector 882 and demultiplexer 883.

The demultiplexer 883 is any conventional TDMA, CDMA or SCDMA demultiplexer and functions to demultiplex the data using the inverse procedure of whatever TDMA, CDMA or SCDMA multiplexing was used by the transmitter in the RU or CU.

For an RU receiver, the frame detector 882 functions to aid in clock recovery in SCDMA downstreams with barker codes transmitted by the CU which encode the master clock. In 802.14 and MCNS environments, downstream clock recovery is by conventional circuitry. In SCDMA downstreams, clock recovery is performed in the RUs by frame detector 882 using the fine tuning circuitry taught in the PCT publications. This circuitry generates a clock steering tracking error signal on line 900 which is transmitted to the digital equivalent of an integrator in control loop 781. The control loop serves as a loop filter for a phase lock loop including VCXO 45 (RU only). The averaging process of integration eliminates the random noise. The integrated error signal is output as a clock phase steering signal on line 37 to the error signal input of VCXO 45 to generate the recovered downstream clock signal on line 43 in the RU only. The CU receiver does not have a clock tracking loop like that just described.

The frame detector 882 also functions in CU receivers to detect barker codes in upstream gaps for purposes of ranging. For RU receivers in SCDMA downstream environments, the frame detector 882 is used to detect barker codes sent by the CU in downstream gaps to establish the CU frame boundaries, but is not used for this purpose in any other downstream environment. The frame detector 882 in the CU receiver also functions to look for ranging Barker codes and supports the process of instructing the RUs on how to alter their transmit frame timing delay values "OFFSET" so that their Barker codes hit the gap. The frame detector derives status information regarding positioning of the Barker codes in the gaps during the ranging. This data is relayed to the CPU 405 via DMA transfers over bus 755 The frame detector also functions to count upstream frames. The frame count information derived by the frame detector is sent via bus 755 to CPU 405.

The CPU 405 executes TC layer processes to use the information received on bus 755 and generates downstream messages to carry out ranging and training. The downstream messages on bus 406 include data as to collisions during ranging and data to be sent to the ranging circuitry in the transmitter for purposes of setting transmit frame timing delay offset. These messages to the transmitter include data telling the transmitter ranging circuit when the Barker code has been received in each frame thereby establishing the receive frame timing reference, and how to adjust the delay factor that establishes the transmit frame timing reference before sending each Barker code.

In the case of a CU receiver, the data from each RU is detected by a process using an RU upstream signal with preamble data sent by the RU prior to sending payload data and using the rotational amplifier 765 and G2 amplifier 788 to correct for amplitude and phase errors. That is, to minimize errors in interpretation of the upstream received chip data caused by amplitude variance caused by differing path length losses from the various RUs and channel impairments, a separate gain control and phase adjustment is used for each RU. This is done by transmitting from each RU a preamble of known data before the payload data for each timeslot or minislot assigned to that particular RU. The term timeslot in SCDMA systems assumes each RU receives digital data which is put into timeslots in the upstream assigned to that RU by the CU, each timeslot mapping to symbols in a frame which have their spectrums spread using codes which are also mapped to the timeslots by the minislot to symbol mapping.

To achieve the individual gain adjustment for each RU, a variable gain G2 amplifier 788 is employed in the CU demodulator/demultiplexer shown in FIG. 24 to amplify each timeslot's data with an individual gain value. The individual gain value is established to overcome the near-far problem so that the data from all the RUs, regardless of their distance from the CU, have their data received at the same amplitude level at a slicer 800. The same G2 amplifier is employed in the RU receivers, but the gain value is fixed at one value for all the timeslots or minislots from the CU so that the CU signals will be adequately strong to be detected in the slicer and a Viterbi decoder 850.

The control loop logic 781 assists in the gain adjustment process in the RUs by sending a desired gain signal on line 790 to G2 amplifier 788. The details of the design of the control loop circuitry 781 are not critical to the invention and any person skilled in the art can design suitable circuitry to function in the manner specified herein.

In the CU receiver, the gain adjustment factor on bus 790 results from the inputs received on buses 792 and 794. The input on bus 792 in the CU receiver tells the control loop which particular timeslot's data is currently at the input 789 of the G2 amplifier 788 and is generated by the TC layer process using information from the CU minislot counter and a minislot to frame number mapping function carried out in the TC layer process of the CU. The control loop 781 in the CU receiver also receives an input signal on bus 1086 from CPU 405 and a TC layer process which indicates when preamble data for a particular timeslot or minislot is being received by the CU from a particular RU.

The input to the control loop 781 on bus 794 from memory 796 is the gain adjustment factor to use for the particular RU being received at any particular time. The memory 796 stores a unique gain and phase adjustment to be used for each RU once the proper adjustments are determined for the RU. In the RU receiver, memory 796 stores only one gain adjustment value.

During reception of preamble data from a particular RU identified by the data on bus 792, the control loop 781 cooperates with the slicer 800, the G2 amplifier 788 and a rotational amplifier 765 to carry out an iterative process. The overall function of this process is to develop a suitable gain and phase adjustment value for the RU whose preamble data is being received. The iterative process is comprised of a sequence of iterations and adjustments in gain and phase adjustment values on buses 790 and 802 to reduce the slicer error to as low a value as possible. The theory behind this process is that by adjusting the amplitude error and phase error coefficients in the Error Correction Factor Equation given below, the gain and phase errors that affect this RU's transmitted constellation points can be reduced to zero. Specifically, the job of the CU receiver slicer detector 467 is to determine the correct $1/a$ and $e^{-j\phi}$ coefficients in a multiplication factor of the form:

$$(1/a)*e^{-j\phi}$$

where
  $1/a$ is the gain correction coefficient to solve the near-far problem and correct for channel impairments; and
  $e^{-j\phi}$ is the phase error correction coefficient to solve the near-far problem and correct for channel impairments and get the CU synchronized with each individual RU despite differing path lengths and differing channel impairments between the CU and each RU.

Specifically, the CPU 405 will signal the control loop 781 and slicer 800 when preamble data is being received from an RU via the signal on line 1086 thereby causing the iterative process to start. When the known preamble data is being received, the control loop will set initial values for the $1/a$ and $e^{-j\phi}$ amplitude and phase error correction factors of the Error Correction Factor Equation , and transmit these on buses 790 and 802, respectively, to the G2 amplifier 788 and rotational amplifier 765. In the preferred embodiment, the G2 and rotational amplifiers are the same amplifier, but they are shown separately in the figure for clarity of illustration of the concept. These circuits in the CU receiver will operate on the received data samples to make amplitude and phase error corrections. In the CU receiver only, the slicer will compare the received preamble data signal to the 3-j constellation point it knows it is supposed to be receiving during the preamble to derive amplitude and phase correction factors for the particular RU that sent the preamble data. The amplitude and phase errors between the actual received data and the 3-j point are output on bus 798 to the control loop 781. The control loop 781 examines these error values, and adjusts the 1/a and $e^{-j\phi}$ amplitude and phase error correction factors in an appropriate direction to tend to minimize the slicer error. The process repeats itself for the next preamble 3-j constellation point. Eventually, the control loop finds values for the 1/a and $e^{-j\phi}$ amplitude and phase error correction factors that minimize the amplitude and phase error values on bus 798. These values are then recorded in memory 796 as the 1/a and $e^{-j\phi}$ amplitude and phase error correction factors to use in receiving in the CU data for the timeslot(s) assigned to the particular RU for which the correction factors were calculated. The process is repeated for each RU each time the RU transitions from an idle state to an active state. This process resynchronizes the CU receiver detection process for each RUs data occasionally or periodically without the use of tracking loops in the CU. These correction factors are used only for controlling the G2 amplifier and rotational amplifier in the CU receiver and are not used to steer any clock or carrier VCXOs in tracking loops.

In the preferred embodiment, the output of the rotational amplifier 765 is filtered by an FFE filter 764 which functions to cut down on precursor and postcursor intersymbol interference. The FFE filter 764 is an adaptive FIR filter. Adaptive FIR filters and many of the other digital signal processing components of the circuitry disclosed herein are known and are discussed in detail in Elliott, *Handbook of Digital Signal Processing: Engineering Applications,* (Academic Press, Inc. San Diego, 1987), ISBN 0-12-237075-9, which is hereby incorporated by reference.

The receiver of FIG. 24 uses two feed forward equalizers (FFE) and two decision feedback equalizers (DFE). The first FFE and DFE is shown combined as filter 764. The second FFE and DFE filter is circuit 820. The circuits 820, 830, 832, 800, 767 and the FFE/DFE filter 764 are collectively used to implement training and power alignment by the process described in the PCT publications. This process can be replaced by other known training and equalization processes.

All the DFE and FFE circuits are FIR filters with adaptive tap coefficients. There is one main tap designated tap 3 and three secondary taps designated taps 0 through 2. The DFE circuit 820 and the FFE circuit 764 receive their adaptive tap coefficients on buses 842 and 838, respectively, from the least mean square calculation circuit 830.

The FFE and DFE FIR filters are given initial values for their adaptive tap coefficients that are close enough to allow the adaptation process to proceed. These preset coefficients are supplied from the CPU 405 via buses 824 and 821. Thereafter, the coefficients are adaptively altered by signals on buses 842 and 838 by a least mean squared circuit 830 using a conventional precursor and post cursor ISI elimination tap coefficient calculation algorithm.

The LMS starts with the initial tap weights and iteratively calculates the convolution sum between the tap input signals (input signals to each stage of the tapped delay lines) within the FFE 764 and the DFE 820 and the tap coefficients of the FFE 764 and DFE 820, all of which are obtained via bidirectional buses 842 and 838. The LMS then receives error signals on bus 831 calculated by difference calculation circuit 832 defined as the differences between the desired data points on bus 836 and the received data points on bus 834. The LMS then calculates new tap weights by multiplying the error signals times the corresponding tap input signals used to calculate the convolution sum times a predetermined step size which sets the rate of convergence to a stable value, and the result is added to the old tap weights to arrive at the new tap weights. These new tap weights are then sent to the FFE 764 and DFE 820 for use during the next iteration.

The LMS circuit implements a calculation which is based upon the fact that the needed change in the adaptive coefficients to the adaptive FIR filters 764 and 820 is proportional to the error on bus 831 times the conjugate of the data being input to the filters. In other words, the error is multiplied by complex numbers representing the received chips which have had the signs of their Q or imaginary components inverted.

The DFE filter eliminates or reduces post cursor interference by supplying a subtraction value on bus 846 to subtractor 767. The data sent by the DFE filter on bus 846 is subtracted from the data on bus 769 output by the FFE filter 764 during the equalization training interval. Eliminating the precursor interference and post cursor interference from the data on the bus 834 allows the slicer 800 and a Viterbi Decoder 850 to make better decisions about what chips were actually sent despite the channel impairments. The LMS, DFE and FFE circuits can be eliminated in some simple embodiments with, for example, only 4 points in their constellations. But to get more data throughput, more complex constellations are needed, and in such a situation, the points are closer together and ISI interference makes decisional discrimination between the constellation points more difficult. This creates a need for the above described ISI elimination circuitry.

After correction for ISI interference, the corrected data is passed via bus 834 to slicer 800. The purpose of the slicer is to make instantaneous decisions regarding which point in the constellation each chip represents for purposes of generating the gain and phase errors needed by the control loop and for purposes of generating the desired data on bus 836. The slicer does not make use of the redundant bit in each chip added by the Trellis encoder for this purpose, and, as a result, makes errors in interpreting chips. It is up to the Viterbi Decoder 850 to correct these errors of interpretation using the redundant bits added by the Trellis encoding modulator in the transmitter.

Viterbi Decoders are well known in the art, and any Viterbi decoder algorithm will suffice for purposes of practicing the invention. Basically, Viterbi Decoder 850 and memory 852 keep track of the present and last state for each timeslot for purposes of tracing a path through a three dimensional space defined by the constellation of permissible input points stretched out over a third axis representing time which is orthogonal to the I and Q axes. There is one of these three dimensional spaces for each timeslot. By making use of the redundant bit or bits in each chip, and examining the path the states of each timeslot take through the appropriate 3-D space over time, the Viterbi Decoder makes a better informed decision as to which legitimate point in the constellation of permissible points each received code represents. The information on bus 792 to the Viterbi Decoder from the TC layer process tells the Viterbi Decoder which timeslot or minislot during which each code received on bus 836 was transmitted. The Viterbi Decoder uses this information to generate an address pointer to memory 852 pointing to the state information for that timeslot. This allows memory 852 to output the state information which is used by the Viterbi Decoder to make its analysis. The recovered upstream data is output on bus 74/220.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A data transceiver node, comprising:
   a master clock having an output at which a master clock signal is generated;
   a timebase having an input coupled to receive said master clock signal and having an output at which a downstream and upstream clock signal generated from said master clock signal appears, each of said upstream and downstream clock signals being phase coherent with said master clock signal;
   a downstream data input;
   an SCDMA downstream modulator coupled to said downstream data input and coupled to receive said downstream clock signal and having a chips output;
   a downstream carrier synthesizer coupled to receive said master clock signal and having a downstream carrier output at which a downstream carrier appears which is phase coherent with said master clock signal;
   a first mixer having a first input coupled to said chips output and having a second input coupled to said downstream carrier output and having an output at which modulated downstream signals appear for coupling to a transmission media or media transmitter;
   a second mixer having an input for coupling to a transmission medium or media receiver, and having a carrier input for receiving an upstream carrier, and having an output at which baseband demodulated upstream signals appear;
   an upstream carrier synthesizer coupled to receive said master clock signal and having an output at which a synthesized upstream carrier signal appears which is phase coherent with said master clock signal, said output coupled to said carrier input of said second mixer; and
   an SCDMA upstream demodulator having an input coupled to said output of said second mixer and having an input coupled to receive said upstream clock signal, and having an output at which recovered upstream data appears, and including means for correcting phase and amplitude errors in incoming constellation points transmitted from other data transmission nodes located at varying distances from said data transceiver, and further comprising means for achieving frame synchronization or minislot boundary synchronization.

2. A digital data transceiver comprising:
   a first mixer having an input for receiving code division multiplexed downstream signals and having a carrier input for receiving a local downstream carrier, and having a product output at which demodulated signals appear;
   an SCDMA demodulator having an input coupled to said product output and having a clock input and having a clock steering output and having a recovered downstream data output;
   a voltage controlled oscillator having an error signal input coupled to said clock steering output and having a recovered clock output;
   a clock multiplier having an input coupled to said recovered clock output and having a recovered downstream clock output coupled to said clock input of said SCDMA demodulator;
   a clock divider having an input coupled to said recovered clock output and having a clock output;
   a first synthesizer having an input coupled to said clock output of said clock divider and having an output coupled to said carrier input of said first mixer at which a first carrier appears which is phase coherent with said recovered clock;
   an SCDMA modulator/multiplexer having an input for receiving upstream data and having a clock input coupled to said recovered clock output of said clock multiplier and, optionally, capable of carrying out any form of prior art ranging or other process to achieve frame synchronization or alignment of minislot boundaries of said data transceiver with minislot boundaries in a receiving node, and if said ranging or other prior art process to achieve frame synchronization or alignment of upstream minislot boundaries with minislot boundaries at a receiving node are carried out externally to said SCDMA modulator/multiplexer, said SCDMA modulator/multiplexer also has an input for receiving a transmit frame timing delay value derived by said conventional ranging or other prior art processes to achieve frame synchronization or alignment with minislot boundaries, said transmit frame timing delay value for use in setting the proper transmit timing delay to achieve frame synchronization or minislot boundary alignment at a receiving node with like numbered frames or minislots transmitted from other data transceivers transmitting to the same receiving node from different locations, and having an output at which code division multiplexed upstream signals appear;
   a second synthesizer having a clock input coupled to said clock output of said clock divider and having an upstream carrier output at which an upstream carrier appears which is phase coherent with said recovered clock;
   a second mixer having an input coupled to said output of said SCDMA modulator and having an input coupled to said upstream carrier output of said second synthesizer, and having an output for coupling to a shared transmission media.

3. A digital data transceiver comprising:
   a master clock for generating a master downstream clock signal at a clock output having a frequency which is an integer multiple of a downstream symbol or chip rate, $F_{ds}$;
   a downstream modulator implementing any form of TDMA or CDMA multiplexing or no multiplexing at all and any form of modulation, and having a clock input coupled to said clock output of said master clock, and having a data input for receiving downstream data and having a data output at which symbols to be transmitted downstream appear;
   a downstream mixer having a data input coupled to said data output of said downstream modulator and having a carrier input for receiving a downstream carrier, and having a data output for coupling to a transmission media;
   an upstream clock generator having a clock input coupled to said clock output of said master clock and having an upstream clock output at which appears an upstream clock signal having a frequency which is M/N times the frequency of said downstream clock signal where M and N are integers;
   a frequency divider having a clock input coupled to said upstream clock output of said upstream clock generator and having a carrier clock output at which a carrier clock signal appears;

a downstream carrier synthesizer coupled to receive said carrier clock signal from said frequency divider and having an output at which appears a downstream carrier signal which is phase coherent with said downstream clock signal and which is coupled to said carrier input of said downstream mixer;

an upstream carrier synthesizer having a clock input coupled to said carrier clock output of said frequency divider, and having an upstream carrier output at which appears an upstream carrier signal which is phase coherent with said master downstream clock signal;

an upstream mixer having a carrier input coupled to said upstream carrier output of said upstream carrier synthesizer, and having an input for coupling to a transmission media to receive upstream signals, and having an output at which baseband demodulated upstream signals appear;

an upstream demodulator/demultiplexer implementing any form of TDMA or SCDMA or CDMA demultiplexing, or no demultiplexing at all if the incoming data is not multiplexed, and which implements any form of demodulation, and which is capable of carrying out prior art ranging or other processes to achieve frame synchronization or alignment of minislot boundaries of the transmitted signal to minislot boundaries in said data transceiver, and having a clock input coupled to said upstream clock output of said upstream clock generator, said upstream demodulator/demultiplexer having an input coupled to receive said baseband demodulated upstream signals, and having an output at which appears recovered upstream data.

4. A data transceiver, comprising:

a downstream mixer having an input for coupling to a transmission media and having a downstream carrier input, and having an output at which baseband downstream signals appear;

a downstream demodulator/demultiplexer which can be any conventional demodulator/demultiplexer and which has a clock input to receive a downstream clock signal and an input coupled to receive said baseband downstream signals, and an output at which recovered downstream data appears and which includes conventional downstream clock recovery circuitry, and a clock steering output at which appears a clock steering signal;

a voltage controlled oscillator having a control input coupled to said clock steering output so as to receive said clock steering signal, and having a recovered downstream clock output at which a recovered downstream clock signal appears, said downstream clock output coupled to said clock input of said downstream demodulator/demultiplexer;

an upstream clock generator having an input coupled to receive said recovered downstream clock signal and having an upstream clock output at which appears an upstream clock signal which is phase coherent with said recovered downstream clock signal and which has a frequency which is related to the frequency of said downstream clock signal by the ratio M/N where M and N are integers;

a frequency divider having a clock input coupled to said upstream clock output so as to receive said upstream clock signal, and having a carrier clock output at which a carrier clock signal appears;

a downstream carrier synthesizer having a clock input coupled to said carrier clock output to receive said carrier clock signal, and having a downstream carrier output at which a downstream carrier appears which is phase coherent with said recovered downstream clock, said downstream carrier output coupled to said downstream carrier input of said downstream mixer;

an upstream carrier synthesizer having a clock input coupled to said carrier clock output to receive said carrier clock signal, and having an upstream carrier output at which an upstream carrier signal appears which is phase coherent with said recovered downstream clock;

an upstream mixer having an upstream carrier input coupled to said upstream carrier output and having a symbol input for receiving symbols to be transmitted upstream, and having an output for coupling to a transmission media; and an upstream modulator/multiplexer which is capable of performing one or more forms of multiplexing including TDMA or SCDMA or CDMA using any prior art circuitry and is, optionally, capable of carrying out ranging or other prior art processes of achieving frame synchronization or alignment of upstream minislot boundaries with minislot boundaries at a receiving node, and having an input coupled to said upstream clock output and having an input for receiving upstream data and, if said ranging or other prior art process to achieve frame synchronization or alignment of upstream minislot boundaries with minislot boundaries at a receiving node are carried out externally to said upstream modulator/multiplexer, said upstream modulator/multiplexer also has an input for receiving a transmit frame timing delay value derived by said conventional ranging or other prior art processes to achieve frame synchronization or alignment with minislot boundaries for use in setting the proper transmit timing delay to achieve frame synchronization or minislot boundary alignment at a receiving node with like numbered frames or minislots transmitted from other data transceivers transmitting to the same receiving node, and having an output coupled to said symbol input of said upstream mixer.

5. A digital data communication system comprising:

a shared transmission medium;

in a first node:

a master clock for generating a downstream clock signal having a frequency $F_{DS}$;

a first upstream clock generation means having an input coupled to receive said downstream clock signal from said master clock for generating at an output an upstream clock signal having a frequency $F_{US}$ which has a frequency equal to $(M/N)*F_{DS}$ where M and N are integers;

first means having an input for receiving downstream data to be transmitted on said shared transmission media and having an input coupled to receive said downstream clock signal, and having an output coupled to said shared transmission medium, for generating a downstream carrier from said downstream clock signal and using said downstream clock signal to organize said downstream data into a plurality of symbols, and, if necessary, using said downstream clock signal to time division or code division multiplex said symbols if data from more than one sources must be kept separate, and modulating said symbols onto said downstream carrier and launching the modulated downstream signals into said shared transmission medium;

in one or more second nodes:
second means having an input coupled to said shared transmission media and having clock recovery means for recovering said downstream clock signal from modulated downstream signals on said shared transmission media and outputting the recovered downstream clock signal at a dowstream clock output, said second means functioning to use said recovered downstream clock signal to demodulate said modulated downsteam signals and recover said downstream data or, if necessary, to demultiplex said demodulated downstream signals to generate demultiplexed signals and recover said downstream data from said demultiplexed signals;

a second upstream clock generation means having an input coupled to receive said recovered downstream clock and having an output at which a phase lock loop generates an upstream clock signal having a frequency $F_{US}=(M/N)*F_{DS}$ where M and N are integers, said upstream clock signal being generated from said recovered downstream clock signal so as to be phase coherent with said recovered downstream clock signal;

third means having an input for receiving upstream data bits and having an input coupled to receive said upstream clock signal, said third means for using said upstream clock signal to organize said upstream data bits into one or more chips or symbols to be transmitted to said first node, and, if necessary, for using said upstream clock signal to multiplex said chips or symbols of upstream data from different sources using time division or code division multiplexing into a plurality of timeslots or result vectors to be transmitted, and for generating a phase coherent upstream carrier from said upstream clock signal, and for modulating said timeslots or result vectors of upstream data onto said upstream carrier to generate upstream signals and launching said upstream signals into said shared transmission medium and translating the frequency of the upstream signals to a selected frequency in an upstream band of frequencies, and filtering the Fourier spectrum of said upstream signals to limit the spectrum to a band of frequencies at a center frequency that does not interfere with other signals on said shared transmission medium;

and said first node further comprising:
fourth means having an input coupled to receive said upstream clock signal from said first upstream clock generation means and having an input coupled to said shared transmission media and including means for generating a local upstream carrier from said upstream clock signal generated by said first upstream clock generation means which has the same frequency as said upstream carrier generated in each of said second nodes, said fourth means for using said upstream carrier to demodulate upstream signals transmitted by said one or more second nodes to generate demodulated upstream signals, and for recovering said upstream data from said demodulated upstream signals, including using said upstream clock to demultiplex said recovered upstream data if necessary.

6. A modem for use as a remote node in a bidirectional communication system having a headend and a plurality of remote nodes coupled to said headend by a transmission medium, comprising:

first means for recovering a downstream clock from data transmitted by said headend over said transmission medium and for using said recovered downstream clock to recover downstream data;

a clock means for generating an upstream clock signal from said recovered downstream clock so as to be phase coherent with a master clock in said headend and which has a frequency which M/N times the frequency of said recovered downstream clock where M and N are integers; and third means for using said upstream clock signal to transmit upstream data to said headend over said transmission medium, and wherein upstream data transmission is on the basis of assigned minislots counted by a minislot counter in the headend, said minislot counter having a rollover value that defines a superframe boundary, and further comprising ranging means for carrying out the communications of a ranging algorithm to determine an RU frame alignment offset value for a symbol counter to achieve frame synchronization, said symbol counter also having a rollover value which defines a superframe of symbols which exactly corresponds in duration with said superframe of minislots, said symbol counter being implemented by said third means, said offset being of a value which will cause frame synchronization such that transmission of symbol data upstream occurs with timing such that if a superframe of symbols were to be transmitted upstream, the superframe of symbols would arrive at said headend with the frame boundaries of said superframe of symbols aligned in time with said superframe boundaries of said superframe of minislots but wherein actual transmission of upstream symbols occurs only during assigned minislots.

7. The apparatus of claim 6 wherein said headend sends sync messages and UCD messages downstream, each said sync message carrying a timestamp sample from a timestamp counter in said headend and each said UCD message containing a timestamp at the time of a kiloframe or superframe boundary occurring at said headend, and further comprising means in said modem for calculating an initial offset value from a sync message and a UCD message and for using said offset as an initial offset value or starting point for said ranging means.

8. A system for bidirectional communication of digital data between a CU modem and a plurality of RU modems, comprising:

a shared transmission medium coupling said CU and RU modems; and a CU modem comprising:
a master clock for generating a master clock signal;
first means for generating downstream clock signals;
second means coupled to said shared transmission medium for receiving said downstream clock signal and for using it to transmit downstream data over said shared transmission medium; and
third means coupled to said shared transmission medium for receiving upstream data transmitted over said shared transmission medium and recovering an upstream clock and carrier therefrom and using said recovered upstream clock and carrier signals to demodulate and demultiplex SCDMA multiplexed upstream symbols having their spectrums spread with a plurality of spreading codes, said symbols and spreading codes being mapped to minislots assigned by said CU modem to said RU modem(s); and an RU modem comprising fourth means coupled to said shared transmission medium, for recovering a downstream clock and downstream carrier from data transmitted by said CU modem over said shared transmission medium and for using said recovered downstream clock and carrier to recover downstream data including said minislot assignments transmitted from said CU modem;

a timebase for generating an upstream clock and upstream carrier;

fifth means coupled to said shared transmission medium and to said timebase and to said fourth means for mapping said minislot assignments to one or more symbols and one or more spreading codes or DMT frequencies for use in transmitting symbols upstream to said CU modem, and for using said upstream clock, said upstream carrier, and said symbols and spreading codes or DMT frequencies mapped to said minislot assignment to transmit upstream data and preamble data to said CU modem over said shared transmission medium.

9. A system for bidirectional communication of digital data between a CU modem and a plurality of RU modems, comprising:

a shared transmission medium coupling said CU and RU modems; and a CU modem comprising:

a master clock for generating a master clock signal;

first means for generating upstream and downstream clock signals which are phase coherent with said master clock signal, said upstream clock signal having a frequency which is M/N times the frequency of said downstream clock signal, where M and N are integers;

second means coupled to said shared transmission medium for receiving said downstream clock signal and for using it to transmit downstream data over said shared transmission medium; and third means coupled to said shared transmission medium and coupled to receive said upstream clock signal and using it to receive upstream data transmitted over said shared transmission medium; and an RU modem comprising fourth means coupled to said shared transmission medium, for recovering a downstream clock from data transmitted by said CU modem over said shared transmission medium and for using said recovered downstream clock to recover downstream data;

fifth means for using said recovered downstream clock to generate an upstream clock which is phase coherent with said downstream clock, said upstream clock having a frequency which is M/N times the frequency of said downstream clock, where M and N are integers; and sixth means coupled to said shared transmission medium for using said upstream clock to transmit upstream data and preamble data to said CU modem over said shared transmission medium.

10. A system for bidirectional communication of digital data between a CU modem and a plurality of RU modems, comprising:

a shared transmission medium coupling said CU and RU modems; and a CU modem comprising:

a master clock for generating a master clock signal;

first means for generating upstream and downstream clock and carrier signals which are phase coherent with said master clock signal, said upstream clock signal having a frequency which is M/N times the frequency of said downstream clock signal, where M and N are integers;

second means coupled to said shared transmission medium for receiving said downstream clock signal and said downstream carrier and for using them to transmit downstream data over said shared transmission medium; and third means coupled to receive upstream signals transmitted over said shared transmission medium and coupled to receive said upstream clock signal and said upstream carrier signal and using them in addition to preamble data transmitted by each RU modem to demodulate and demultiplex SCDMA multiplexed upstream symbols in said upstream signals, said symbols having their spectrums spread with a plurality of spreading codes, said symbols and spreading codes being mapped to minislots assigned by said CU modem to said RU modem(s) for upstream transmissions; and an RU modem comprising fourth means coupled to said shared transmission medium, for recovering a downstream clock from data transmitted by said CU modem over said shared transmission medium and for using said recovered downstream clock to generate a downstream carrier which is phase coherent with said downstream carrier signal used by said second means to transmit said downstream data and using said downstream clock and carrier signals to demodulate and recover downstream data including said minislot assignment for upstream transmission;

fifth means for using said recovered downstream clock to generate an upstream clock and an upstream carrier which are both phase coherent with said recovered downstream clock, said upstream clock having a frequency which is M/N times the frequency of said downstream clock, where M and N are integers; and sixth means coupled to said shared transmission medium including ranging means for establishing frame synchronization, said sixth means for using said upstream clock and upstream carrier signals to transmit upstream symbol data to said CU modem over said shared transmission medium by mapping said minislot assignment received from said CU modem to one or more symbols and one or more spreading codes or DMT frequencies for use in transmitting symbols upstream to said CU modem, and for using said upstream clock and upstream carrier and said symbols and spreading codes or DMT frequencies mapped to said minislot assignment to transmit upstream data as well as known preamble data to said CU modem over said shared transmission medium.

11. The apparatus of claim 10 wherein said CU modem further comprises a minislot counter which rolls over at a programmable count value which defines a superframe boundary, and further comprises a timestamp counter, a timestamp sampler and a sync message generator means for generating sync messages that contain samples taken by said timestamp sampler of said timestamp counter at predetermined times, and for generating UCD messages which contain samples taken by said timestamp sampler of said timestamp counter at superframe boundaries, and wherein said second means transmits said sync messages and UCD messages downstream to said RU modem, and wherein said ranging means of said RU modem includes a symbol counter which counts symbols in a superframe of upstream symbols that exactly corresponds in duration to said superframe of minislots and which rolls over at a count corresponding to a boundary of a superframe of upstream symbols, and wherein said fourth means includes offset calculation means for using said sync messages and UCD messages to calculate an offset to load into said symbol counter such that the superframe boundaries of a superframe of said upstream symbols transmitted by said sixth means will be approximately superimposed in time at said CU modem with the superframe boundaries of a superframe of minislots mapped to said superframe of symbols.

12. The apparatus of claim 11 wherein said ranging means of said sixth means achieves frame synchronization more quickly by using said offset calculated by said offset calculation means as a starting point to carry out a trial and error ranging process to determine an exact offset for said symbol counter which will cause said superframe boundaries of a superframe of upstream symbols to be exactly superimposed in time at said CU modem with the superframe boundaries of a superframe of minislots mapped to said superframe of symbols.

13. The apparatus of claim 10 wherein said CU modem includes a minislot counter which rolls over at a count value which defines a superframe boundary, and wherein said RU modem includes a symbol counter coupled to or part of said ranging means of said sixth means which counts symbols in a superframe of symbols that exactly corresponds in duration to said superframe of minislots and which rolls over at a count corresponding to a boundary of a superframe of symbols, and wherein said ranging means functions to use a trial and error delay process to determine an exact offset for said symbol counter which will cause said superframe boundaries of a superframe of upstream symbols to be exactly superimposed in time at said CU modem with the superframe boundaries of a superframe of minislots mapped to said superframe of symbols.

14. The apparatus of claim 12 wherein downstream data arrives at said second means in the form of packets with headers and wherein said second means further breaks down said packets and headers into FEC frames having overhead bits and ECC error detection and correction bits therein, and wherein said second means includes means for inserting said sync messages and said UCD messages in the stream of downstream data so as to have low jitter by monitoring the point of insertion of every sync or UCD message into every packet based upon the length of the data and header portions of the packet and the length of said sync or UCD message and changing the point of insertion whenever said sync message or UCD message would not fit completely within the data portion of a packet and would straddle a header portion, and by always inserting the sync message or UCD message at the same point in every FEC frame such that whatever straddles of overhead or ECC bits exist are always the same.

15. The apparatus of claim 10 further comprising a clock slip detector means coupled to receive said recovered downstream clock and said upstream clock for counting and storing the count of the clock cycles of said upstream clock over each predetermined interval of said recovered downstream clock and generating an interrupt signal at the end of every interval.

16. The apparatus of claim 15 further comprising means for receiving said interrupt signal and for retrieving the count of upstream clock cycles in response thereto and comparing said count to a predetermined expected number, and if there is a mismatch of more than a predetermined number of clock cycles, for causing said sixth means to cease transmitting.

17. A process for mapping upstream symbols and spreading codes in an SCDMA system to upstream assigned minislots comprising:

organizing data to be transmitted into frames comprised of subframes each of which contains chips generated from symbols in an information vector, with one information vector mapped to each subframe, and a programmable number of frames mapped to every minislot;

counting minislots with a minislot counter that rolls over at some number which defines a superframe of minislots;

setting a rollover count of a symbol counter to establish a superframe of symbols such that if said minislot counter and said symbol counter simultaneously started counting from zero, both would roll over simultaneously;

mapping symbols and spreading codes to minislots by starting on a first code and assigning numbers to symbols to each frame in accordance with how many subframes there are in said frame and continuing this process with subsequent frames along a time axis until a programmable value of L is reached where L is an integer, then repeating the process starting with another code along a code axis and starting with another frame until L is reached again and repeating this process until the number of symbols in a superframe of symbols have been mapped to specific frames and minislots and specific codes.

18. A process of transmitting SCDMA data in an upstream organized as numbered minislots, comprising:

receiving a minislot assignment naming specific numbered minislots on which transmission is authorized;

mapping the specific minislot numbers in said assignment to specific symbols and spreading codes and frame and subframes that map to those minislots;

constructing one information vector for every subframe mapped to the minislot assignment by placing the numbered symbols that map to the numbered minislots in the assignment in the elements of the information vectors corresponding to the numbered code each numbered symbol maps to;

spreading the spectrum of each information vector by matrix multiplication of the information vector times a code matrix having a plurality of codes therein which corresponds to the number of elements in the information vector to generate one result vector for every subframe that maps to the assigned minislots; and transmitting RF signals derived from the result vectors.

19. A modem for use as a remote node in a bidirectional communication system having a headend and a plurality of remote nodes coupled to said headend by a transmission medium, comprising:

first means for recovering a downstream clock which is phase coherent with a master clock in said headend from data transmitted by said headend over said transmission medium and for using said recovered downstream clock to generate a local downstream carrier which is phase coherent with a downstream carrier that downstream data was modulated on at said headend and which lies in a downstream band of frequencies, said first means for using said recovered downstream clock and local downstream carrier to recover said downstream data;

second means for using said recovered downstream clock to generate an upstream clock which is phase coherent with said recovered downstream clock, said upstream clock having a frequency which is M/N times the frequency of said downstream clock, where M and N are integers; and third means for using said upstream clock to generate an upstream carrier which is in a different, non-interfering frequency band from the frequency band of said recovered downstream carrier, and for using said upstream clock and said upstream carrier to transmit upstream data from a plurality of different sources to said headend over said transmission medium simultaneously with recovery by said first means of said downstream data, separation of upstream data from said different sources being accomplished using any known form of multiplexing and separation of said transmissions of upstream data from recovery of said downstream data being accomplished by virtue of frequency division multiplexing.

20. A modem for use at a headend of a system for bidirectional communication of digital data over a transmission medium, comprising:

a master clock for generating a master clock signal;

means for generating upstream and downstream clock signals which are phase coherent with said master clock signal, said upstream clock signal having a frequency which is M/N times the frequency of said downstream clock signal, where M and N are integers and are not equal;

means coupled to receive said downstream clock signal for using said downstream clock to generate a downstream carrier and use said downstream clock and downstream carrier to transmit downstream data over said transmission medium; and means coupled to receive said upstream clock signal for using said upstream clock to generate an upstream carrier of the same frequency as the upstream carrier used by remote transceivers to transmit upstream data to said headend transceiver and for using said upstream clock and said upstream carrier and preamble data transmitted by each said remote unit modem to recover upstream data transmitted over said transmission medium.

21. A process for bidirectional communication of digital data in a communication system having a headend modem and at least one remote modem coupled to said headend modem by a communication medium, comprising:

generating a master clock signal in said headend modem, and generating a downstream clock and carrier signal from said master clock signal both of which are phase coherent therewith, and generating upstream clock and carrier signals in said headend modem from said master clock signal both of which are phase coherent therewith, said upstream clock signal having a frequency which is M/N times the frequency of said downstream clock, where M and N are integers;

transmitting data downstream to a remote modem using said downstream clock and carrier signals; and using said upstream clock and carrier signals and known preamble data transmitted by each said remote unit modem to recover upstream data transmitted by each of said remote unit modems.

22. The process of claim 21 further comprising the steps of using a timestamp counter to count the ticks of a timestamp clock which may or may not be said master clock in said headend, and periodically sampling said timestamp counter and periodically generating synchronization messages and transmitting said synchronization messages as part of said downstream data with no more than 200 milliseconds between adjacent synchronization messages, and sampling said timestamp counter each time an upstream kiloframe boundary is detected in said upstream data and generating and transmitting a UCD messages as part of said downstream data from time to time with each UCD message containing a sample of said timestamp counter at an upstream kiloframe boundary of said headend modem, each synchronization message containing the count of said timestamp counter.

23. A process for bidirectional communication of digital data in a communication system having a headend modem and at least one remote modem coupled to said headend modem by a communication medium, comprising:

in said remote modem, receiving downstream transmissions from said headend modem and recovering a downstream clock signal from said downstream transmissions and generating a local downstream clock and a downstream carrier from said recovered downstream clock, both said local downstream clock and said downstream carrier being phase coherent with said recovered downstream clock;

using said local downstream clock and said downstream carrier to recover downstream data;

using said recovered downstream clock signal to generate an upstream clock signal and an upstream carrier signal both of which are phase coherent with the recovered downstream clock signal, said upstream clock signal having a frequency which is M/N times the frequency of said recovered downstream clock signal;

achieving frame synchronization using a ranging process;

using said upstream clock and upstream carrier signals to transmit symbol data and known preamble data from said remote modem upstream to said headend modem.

24. The process of claim 23 further comprising the steps:

(1) establishing an initial upstream kiloframe boundary in said remote modem;

(2) counting ticks of said upstream clock in a local kiloframe counter and resetting said counter to zero at the beginning of each new upstream kiloframe;

(3) sampling the count of said local kiloframe counter each time a synchronization message is received;

(4) detecting when a synchronization message is received in said downstream data and when a UCD message is received in said downstream data and extracting timestamp data from each;

(5) determining the number of local kiloframe counter clock cycles in N frames where N is the number of upstream frames in the interval between the time that an upstream kiloframe marker is received at said headend modem minus the downstream propagation delay between this remote unit modem and said headend modem;

(6) using a timebase conversion factor between a clock frequency that drives a timestamp counter in said headend modem and said upstream clock being counted by said local kiloframe counter and the timestamp data extracted in step (4) and the data calculated in step (5) to calculate an offset value;

(7) using said offset value to speed up the ranging process to achieve frame synchronization.

25. A process of achieving frame synchronization in a remote modem in a bidirectional digital data communication system having a headend modem that transmits MCNS downstream data to one or more remote unit modems coupled to said headend modem by a shared communications medium, comprising:

waiting for said remote unit modem to achieve clock synchronization with a master clock in said headend modem by recoving a downstream clock from transmissions from said headend modem and using said recovered downstream clock to generate a local downstream clock and a local upstream clock, both of which are phase coherent with said master clock in said headend modem;

establising an initial arbitrary upstream kiloframe boundary;

waiting to receive at least one synchronization message and one UCD message in said remote unit modem from said headend modem;

computing an upstream kiloframe boundary adjustment using timestamp data in said synchronization and UCD messages;

waiting for at least one upstream kiloframe to pass and performing a ranging process using said upstream kiloframe boundary adjustment value to determine an upstream transmission delay value TD to achieve precise kiloframe boundary frame synchronization; and storing the value of TD in memory and using it for subsequent upstream kiloframe transmissions by said remote unit modem.

* * * * *